(12) United States Patent
Lee et al.

(10) Patent No.: US 11,284,076 B2
(45) Date of Patent: Mar. 22, 2022

(54) BLOCK FORM-BASED PREDICTION METHOD AND DEVICE

(71) Applicants: ELECTRONICS AND TELECOMMUNICATIONS RESEARCH INSTITUTE, Daejeon (KR);
(Continued)

(72) Inventors: Jin-Ho Lee, Daejeon (KR); Jung-Won Kang, Daejeon (KR);
(Continued)

(73) Assignees: ELECTRONICS AND TELECOMMUNICATIONS RESEARCH INSTITUTE, Daejeon (KR); INDUSTRY-UNIVERSITY COOPERATION FOUNDATION KOREA AEROSPACE UNIVERSITY, Goyang-si (KR); HANBAT NATIONAL UNIVERSITY INDUSTRY-ACADEMIC COOPERATION FOUNDATION, Daejeon (KR)

( * ) Notice: Subject to any disclaimer, the term of this patent is extended or adjusted under 35 U.S.C. 154(b) by 0 days.

(21) Appl. No.: 16/494,507

(22) PCT Filed: Mar. 22, 2018

(86) PCT No.: PCT/KR2018/003392
§ 371 (c)(1),
(2) Date: Sep. 16, 2019

(87) PCT Pub. No.: WO2018/174617
PCT Pub. Date: Sep. 27, 2018

(65) Prior Publication Data
US 2020/0029077 A1    Jan. 23, 2020

(30) Foreign Application Priority Data

Mar. 22, 2017 (KR) .................. 10-2017-0036257
Nov. 20, 2017 (KR) .................. 10-2017-0155097
Mar. 22, 2018 (KR) .................. 10-2018-0033424

(51) Int. Cl.
H04N 19/119 (2014.01)
H04N 19/105 (2014.01)
(Continued)

(52) U.S. Cl.
CPC ......... *H04N 19/119* (2014.11); *H04N 19/105* (2014.11); *H04N 19/124* (2014.11);
(Continued)

(58) Field of Classification Search
None
See application file for complete search history.

(56) References Cited

U.S. PATENT DOCUMENTS 6,314,209 B1 * 11/2001 Kweon ................ G06T 3/602
375/E7.228
8,194,749 B2   6/2012 Kim et al.
(Continued)

FOREIGN PATENT DOCUMENTS

KR   10-0667808 B1   1/2007
KR   10-1531397 B1   6/2015
(Continued)

OTHER PUBLICATIONS

Search report Google search.*
(Continued)

*Primary Examiner* — Mohammad J Rahman
(74) *Attorney, Agent, or Firm* — NSIP Law

(57) ABSTRACT

Disclosed herein are a video decoding method and apparatus and a video encoding method and apparatus. In video encoding and decoding, multiple partition blocks are generated by splitting a target block. A prediction mode is derived for at least a part of the multiple partition blocks, among the multiple partition blocks, and prediction is performed on the multiple partition blocks based on the derived
(Continued)

prediction mode. When prediction is performed on the partition blocks, information related to the target block may be used, and information related to an additional partition block, which is predicted prior to the partition block, may be used.

17 Claims, 35 Drawing Sheets

(71) Applicants: INDUSTRY-UNIVERSITY COOPERATION FOUNDATION KOREA AEROSPACE UNIVERSITY, Goyang-si (KR); HANBAT NATIONAL UNIVERSITY INDUSTRY-ACADEMIC COOPERATION FOUNDATION, Daejeon (KR)

(72) Inventors: Hyunsuk Ko, Daejeon (KR); Sung-Chang Lim, Daejeon (KR); Dong-San Jun, Daejeon (KR); Ha-Hyun Lee, Seoul (KR); Seung-Hyun Cho, Daejeon (KR); Hui-Yong Kim, Daejeon (KR); Hae-Chul Choi, Daejeon (KR); Dae-Hyeok Gwon, Daejeon (KR); Jae-Gon Kim, Goyang-si (KR); A-Ram Back, Daejeon (KR)

(51) Int. Cl.
*H04N 19/593* (2014.01)
*H04N 19/124* (2014.01)
*H04N 19/61* (2014.01)
*H04N 19/176* (2014.01)

(52) U.S. Cl.
CPC ........... *H04N 19/593* (2014.11); *H04N 19/61* (2014.11); *H04N 19/176* (2014.11)

(56) References Cited

U.S. PATENT DOCUMENTS

| | | | | |
|---|---|---|---|---|
| 9,113,168 | B2 * | 8/2015 | Park | H04N 19/196 |
| 9,491,467 | B2 | 11/2016 | Kim et al. | |
| 10,148,974 | B2 * | 12/2018 | Yamamoto | H04N 19/119 |
| 10,334,252 | B2 | 6/2019 | Jeong et al. | |
| 2012/0047180 | A1 * | 2/2012 | Kirshenbaum | G06Q 30/0201 |
| | | | | 707/797 |
| 2013/0177079 | A1 | 7/2013 | Kim et al. | |
| 2013/0272623 | A1 * | 10/2013 | Jeon | H04N 19/593 |
| | | | | 382/238 |
| 2013/0301724 | A1 * | 11/2013 | Boon | H04N 19/176 |
| | | | | 375/240.14 |
| 2014/0133772 | A1 * | 5/2014 | Lee | H04N 19/176 |
| | | | | 382/238 |
| 2014/0205006 | A1 | 7/2014 | Jeong et al. | |
| 2014/0205011 | A1 * | 7/2014 | Sung | H04N 19/597 |
| | | | | 375/240.12 |
| 2014/0307784 | A1 * | 10/2014 | Lee | H04N 19/13 |
| | | | | 375/240.03 |
| 2015/0078450 | A1 * | 3/2015 | Chen | H04N 19/52 |
| | | | | 375/240.16 |
| 2015/0208094 | A1 | 7/2015 | Lee et al. | |
| 2015/0222914 | A1 * | 8/2015 | Yamamoto | H04N 19/537 |
| | | | | 375/240.16 |
| 2015/0326866 | A1 * | 11/2015 | Ikai | H04N 19/174 |
| | | | | 375/240.25 |
| 2015/0334411 | A1 * | 11/2015 | Yamamoto | H04N 19/513 |
| | | | | 375/240.16 |
| 2016/0044327 | A1 | 2/2016 | Kim et al. | |
| 2016/0227243 | A1 | 8/2016 | Cho | |
| 2016/0255371 | A1 * | 9/2016 | Heo | H04N 19/597 |
| | | | | 375/240.13 |
| 2017/0041616 | A1 | 2/2017 | Ramamurthy et al. | |
| 2017/0244964 | A1 * | 8/2017 | Liu | H04N 19/119 |
| 2017/0353721 | A1 * | 12/2017 | Piao | H04N 19/119 |
| 2018/0139443 | A1 * | 5/2018 | Park | H04N 19/105 |
| 2018/0139453 | A1 * | 5/2018 | Park | H04N 19/159 |
| 2018/0160118 | A1 * | 6/2018 | Tsukuba | H04N 19/119 |
| 2018/0176595 | A1 * | 6/2018 | Park | H04N 19/105 |
| 2018/0309990 | A1 * | 10/2018 | Alshina | H04N 19/70 |
| 2018/0324434 | A1 * | 11/2018 | Piao | H04N 19/176 |
| 2018/0324441 | A1 * | 11/2018 | Lim | H04N 19/198 |
| 2018/0332288 | A1 * | 11/2018 | Hsiang | H04N 19/70 |
| 2018/0376165 | A1 * | 12/2018 | Alshin | H04N 19/577 |
| 2019/0174128 | A1 * | 6/2019 | Jang | H04N 19/132 |
| 2019/0246106 | A1 * | 8/2019 | Park | H04N 19/119 |
| 2019/0273922 | A1 * | 9/2019 | Lim | H04N 19/119 |
| 2019/0273931 | A1 * | 9/2019 | Lim | H04N 19/176 |
| 2020/0053363 | A1 * | 2/2020 | Min | H04N 19/463 |
| 2020/0053368 | A1 * | 2/2020 | Urban | H04N 19/132 |
| 2020/0260104 | A1 * | 8/2020 | Piao | H04N 19/117 |

FOREIGN PATENT DOCUMENTS

| | | |
|---|---|---|
| KR | 10-1583200 B1 | 1/2016 |
| KR | 10-1608895 B1 | 4/2016 |
| KR | 10-2016-0095932 A | 8/2016 |
| KR | 10-1697154 B1 | 1/2017 |

OTHER PUBLICATIONS

International Search Report dated Jun. 28, 2018 in counterpart International Patent Application No. PCT/KR2018/003392 (2 pages in English and 2 pages in Korean).
Chen et al. "Description of scalable video coding technology proposal by Qualcomm" *Joint Collaborative Team on Video Coding (JCT-VVC) of ITU-T SG16 WP3 and ISO/IEC JTC1/SC29/WG11 11th Meeting: Shanghai, CN, Oct. 10-19, 2012* ,(19 pages in English).
ITU-T Study Group. "Series H: Audiovisual and multimedia systems: Infrastructure of audiovisual services—coding of moving video." ITU-T Study Group,"Series H: Audiovisual and multimedia systems: Infrastructure of audiovisual services—coding of moving video," in General Secretariat and Telecom Radiocommunication (ITU-R) Standardization (ITU-T), sec. H 264 (2005). (317 pages in English).

\* cited by examiner

BLOCK FORM-BASED PREDICTION METHOD AND DEVICE

TECHNICAL FIELD

The following embodiments relate generally to a video decoding method and apparatus and a video encoding method and apparatus, and more particularly, to a method and apparatus for performing prediction based on the shape of a block in the encoding and decoding of a video.

This application is a U.S. National Stage Application of International Application No. PCT/KR2018/003392 filed Mar. 22, 2018, which claims the benefit of Korean Patent Application Nos. 10-2017-0036257, filed Mar. 22, 2017, 10-2017-0155097, filed Nov. 20, 2017, and 10-2018-0033424, filed Mar. 22, 2018, which are hereby incorporated by reference in their entirety into this application.

BACKGROUND ART

With the continuous development of the information and communication industries, broadcasting services supporting High-Definition (HD) resolution have been popularized all over the world. Through this popularization, a large number of users have become accustomed to high-resolution and high-definition images and/or videos.

To satisfy users' demand for high definition, many institutions have accelerated the development of next-generation imaging devices. Users' interest in UHD TVs, having resolution that is more than four times as high as that of Full HD (FHD) TVs, as well as High-Definition TVs (HDTV) and FHD TVs, has increased. As interest therein has increased, image encoding/decoding technology for images having higher resolution and higher definition is continually required.

An image encoding/decoding apparatus and method may use inter-prediction technology, intra-prediction technology, entropy-coding technology, etc. so as to perform encoding/decoding on a high-resolution and high-definition image. Inter-prediction technology may be technology for predicting the value of a pixel included in a current picture using temporally previous pictures and/or temporally subsequent pictures. Intra-prediction technology may be technology for predicting the value of a pixel included in a current picture using information about pixels in the current picture. Entropy-coding technology may be technology for assigning short code words to frequently occurring symbols and assigning long code words to rarely occurring symbols.

Various prediction methods have been developed to improve the efficiency and accuracy of intra prediction and/or inter prediction. For example, a block may be split for efficient prediction, and prediction may be performed on each of blocks generated by splitting. Prediction efficiency may greatly change depending on whether a block is split.

DISCLOSURE

Technical Problem

An embodiment is intended to provide an encoding apparatus and method and a decoding apparatus and method, which split a block based on the size and/or shape of the block, and derive a prediction mode for each partition block generated by splitting.

An embodiment is intended to provide an encoding apparatus and method and a decoding apparatus and method, which perform prediction on each partition block depending on the derived prediction mode.

Technical Solution

In accordance with an aspect, there is provided an encoding method, including generating multiple partition blocks by splitting a target block; deriving a prediction mode for at least a part of the multiple partition blocks; and performing prediction on the multiple partition blocks based on the derived prediction mode.

In accordance with another aspect, there is provided a decoding method, including generating multiple partition blocks by splitting a target block; deriving a prediction mode for at least a part of the multiple partition blocks; and performing prediction on the multiple partition blocks based on the derived prediction mode.

Whether to split the target block may be determined based on information related to the target block.

Whether to split the target block and which type of splitting is to be used may be determined based on a block split indicator.

The target block may be split based on a size of the target block.

The target block may be split based on a shape of the target block.

The prediction mode may be derived for a specific partition block, among the multiple partition blocks.

The specific partition block may be a block at a specific location, among the multiple partition blocks.

The prediction mode, derived for the specific partition block, may be used for remaining partition blocks other than the specific partition block, among the multiple partition blocks.

A prediction mode that is decided on by a combination of the prediction mode, derived for the specific partition block, and an additional prediction mode may be used for remaining partition blocks other than the specific partition block, among the multiple partition blocks.

A Most Probable Mode (MPM) list may be used for derivation of the prediction mode.

The MPM list may include multiple MPM lists.

The MPM candidate modes in the multiple MPM lists may not overlap each other.

The MPM list may be configured for a specific unit.

The specific unit may be the target block.

MPM lists for the multiple partition blocks may be configured based on one or more reference blocks for the target block.

A prediction mode derived for a first block, among the multiple partition blocks, may be used for prediction of a second block, among the multiple partition blocks.

Reconstructed pixels of the first block may be used as reference samples for the prediction of the second block.

Reference samples used for the prediction of the multiple partition blocks may be reconstructed pixels adjacent to the target block.

The prediction mode may be derived for a lowermost block or a rightmost block, among the multiple partition blocks.

Reconstructed pixels adjacent to a top of the target block may be used as reference pixels for prediction of the lowermost block.

The prediction of the multiple partition blocks may be performed in a predefined order.

The predefined order may be an order from a lowermost block to an uppermost block, an order from a rightmost block to a leftmost block, an order in which the lowermost block is selected first and thereafter blocks ranging from the uppermost block to a second block from a bottom are sequentially selected, or an order in which the rightmost block is selected first and thereafter blocks ranging from the leftmost block to a second block from a right are sequentially selected.

In accordance with a further aspect, there is provided a decoding method, including deriving a prediction mode; generating multiple partition blocks by splitting a target block; and performing prediction on the multiple partition blocks based on the derived prediction mode.

Advantageous Effects

There are provided an encoding apparatus and method and a decoding apparatus and method, which split a block based on the size and/or shape of the block and derive a prediction mode for each partition block generated by the splitting.

There are provided an encoding apparatus and method and a decoding apparatus and method, which perform prediction on each partition block depending on the derived prediction mode.

BEST MODE

Figure 1:
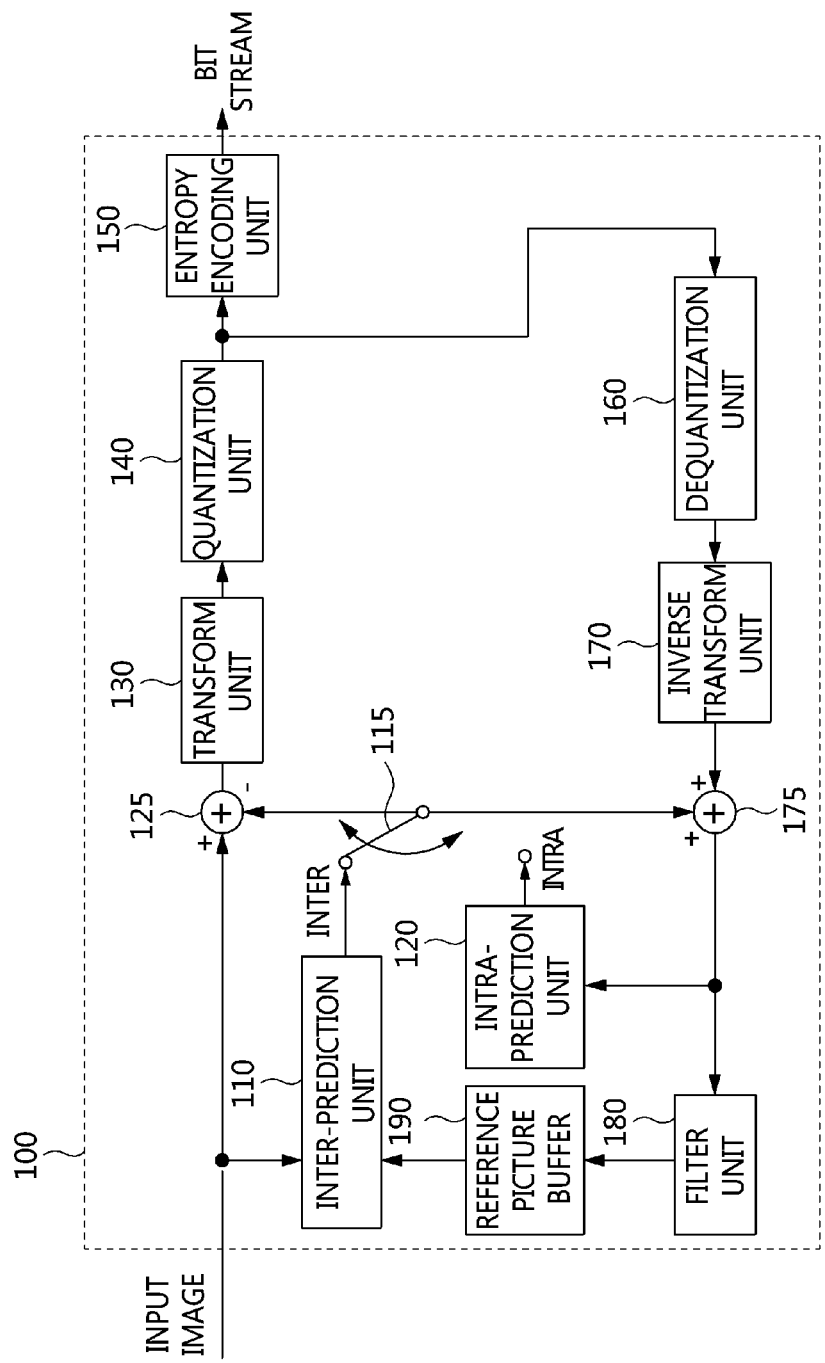
FIG. 1 is a block diagram illustrating the configuration of an embodiment of an encoding apparatus to which the present disclosure is applied.

The present invention may be variously changed, and may have various embodiments, and specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but do not need to be mutually exclusive of each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. It will be understood that when a component is referred to as being "directly connected or coupled", no intervening components are present between the two components.

Also, components described in the embodiments are independently shown in order to indicate different characteristic functions, but this does not mean that each of the components is formed of a separate piece of hardware or software. That is, the components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

Further, it should be noted that, in the exemplary embodiments, an expression describing that a component "comprises" a specific component means that additional components may be included within the scope of the practice or the technical spirit of exemplary embodiments, but does not preclude the presence of components other than the specific component.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted. Further, the same reference numerals are used to designate the same components throughout the drawings, and repeated descriptions of the same components will be omitted.

Hereinafter, "image" may mean a single picture constituting a video, or may mean the video itself. For example, "encoding and/or decoding of an image" may mean "encoding and/or decoding of a video", and may also mean "encoding and/or decoding of any one of images constituting the video".

Hereinafter, the terms "video" and "motion picture" may be used to have the same meaning, and may be used interchangeably with each other.

Hereinafter, a target image may be an encoding target image, which is the target to be encoded, and/or a decoding target image, which is the target to be decoded. Further, the target image may be an input image that is input to an encoding apparatus or an input image that is input to a decoding apparatus.

Hereinafter, the terms "image", "picture", "frame", and "screen" may be used to have the same meaning and may be used interchangeably with each other.

Hereinafter, a target block may be an encoding target block, i.e. the target to be encoded and/or a decoding target block, i.e. the target to be decoded. Further, the target block may be a current block, i.e. the target to be currently encoded and/or decoded. Here, the terms "target block" and "current block" may be used to have the same meaning, and may be used interchangeably with each other.

Hereinafter, the terms "block" and "unit" may be used to have the same meaning, and may be used interchangeably with each other. Alternatively, "block" may denote a specific unit.

Hereinafter, the terms "region" and "segment" may be used interchangeably with each other.

Hereinafter, a specific signal may be a signal indicating a specific block. For example, the original signal may be a signal indicating a target block. A prediction signal may be a signal indicating a prediction block. A residual signal may be a signal indicating a residual block.

In the following embodiments, specific information, data, a flag, an element, and an attribute may have their respective values. A value of "0" corresponding to each of the information, data, flag, element, and attribute may indicate a logical false or a first predefined value. In other words, the value of "0", false, logical false, and a first predefined value may be used interchangeably with each other. A value of "1" corresponding to each of the information, data, flag, element, and attribute may indicate a logical true or a second predefined value. In other words, the value of "1", true, logical true, and a second predefined value may be used interchangeably with each other.

When a variable such as i or j is used to indicate a row, a column, or an index, the value of i may be an integer of 0 or more or an integer of 1 or more. In other words, in the embodiments, each of a row, a column, and an index may be counted from 0 or may be counted from 1.

Below, the terms to be used in embodiments will be described.

Encoder: An encoder denotes a device for performing encoding.

Decoder: A decoder denotes a device for performing decoding.

Unit: A unit may denote the unit of image encoding and decoding. The terms "unit" and "block" may be used to have the same meaning, and may be used interchangeably with each other.

"Unit" may be an M×N array of samples. M and N may be positive integers, respectively. The term "unit" may generally mean a two-dimensional (2D) array of samples.

In the encoding and decoding of an image, "unit" may be an area generated by the partitioning of one image. A single image may be partitioned into multiple units. Alternatively, one image may be partitioned into sub-parts, and the unit may denote each partitioned sub-part when encoding or decoding is performed on the partitioned sub-part.

In the encoding and decoding of an image, predefined processing may be performed on each unit depending on the type of the unit.

Depending on functions, the unit types may be classified into a macro unit, a Coding Unit (CU), a Prediction Unit (PU), a residual unit, a Transform Unit (TU), etc. Alternatively, depending on functions, the unit may denote a block, a macroblock, a coding tree unit (CTU), a coding tree block, a coding unit, a coding block, a prediction unit, a prediction block, a residual unit, a residual block, a transform unit, a transform block, etc.

The term "unit" may mean information including a luminance (luma) component block, a chrominance (chroma) component block corresponding thereto, and syntax elements for respective blocks so that the unit is designated to be distinguished from a block.

The size and shape of a unit may be variously implemented. Further, a unit may have any of various sizes and shapes. In particular, the shapes of the unit may include not only a square, but also a geometric figure that can be represented in two dimensions (2D), such as a rectangle, a trapezoid, a triangle, and a pentagon.

Further, unit information may include one or more of the type of unit, which indicates a coding unit, a prediction unit, a residual unit or a transform unit, the size of a unit, the depth of a unit, the order of encoding and decoding of a unit, etc.

One unit may be partitioned into sub-units, each having a smaller size than that of the relevant unit.

Unit depth: A unit depth may denote the degree to which the unit is partitioned. Further, the unit depth may indicate the level at which the corresponding unit is present when units are represented in a tree structure.

Unit partition information may include a unit depth indicating the depth of a unit. A unit depth may indicate the number of times the unit is partitioned and/or the degree to which the unit is partitioned.

In a tree structure, it may be considered that the depth of a root node is the smallest, and the depth of a leaf node is the largest.

A single unit may be hierarchically partitioned into multiple sub-units while having depth information based on a tree structure. In other words, the unit and sub-units, generated by partitioning the unit, may correspond to a node and child nodes of the node, respectively. Each of the partitioned sub-units may have a unit depth. Since the unit depth indicates the number of times the unit is partitioned and/or the degree to which the unit is partitioned, the partition information of the sub-units may include information about the sizes of the sub-units.

In a tree structure, the top node may correspond to the initial node before partitioning. The top node may be referred to as a "root node". Further, the root node may have a minimum depth value. Here, the top node may have a depth of level '0'.

A node having a depth of level '1' may denote a unit generated when the initial unit is partitioned once. A node having a depth of level '2' may denote a unit generated when the initial unit is partitioned twice.

A leaf node having a depth of level 'n' may denote a unit generated when the initial unit has been partitioned n times.

The leaf node may be a bottom node, which cannot be partitioned any further. The depth of the leaf node may be the maximum level. For example, a predefined value for the maximum level may be 3.

Sample: A sample may be a base unit constituting a block. A sample may be represented by values from 0 to $2^{Bd}-1$ depending on the bit depth (Bd).

A sample may be a pixel or a pixel value.

Hereinafter, the terms "pixel" and "sample" may be used to have the same meaning, and may be used interchangeably with each other.

A Coding Tree Unit (CTU): A CTU may be composed of a single luma component (Y) coding tree block and two chroma component (Cb, Cr) coding tree blocks related to the luma component coding tree block. Further, a CTU may mean information including the above blocks and a syntax element for each of the blocks.

Each coding tree unit (CTU) may be partitioned using one or more partitioning methods, such as a quad tree and a binary tree, so as to configure sub-units, such as a coding unit, a prediction unit, and a transform unit.

"CTU" may be used as a term designating a pixel block, which is a processing unit in an image-decoding and encoding process, as in the case of partitioning of an input image.

Coding Tree Block (CTB): "CTB" may be used as a term designating any one of a Y coding tree block, a Cb coding tree block, and a Cr coding tree block.

Neighbor block: A neighbor block (or neighboring block) means a block adjacent to a target block. The block adjacent to the target block may mean a block, the boundary of which is in contact with the target block, or a block located within a predetermined distance from the target block. The neighbor block may mean a block adjacent to the vertex of the target block. Here, the block adjacent to the vertex of the target block may mean a block vertically adjacent to a neighbor block which is horizontally adjacent to the target block or a block horizontally adjacent to a neighbor block which is vertically adjacent to the target block. A neighbor block may be a reconstructed neighbor block.

Prediction unit: A prediction unit may be a base unit for prediction, such as inter prediction, intra prediction, inter compensation, intra compensation, and motion compensation.

A single prediction unit may be divided into multiple partitions having smaller sizes or sub-prediction units. The multiple partitions may also be base units in the performance of prediction or compensation. The partitions generated by dividing the prediction unit may also be prediction units.

Prediction unit partition: A prediction unit partition may be the shape into which a prediction unit is divided.

Reconstructed neighboring unit: A reconstructed neighboring unit may be a unit which has already been decoded and reconstructed around a target unit.

A reconstructed neighboring unit may be a unit that is spatially adjacent to the target unit or that is temporally adjacent to the target unit.

A reconstructed spatially neighboring unit may be a unit which is included in a current picture and which has already been reconstructed through encoding and/or decoding.

A reconstructed temporally neighboring unit may be a unit which is included in a reference image and which has already been reconstructed through encoding and/or decoding. The location of the reconstructed temporally neighboring unit in the reference image may be identical to that of the target unit in the current picture, or may correspond to the location of the target unit in the current picture.

Parameter set: A parameter set may be header information in the structure of a bitstream. For example, a parameter set may include a sequence parameter set, a picture parameter set, an adaptation parameter set, etc.

Rate-distortion optimization: An encoding apparatus may use rate-distortion optimization so as to provide high coding efficiency by utilizing combinations of the size of a coding unit (CU), a prediction mode, the size of a prediction unit (PU), motion information, and the size of a transform unit (TU).

A rate-distortion optimization scheme may calculate rate-distortion costs of respective combinations so as to select an optimal combination from among the combinations. The rate-distortion costs may be calculated using the following Equation 1. Generally, a combination enabling the rate-distortion cost to be minimized may be selected as the optimal combination in the rate-distortion optimization scheme.

$$D+\lambda*R \quad \text{[Equation 1]}$$

D may denote distortion. D may be the mean of squares of differences (i.e. mean square error) between original transform coefficients and reconstructed transform coefficients in a transform unit.

R may denote the rate, which may denote a bit rate using related-context information.

$\lambda$ denotes a Lagrangian multiplier. R may include not only coding parameter information, such as a prediction mode, motion information, and a coded block flag, but also bits generated due to the encoding of transform coefficients.

An encoding apparatus may perform procedures, such as inter prediction and/or intra prediction, transform, quantization, entropy encoding, inverse quantization (dequantization), and inverse transform so as to calculate precise D and R. These procedures may greatly increase the complexity of the encoding apparatus.

Bitstream: A bitstream may denote a stream of bits including encoded image information.

Parameter set: A parameter set may be header information in the structure of a bitstream.

The parameter set may include at least one of a video parameter set (VPS), a sequence parameter set (SPS), a picture parameter set (PPS), and an adaptation parameter set (APS). Further, the parameter set may include information about a slice header and information about a tile header.

Parsing: Parsing may be the decision on the value of a syntax element, made by performing entropy decoding on a bitstream. Alternatively, the term "parsing" may mean such entropy decoding itself.

Symbol: A symbol may be at least one of the syntax element, the coding parameter, and the transform coefficient of an encoding target unit and/or a decoding target unit. Further, a symbol may be the target of entropy encoding or the result of entropy decoding.

Reference picture: A reference picture may be an image referred to by a unit so as to perform inter prediction or motion compensation. Alternatively, a reference picture may be an image including a reference unit referred to by a target unit so as to perform inter prediction or motion compensation.

Hereinafter, the terms "reference picture" and "reference image" may be used to have the same meaning, and may be used interchangeably with each other.

Reference picture list: A reference picture list may be a list including one or more reference images used for inter prediction or motion compensation.

The types of a reference picture list may include List Combined (LC), List 0 (L0), List 1 (L1), List 2 (L2), List 3 (L3), etc.

For inter prediction, one or more reference picture lists may be used.

Inter-prediction indicator: An inter-prediction indicator may indicate the inter-prediction direction of a target unit. Inter prediction may be one of unidirectional prediction and bidirectional prediction. Alternatively, the inter-prediction indicator may denote the number of reference images used to generate a prediction unit of a target unit. Alternatively, the inter-prediction indicator may denote the number of prediction blocks used for inter prediction or motion compensation of a target unit.

Reference picture index: A reference picture index may be an index indicating a specific reference image in a reference picture list.

Motion vector (MV): A motion vector may be a 2D vector used for inter prediction or motion compensation. A motion vector may mean an offset between an encoding target image/decoding target image and a reference image.

For example, a MV may be represented in a form such as $(mv_x, mv_y)$. $mv_x$ may indicate a horizontal component, and $mv_y$ may indicate a vertical component.

Search range: A search range may be a 2D area in which a search for a MV is performed during inter prediction. For example, the size of the search range may be M×N. M and N may be respective positive integers.

Motion vector candidate: A motion vector candidate may be a block that is a prediction candidate or the motion vector of the block that is a prediction candidate when a motion vector is predicted.

A motion vector candidate may be included in a motion vector candidate list.

Motion vector candidate list: A motion vector candidate list may be a list configured using one or more motion vector candidates.

Motion vector candidate index: A motion vector candidate index may be an indicator for indicating a motion vector candidate in the motion vector candidate list. Alternatively, a motion vector candidate index may be the index of a motion vector predictor.

Motion information: Motion information may be information including at least one of a reference picture list, a reference image, a motion vector candidate, a motion vector candidate index, a merge candidate, and a merge index, as well as a motion vector, a reference picture index, and an inter-prediction indicator.

Merge candidate list: A merge candidate list may be a list configured using merge candidates.

Merge candidate: A merge candidate may be a spatial merge candidate, a temporal merge candidate, a combined merge candidate, a combined bi-prediction merge candidate, a zero-merge candidate, etc. A merge candidate may include motion information such as an inter-prediction indicator, a reference picture index for each list, and a motion vector.

Merge index: A merge index may be an indicator for indicating a merge candidate in a merge candidate list.

A merge index may indicate a reconstructed unit used to derive a merge candidate between a reconstructed unit spatially adjacent to a target unit and a reconstructed unit temporally adjacent to the target unit.

A merge index may indicate at least one of pieces of motion information of a merge candidate.

Transform unit: A transform unit may be the base unit of residual signal encoding and/or residual signal decoding, such as transform, inverse transform, quantization, dequantization, transform coefficient encoding, and transform coefficient decoding. A single transform unit may be partitioned into multiple transform units having smaller sizes.

Scaling: Scaling may denote a procedure for multiplying a factor by a transform coefficient level.

As a result of scaling of the transform coefficient level, a transform coefficient may be generated. Scaling may also be referred to as "dequantization".

Quantization Parameter (QP): A quantization parameter may be a value used to generate a transform coefficient level for a transform coefficient in quantization. Alternatively, a quantization parameter may also be a value used to generate a transform coefficient by scaling the transform coefficient level in dequantization. Alternatively, a quantization parameter may be a value mapped to a quantization step size.

Delta quantization parameter: A delta quantization parameter is a differential value between a predicted quantization parameter and the quantization parameter of an encoding/decoding target unit.

Scan: Scan may denote a method for aligning the order of coefficients in a unit, a block or a matrix. For example, a method for aligning a 2D array in the form of a one-dimensional (1D) array may be referred to as a "scan". Alternatively, a method for aligning a 1D array in the form of a 2D array may also be referred to as a "scan" or an "inverse scan".

Transform coefficient: A transform coefficient may be a coefficient value generated as an encoding apparatus performs a transform. Alternatively, the transform coefficient may be a coefficient value generated as a decoding apparatus performs at least one of entropy decoding and dequantization.

A quantized level or a quantized transform coefficient level in which quantization is applied to a transform coefficient or a residual signal may also be included in the meaning of the term "transform coefficient".

Quantized level: A quantized level may be a value generated as the encoding apparatus performs quantization on a transform coefficient or a residual signal. Alternatively, the quantized level may be a value that is the target of dequantization as the decoding apparatus performs dequantization.

A quantized transform coefficient level, which is the result of transform and quantization, may also be included in the meaning of a quantized level.

Non-zero transform coefficient: A non-zero transform coefficient may be a transform coefficient having a value other than 0 or a transform coefficient level having a value other than 0. Alternatively, a non-zero transform coefficient may be a transform coefficient, the magnitude of the value of which is not 0, or a transform coefficient level, the magnitude of the value of which is not 0.

Quantization matrix: A quantization matrix may be a matrix used in a quantization or dequantization procedure so as to improve the subjective image quality or objective image quality of an image. A quantization matrix may also be referred to as a "scaling list".

Quantization matrix coefficient: A quantization matrix coefficient may be each element in a quantization matrix. A quantization matrix coefficient may also be referred to as a "matrix coefficient".

Default matrix: A default matrix may be a quantization matrix predefined by the encoding apparatus and the decoding apparatus.

Non-default matrix: A non-default matrix may be a quantization matrix that is not predefined by the encoding apparatus and the decoding apparatus. The non-default matrix may be signaled by the encoding apparatus to the decoding apparatus.

FIG. 1 is a block diagram illustrating the configuration of an embodiment of an encoding apparatus to which the present disclosure is applied.

An encoding apparatus 100 may be an encoder, a video encoding apparatus or an image encoding apparatus. A video may include one or more images (pictures). The encoding apparatus 100 may sequentially encode one or more images of the video.

Referring to FIG. 1, the encoding apparatus 100 includes an inter-prediction unit 110, an intra-prediction unit 120, a switch 115, a subtractor 125, a transform unit 130, a quantization unit 140, an entropy encoding unit 150, a dequantization (inverse quantization) unit 160, an inverse transform unit 170, an adder 175, a filter unit 180, and a reference picture buffer 190.

The encoding apparatus 100 may perform encoding on a target image using an intra mode and/or an inter mode.

Further, the encoding apparatus 100 may generate a bitstream, including information about encoding, via encoding on the target image, and may output the generated bitstream. The generated bitstream may be stored in a computer-readable storage medium and may be streamed through a wired/wireless transmission medium.

When the intra mode is used as a prediction mode, the switch 115 may switch to the intra mode. When the inter mode is used as a prediction mode, the switch 115 may switch to the inter mode.

The encoding apparatus 100 may generate a prediction block of a target block. Further, after the prediction block has been generated, the encoding apparatus 100 may encode a residual between the target block and the prediction block.

When the prediction mode is the intra mode, the intra-prediction unit 120 may use pixels of previously encoded/decoded neighboring blocks around the target block as reference samples. The intra-prediction unit 120 may perform spatial prediction on the target block using the reference samples, and may generate prediction samples for the target block via spatial prediction.

The inter-prediction unit 110 may include a motion prediction unit and a motion compensation unit.

When the prediction mode is an inter mode, the motion prediction unit may search a reference image for the area most closely matching the target block in a motion prediction procedure, and may derive a motion vector for the target block and the found area based on the found area.

The reference image may be stored in the reference picture buffer 190. More specifically, the reference image may be stored in the reference picture buffer 190 when the encoding and/or decoding of the reference image have been processed.

The motion compensation unit may generate a prediction block for the target block by performing motion compensation using a motion vector. Here, the motion vector may be a two-dimensional (2D) vector used for inter-prediction. Further, the motion vector may indicate an offset between the target image and the reference image.

The motion prediction unit and the motion compensation unit may generate a prediction block by applying an interpolation filter to a partial area of a reference image when the motion vector has a value other than an integer. In order to perform inter prediction or motion compensation, it may be determined which one of a skip mode, a merge mode, an advanced motion vector prediction (AMVP) mode, and a current picture reference mode corresponds to a method for predicting the motion of a PU included in a CU, based on the CU, and compensating for the motion, and inter prediction or motion compensation may be performed depending on the mode.

The subtractor 125 may generate a residual block, which is the differential between the target block and the prediction block. A residual block may also be referred to as a "residual signal".

The residual signal may be the difference between an original signal and a prediction signal. Alternatively, the residual signal may be a signal generated by transforming or quantizing the difference between an original signal and a prediction signal or by transforming and quantizing the difference. A residual block may be a residual signal for a block unit.

The transform unit 130 may generate a transform coefficient by transforming the residual block, and may output the generated transform coefficient. Here, the transform coefficient may be a coefficient value generated by transforming the residual block.

When a transform skip mode is used, the transform unit 130 may omit transforming the residual block.

By applying quantization to the transform coefficient, a quantized transform coefficient level or a quantized level may be generated. Hereinafter, in the embodiments, each of the quantized transform coefficient level and the quantized level may also be referred to as a 'transform coefficient'.

The quantization unit 140 may generate a quantized transform coefficient level or a quantized level by quantizing the transform coefficient depending on quantization parameters. The quantization unit 140 may output the quantized transform coefficient level or the quantized level that is generated. In this case, the quantization unit 140 may quantize the transform coefficient using a quantization matrix.

The entropy encoding unit 150 may generate a bitstream by performing probability distribution-based entropy encoding based on values, calculated by the quantization unit 140, and/or coding parameter values, calculated in the encoding procedure. The entropy encoding unit 150 may output the generated bitstream.

The entropy encoding unit 150 may perform entropy encoding on information about the pixels of the image and information required to decode the image. For example, the information required to decode the image may include syntax elements or the like.

The coding parameters may be information required for encoding and/or decoding. The coding parameters may include information encoded by the encoding apparatus 100 and transferred from the encoding apparatus 100 to a decoding apparatus, and may also include information that may be derived in the encoding or decoding procedure. For example, information transferred to the decoding apparatus may include syntax elements.

For example, the coding parameters may include values or statistical information, such as a prediction mode, a motion vector, a reference picture index, an encoding block pattern, the presence or absence of a residual signal, a transform coefficient, a quantized transform coefficient, a quantization parameter, a block size, and block partition information. The prediction mode may be an intra-prediction mode or an inter-prediction mode.

The residual signal may denote the difference between the original signal and a prediction signal. Alternatively, the residual signal may be a signal generated by transforming the difference between the original signal and the prediction signal. Alternatively, the residual signal may be a signal generated by transforming and quantizing the difference between the original signal and the prediction signal.

When entropy encoding is applied, fewer bits may be assigned to more frequently occurring symbols, and more bits may be assigned to rarely occurring symbols. As symbols are represented by means of this assignment, the size of a bit string for target symbols to be encoded may be reduced. Therefore, the compression performance of video encoding may be improved through entropy encoding.

Further, for entropy encoding, the entropy encoding unit 150 may use a coding method such as exponential Golomb, Context-Adaptive Variable Length Coding (CAVLC), or Context-Adaptive Binary Arithmetic Coding (CABAC). For example, the entropy encoding unit 150 may perform entropy encoding using a Variable Length Coding/Code (VLC) table. For example, the entropy encoding unit 150 may derive a binarization method for a target symbol. Further, the entropy encoding unit 150 may derive a probability model for a target symbol/bin. The entropy encoding unit 150 may perform arithmetic coding using the derived binarization method, a probability model, and a context model.

The entropy encoding unit 150 may transform the coefficient of the form of a 2D block into the form of a 1D vector through a transform coefficient scanning method so as to encode a transform coefficient level.

The coding parameters may include not only information (or a flag or an index), such as a syntax element, which is encoded by the encoding apparatus and is signaled by the encoding apparatus to the decoding apparatus, but also information derived in an encoding or decoding process. Further, the coding parameters may include information required so as to encode or decode images. For example, the coding parameters may include at least one or combinations of the size of a unit/block, the depth of a unit/block, partition information of a unit/block, the partition structure of a unit/block, information indicating whether a unit/block is partitioned in a quad-tree structure, information indicating whether a unit/block is partitioned in a binary tree structure, the partitioning direction of a binary tree structure (horizontal direction or vertical direction), the partitioning form of a binary tree structure (symmetrical partitioning or asymmetrical partitioning), a prediction scheme (intra prediction or inter prediction), an intra-prediction mode/direction, a reference sample filtering method, a prediction block filtering method, a prediction block boundary filtering method, a filter tap for filtering, a filter coefficient for filtering, an inter-prediction mode, motion information, a motion vector, a reference picture index, an inter-prediction direction, an inter-prediction indicator, a reference picture list, a reference image, a motion vector predictor, a motion vector prediction candidate, a motion vector candidate list, information indicating whether a merge mode is used, a merge candidate, a merge candidate list, information indicating whether a skip mode is used, the type of an interpolation filter, the tap of an interpolation filter, the filter coefficient of an interpolation filter, the magnitude of a motion vector, accuracy of motion vector representation, a transform type, a transform size, information indicating whether a primary transform is used, information indicating whether an additional (secondary) transform is used, a primary transform index, a secondary transform index, information indicating the presence or absence of a residual signal, a coded block pattern, a coded block flag, a quantization parameter, a quantization matrix, information about an intra-loop filter, information indicating whether an intra-loop filter is applied, the coefficient of an intra-loop filter, the tap of an intra-loop filter, the shape/form of an intra-loop filter, information indicating whether a deblocking filter is applied, the coefficient of a deblocking filter, the tap of a deblocking filter, deblocking filter strength, the shape/form of a deblocking filter, information indicating whether an adaptive sample offset is applied, the value of an adaptive sample offset, the category of an adaptive sample offset, the type of an adaptive sample offset, information indicating whether an adaptive in-loop filter is applied, the coefficient of an adaptive in-loop filter, the tap of an adaptive in-loop filter, the shape/form of an adaptive in-loop filter, a binarization/inverse binarization method, a context model, a context model decision method, a context model update method, information indicating whether a regular mode is performed, information whether a bypass mode is performed, a context bin, a bypass bin, a transform coefficient, a transform coefficient level, a transform coefficient level scanning method, an image display/output order, slice identification information, a slice type, slice partition information, tile identification information, a tile type, tile partition information, a picture type, bit depth, information about a luma signal, and information about a chroma signal.

Here, signaling a flag or an index may mean that the encoding apparatus 100 includes an entropy-encoded flag or an entropy-encoded index, generated by performing entropy encoding on the flag or index, in a bitstream, and that the decoding apparatus 200 acquires a flag or an index by performing entropy decoding on the entropy-encoded flag or the entropy-encoded index, extracted from the bitstream.

Since the encoding apparatus 100 performs encoding via inter prediction, the encoded target image may be used as a reference image for additional image(s) to be subsequently processed. Therefore, the encoding apparatus 100 may reconstruct or decode the encoded target image and store the reconstructed or decoded image as a reference image in the reference picture buffer 190. For decoding, dequantization and inverse transform on the encoded target image may be processed.

The quantized level may be inversely quantized by the dequantization unit 160, and may be inversely transformed by the inverse transform unit 170. The coefficient that has been inversely quantized and/or inversely transformed may be added to the prediction block by the adder 175. The inversely quantized and/or inversely transformed coefficient and the prediction block are added, and then a reconstructed block may be generated. Here, the inversely quantized and/or inversely transformed coefficient may denote a coefficient on which one or more of dequantization and inverse transform are performed, and may also denote a reconstructed residual block.

The reconstructed block may be subjected to filtering through the filter unit 180. The filter unit 180 may apply one or more of a deblocking filter, a Sample Adaptive Offset (SAO) filter, and an Adaptive Loop Filter (ALF) to the reconstructed block or a reconstructed picture. The filter unit 180 may also be referred to as an "in-loop filter".

The deblocking filter may eliminate block distortion occurring at the boundaries between blocks. In order to determine whether to apply the deblocking filter, the number of columns or rows which are included in a block and which include pixel(s) based on which it is determined whether to apply the deblocking filter to a target block may be decided on. When the deblocking filter is applied to the target block, the applied filter may differ depending on the strength of the required deblocking filtering. In other words, among different filters, a filter decided on in consideration of the strength of deblocking filtering may be applied to the target block.

The SAO may add a suitable offset to the values of pixels to compensate for coding error. The SAO may perform, for the image to which deblocking is applied, correction that uses an offset in the difference between an original image and the image to which deblocking is applied, on a pixel basis. A method for dividing the pixels included in the image into a certain number of regions, determining a region to which an offset is to be applied, among the divided regions, and applying an offset to the determined region may be used, and a method for applying an offset in consideration of edge information of each pixel may also be used.

The ALF may perform filtering based on a value obtained by comparing a reconstructed image with an original image. After pixels included in an image have been divided into a predetermined number of groups, filters to be applied to the groups may be determined, and filtering may be differentially performed for respective groups. Information related to whether to apply an adaptive loop filter may be signaled for each CU. The shapes and filter coefficients of ALFs to be applied to respective blocks may differ for respective blocks.

The reconstructed block or the reconstructed image subjected to filtering through the filter unit 180 may be stored in the reference picture buffer 190. The reconstructed block subjected to filtering through the filter unit 180 may be a part of a reference picture. In other words, the reference picture may be a reconstructed picture composed of reconstructed blocks subjected to filtering through the filter unit 180. The stored reference picture may be subsequently used for inter prediction.

Figure 2:
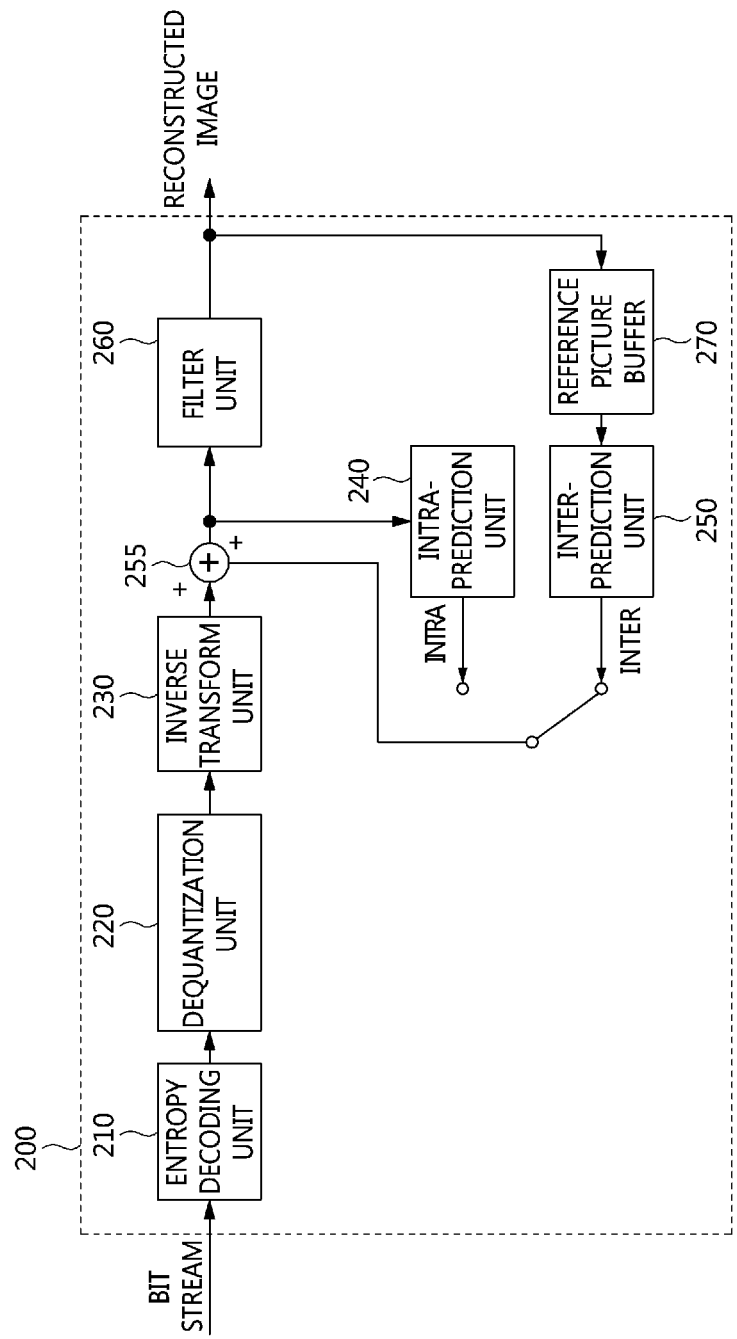
FIG. 2 is a block diagram illustrating the configuration of an embodiment of a decoding apparatus to which the present disclosure is applied.

FIG. 2 is a block diagram illustrating the configuration of an embodiment of a decoding apparatus to which the present disclosure is applied.

A decoding apparatus 200 may be a decoder, a video decoding apparatus or an image decoding apparatus.

Referring to FIG. 2, the decoding apparatus 200 may include an entropy decoding unit 210, a dequantization (inverse quantization) unit 220, an inverse transform unit 230, an intra-prediction unit 240, an inter-prediction unit 250, an adder 255, a filter unit 260, and a reference picture buffer 270.

The decoding apparatus 200 may receive a bitstream output from the encoding apparatus 100. The decoding apparatus 200 may receive a bitstream stored in a computer-readable storage medium, and may receive a bitstream that is streamed through a wired/wireless transmission medium.

The decoding apparatus 200 may perform decoding on the bitstream in an intra mode and/or an inter mode. Further, the decoding apparatus 200 may generate a reconstructed image or a decoded image via decoding, and may output the reconstructed image or decoded image.

For example, switching to an intra mode or an inter mode based on the prediction mode used for decoding may be performed by a switch. When the prediction mode used for decoding is an intra mode, the switch may be operated to switch to the intra mode. When the prediction mode used for decoding is an inter mode, the switch may be operated to switch to the inter mode.

The decoding apparatus 200 may acquire a reconstructed residual block by decoding the input bitstream, and may generate a prediction block. When the reconstructed residual block and the prediction block are acquired, the decoding apparatus 200 may generate a reconstructed block, which is the target to be decoded, by adding the reconstructed residual block to the prediction block.

The entropy decoding unit 210 may generate symbols by performing entropy decoding on the bitstream based on the probability distribution of a bitstream. The generated symbols may include quantized level-format symbols. Here, the entropy decoding method may be similar to the above-described entropy encoding method. That is, the entropy decoding method may be the reverse procedure of the above-described entropy encoding method.

The quantized coefficient may be inversely quantized by the dequantization unit 220. The dequantization unit 220 may generate an inversely quantized coefficient by performing dequantization on the quantized coefficient. Further, the inversely quantized coefficient may be inversely transformed by the inverse transform unit 230. The inverse transform unit 230 may generate a reconstructed residual block by performing an inverse transform on the inversely quantized coefficient. As a result of performing dequantization and the inverse transform on the quantized coefficient, the reconstructed residual block may be generated. Here, the dequantization unit 220 may apply a quantization matrix to the quantized coefficient when generating the reconstructed residual block.

When the intra mode is used, the intra-prediction unit 240 may generate a prediction block by performing spatial prediction that uses the pixel values of previously decoded neighboring blocks around a target block.

The inter-prediction unit 250 may include a motion compensation unit. Alternatively, the inter-prediction unit 250 may be designated as a "motion compensation unit".

When the inter mode is used, the motion compensation unit may generate a prediction block by performing motion compensation that uses a motion vector and a reference image stored in the reference picture buffer 270.

The motion compensation unit may apply an interpolation filter to a partial area of the reference image when the motion vector has a value other than an integer, and may generate a prediction block using the reference image to which the interpolation filter is applied. In order to perform motion compensation, the motion compensation unit may determine which one of a skip mode, a merge mode, an Advanced Motion Vector Prediction (AMVP) mode, and a current picture reference mode corresponds to the motion compensation method used for a PU included in a CU, based on the CU, and may perform motion compensation depending on the determined mode.

The reconstructed residual block and the prediction block may be added to each other by the adder 255. The adder 255 may generate a reconstructed block by adding the reconstructed residual block to the prediction block.

The reconstructed block may be subjected to filtering through the filter unit 260. The filter unit 260 may apply at least one of a deblocking filter, an SAO filter, and an ALF to the reconstructed block or the reconstructed picture.

The reconstructed block subjected to filtering through the filter unit 260 may be stored in the reference picture buffer 270. The reconstructed block subjected to filtering through the filter unit 260 may be a part of a reference picture. In other words, the reference image may be an image composed of reconstructed blocks subjected to filtering through the filter unit 260. The stored reference image may be subsequently used for inter prediction.

Figure 3:
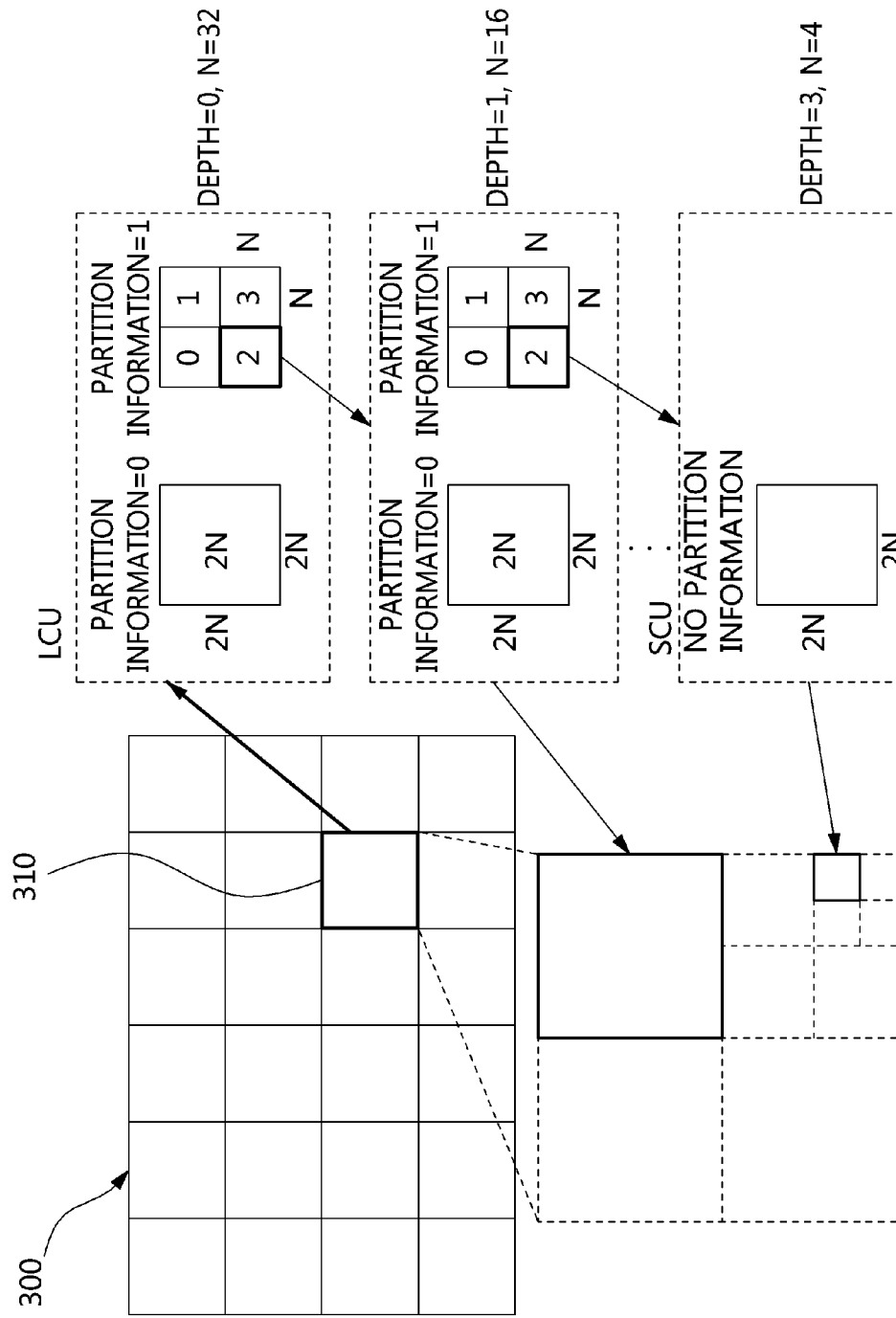
FIG. 3 is a diagram schematically illustrating the partition structure of an image when the image is encoded and decoded.

FIG. 3 is a diagram schematically illustrating the partition structure of an image when the image is encoded and decoded.

FIG. 3 may schematically illustrate an example in which a single unit is partitioned into multiple sub-units.

In order to efficiently partition the image, a Coding Unit (CU) may be used in encoding and decoding. The term "unit" may be used to collectively designate 1) a block including image samples and 2) a syntax element. For example, the "partitioning of a unit" may mean the "partitioning of a block corresponding to a unit".

A CU may be used as a base unit for image encoding/decoding. A CU may be used as a unit to which one mode selected from an intra mode and an inter mode in image encoding/decoding is applied. In other words, in image encoding/decoding, which one of an intra mode and an inter mode is to be applied to each CU may be determined.

Further, a CU may be a base unit in prediction, transform, quantization, inverse transform, dequantization, and encoding/decoding of transform coefficients.

Referring to FIG. 3, an image 200 may be sequentially partitioned into units corresponding to a Largest Coding Unit (LCU), and the partition structure of the image 300 may be determined according to the LCU. Here, the LCU may be used to have the same meaning as a Coding Tree Unit (CTU).

The partitioning of a unit may mean the partitioning of a block corresponding to the unit. Block partition information may include depth information about the depth of a unit. The depth information may indicate the number of times the unit is partitioned and/or the degree to which the unit is partitioned. A single unit may be hierarchically partitioned into sub-units while having depth information based on a tree structure. Each of partitioned sub-units may have depth information. The depth information may be information indicating the size of a CU. The depth information may be stored for each CU. Each CU may have depth information.

The partition structure may mean the distribution of Coding Units (CUs) to efficiently encode the image in an LCU 310. Such a distribution may be determined depending on whether a single CU is to be partitioned into multiple CUs. The number of CUs generated by partitioning may be a positive integer of 2 or more, including 2, 3, 4, 8, 16, etc. The horizontal size and the vertical size of each of CUs generated by the partitioning may be less than the horizontal size and the vertical size of a CU before being partitioned, depending on the number of CUs generated by partitioning.

Each partitioned CU may be recursively partitioned into four CUs in the same way. Via the recursive partitioning, at least one of the horizontal size and the vertical size of each partitioned CU may be reduced compared to at least one of the horizontal size and the vertical size of the CU before being partitioned.

The partitioning of a CU may be recursively performed up to a predefined depth or a predefined size. For example, the depth of an LCU may be 0, and the depth of a Smallest Coding Unit (SCU) may be a predefined maximum depth. Here, as described above, the LCU may be the CU having the maximum coding unit size, and the SCU may be the CU having the minimum coding unit size.

Partitioning may start at the LCU 310, and the depth of a CU may be increased by 1 whenever the horizontal and/or vertical sizes of the CU are reduced by partitioning.

For example, for respective depths, a CU that is not partitioned may have a size of 2N×2N. Further, in the case of a CU that is partitioned, a CU having a size of 2N×2N may be partitioned into four CUs, each having a size of N×N. The value of N may be halved whenever the depth is increased by 1.

Referring to FIG. 3, an LCU having a depth of 0 may have 64×64 pixels or 64×64 blocks. 0 may be a minimum depth. An SCU having a depth of 3 may have 8×8 pixels or 8×8 blocks. 3 may be a maximum depth. Here, a CU having 64×64 blocks, which is the LCU, may be represented by a depth of 0. A CU having 32×32 blocks may be represented by a depth of 1. A CU having 16×16 blocks may be represented by a depth of 2. A CU having 8×8 blocks, which is the SCU, may be represented by a depth of 3.

Information about whether the corresponding CU is partitioned may be represented by the partition information of the CU. The partition information may be 1-bit information. All CUs except the SCU may include partition information. For example, the value of the partition information of a CU that is not partitioned may be 0. The value of the partition information of a CU that is partitioned may be 1.

For example, when a single CU is partitioned into four CUs, the horizontal size and vertical size of each of four CUs generated by partitioning may be half the horizontal size and the vertical size of the CU before being partitioned. When a CU having a 32×32 size is partitioned into four CUs, the size of each of four partitioned CUs may be 16×16. When a single CU is partitioned into four CUs, it may be considered that the CU has been partitioned in a quad-tree structure.

For example, when a single CU is partitioned into two CUs, the horizontal size or the vertical size of each of two CUs generated by partitioning may be half the horizontal size or the vertical size of the CU before being partitioned. When a CU having a 32×32 size is vertically partitioned into two CUs, the size of each of two partitioned CUs may be 16×32. When a single CU is partitioned into two CUs, it may be considered that the CU has been partitioned in a binary-tree structure.

In addition to quad-tree partitioning, binary-tree partitioning may be applied to the LCU 310 of FIG. 3.

Figure 4:
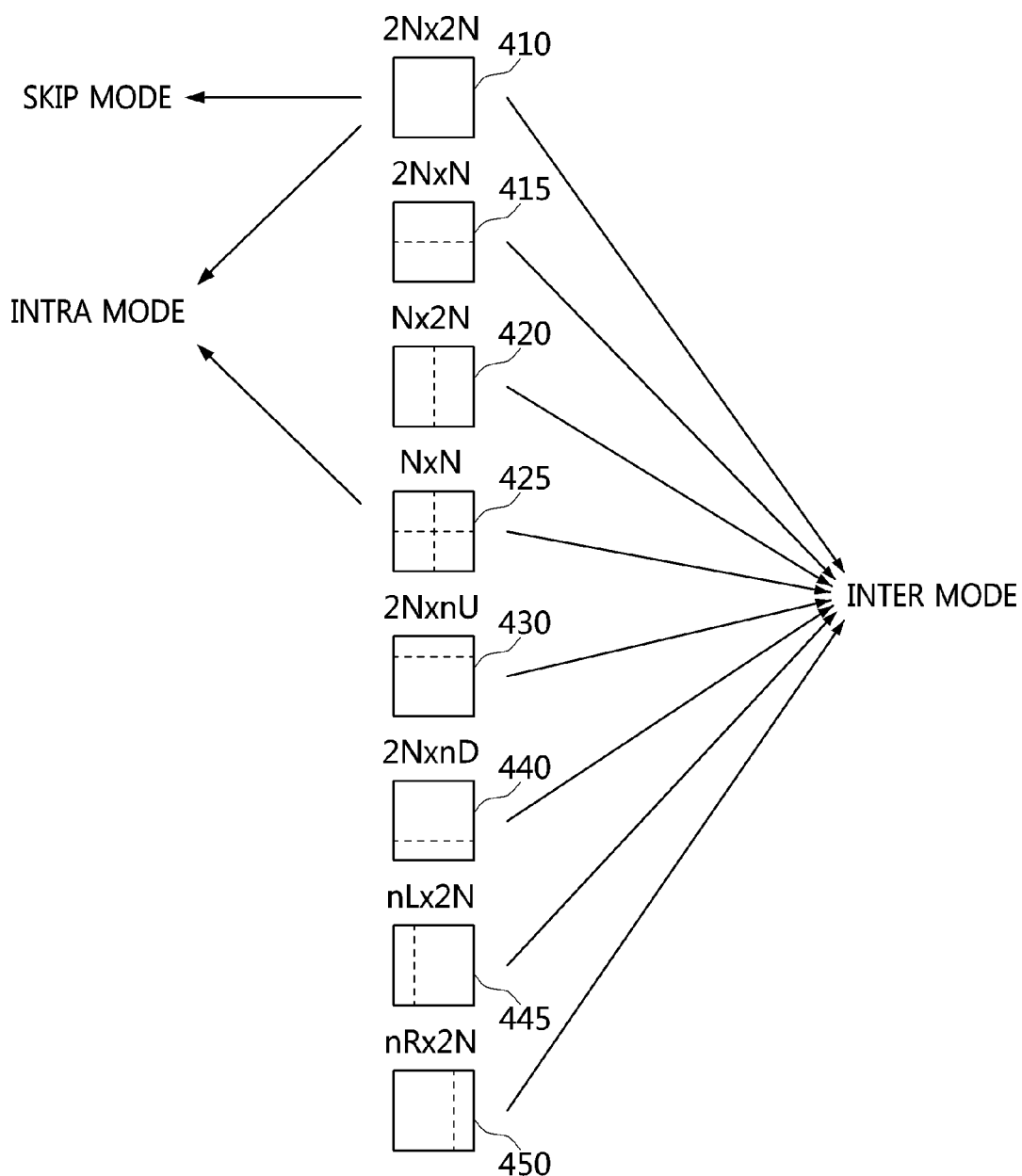
FIG. 4 is a diagram illustrating the form of a Prediction Unit (PU) that a Coding Unit (CU) can include.

FIG. 4 is a diagram illustrating the form of a Prediction Unit (PU) that a Coding Unit (CU) can include.

When, among CUs partitioned from an LCU, a CU, which is not partitioned any further, may be divided into one or more Prediction Units (PUs). Such division is also referred to as "partitioning".

A PU may be a base unit for prediction. A PU may be encoded and decoded in any one of a skip mode, an inter mode, and an intra mode. A PU may be partitioned into various shapes depending on respective modes. For example, the target block, described above with reference to FIG. 1, and the target block, described above with reference to FIG. 2, may each be a PU.

In a skip mode, partitioning may not be present in a CU. In the skip mode, a 2N×2N mode 410, in which the sizes of a PU and a CU are identical to each other, may be supported without partitioning.

In an inter mode, 8 types of partition shapes may be present in a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported.

In an intra mode, the 2N×2N mode 410, the N×N mode 425, a 2N×N mode and a N×2N mode may be supported.

In the 2N×2N mode 410, a PU having a size of 2N×2N may be encoded. The PU having a size of 2N×2N may mean a PU having a size identical to that of the CU. For example, the PU having a size of 2N×2N may have a size of 64×64, 32×32, 16×16 or 8×8.

In the N×N mode 425, a PU having a size of N×N may be encoded.

For example, in intra prediction, when the size of a PU is 8×8, four partitioned PUs may be encoded. The size of each partitioned PU may be 4×4.

When a PU is encoded in an intra mode, the PU may be encoded using any one of multiple intra-prediction modes. For example, HEVC technology may provide 35 intra-prediction modes, and the PU may be encoded in any one of the 35 intra-prediction modes.

Which one of the 2N×2N mode 410 and the N×N mode 425 is to be used to encode the PU may be determined based on rate-distortion cost.

The encoding apparatus 100 may perform an encoding operation on a PU having a size of 2N×2N. Here, the encoding operation may be the operation of encoding the PU in each of multiple intra-prediction modes that can be used by the encoding apparatus 100. Through the encoding operation, the optimal intra-prediction mode for a PU having a size of 2N×2N may be derived. The optimal intra-prediction mode may be an intra-prediction mode in which a minimum rate-distortion cost occurs upon encoding the PU having a size of 2N×2N, among multiple intra-prediction modes that can be used by the encoding apparatus 100.

Further, the encoding apparatus 100 may sequentially perform an encoding operation on respective PUs obtained from N×N partitioning. Here, the encoding operation may be the operation of encoding a PU in each of multiple intra-prediction modes that can be used by the encoding apparatus 100. By means of the encoding operation, the optimal intra-prediction mode for the PU having a size of N×N may be derived. The optimal intra-prediction mode may be an intra-prediction mode in which a minimum rate-distortion cost occurs upon encoding the PU having a size of N×N, among multiple intra-prediction modes that can be used by the encoding apparatus 100.

Figure 5:
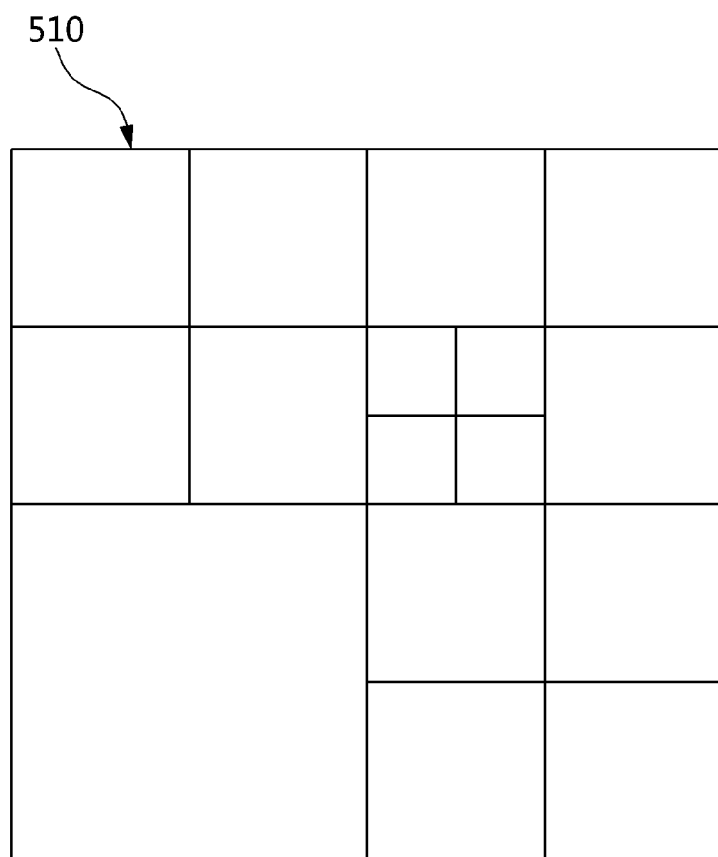
FIG. 5 is a diagram illustrating the form of a Transform Unit (TU) that can be included in a CU.

FIG. 5 is a diagram illustrating the form of a Transform Unit (TU) that can be included in a CU.

A Transform Unit (TU) may have a base unit that is used for a procedure, such as transform, quantization, inverse transform, dequantization, entropy encoding, and entropy decoding, in a CU. A TU may have a square shape or a rectangular shape.

Among CUs partitioned from the LCU, a CU which is not partitioned into CUs any further may be partitioned into one or more TUs. Here, the partition structure of a TU may be a quad-tree structure. For example, as shown in FIG. 5, a single CU 510 may be partitioned one or more times depending on the quad-tree structure. By means of this partitioning, the single CU 510 may be composed of TUs having various sizes.

In the encoding apparatus 100, a Coding Tree Unit (CTU) having a size of 64×64 may be partitioned into multiple smaller CUs by a recursive quad-tree structure. A single CU may be partitioned into four CUs having the same size. Each CU may be recursively partitioned, and may have a quad-tree structure.

A CU may have a given depth. When the CU is partitioned, CUs resulting from partitioning may have a depth increased from the depth of the partitioned CU by 1.

For example, the depth of a CU may have a value ranging from 0 to 3. The size of the CU may range from a size of 64×64 to a size of 8×8 depending on the depth of the CU.

By the recursive partitioning of a CU, an optimal partitioning method that incurs a minimum rate-distortion cost may be selected.

Figure 6:
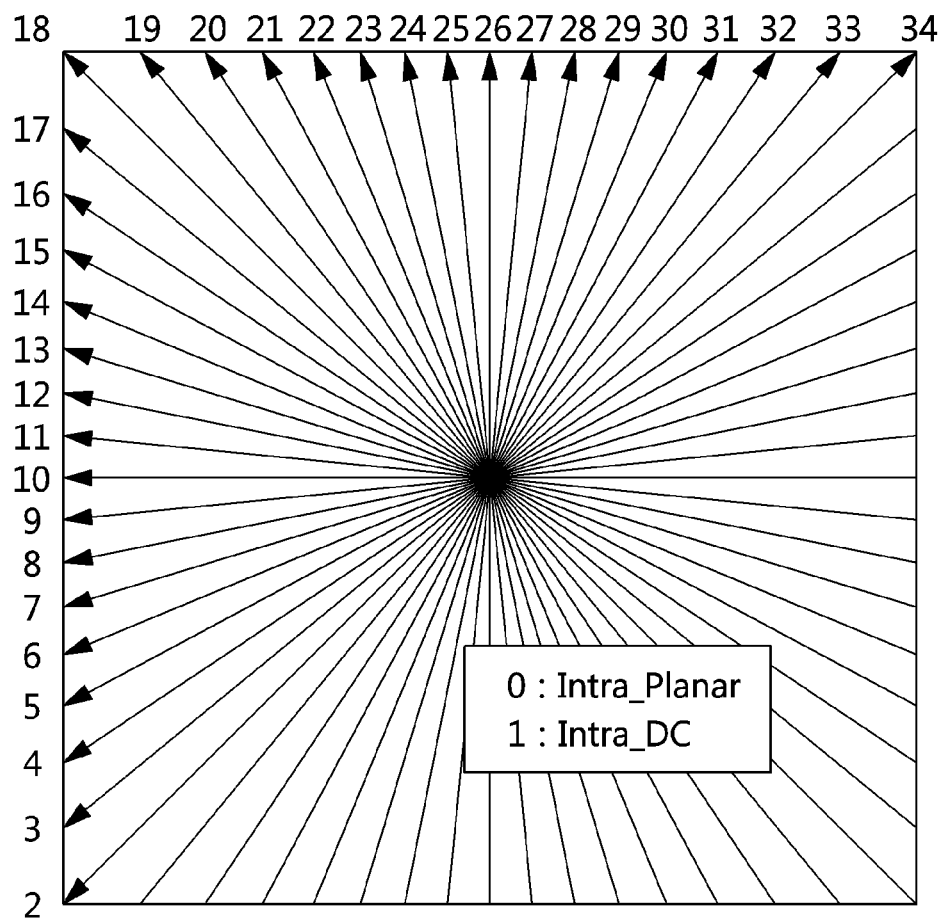
FIG. 6 is a diagram for explaining an embodiment of an intra-prediction procedure.

FIG. 6 is a diagram for explaining an embodiment of an intra-prediction process.

Arrows radially extending from the center of the graph in FIG. 6 indicate the prediction directions of intra-prediction modes. Further, numbers appearing near the arrows indicate examples of mode values assigned to intra-prediction modes or to the prediction directions of the intra-prediction modes.

Intra encoding and/or decoding may be performed using reference samples of blocks neighboring a target block. The neighboring blocks may be neighboring reconstructed blocks. For example, intra encoding and/or decoding may be performed using the values of reference samples which are included in each neighboring reconstructed block or the coding parameters of the neighboring reconstructed block.

The encoding apparatus 100 and/or the decoding apparatus 200 may generate a prediction block by performing intra prediction on a target block based on information about samples in a target image. When intra prediction is performed, the encoding apparatus 100 and/or the decoding apparatus 200 may generate a prediction block for the target block by performing intra prediction based on information about samples in the target image. When intra prediction is performed, the encoding apparatus 100 and/or the decoding apparatus 200 may perform directional prediction and/or non-directional prediction based on at least one reconstructed reference sample.

A prediction block may be a block generated as a result of performing intra prediction. A prediction block may correspond to at least one of a CU, a PU, and a TU.

The unit of a prediction block may have a size corresponding to at least one of a CU, a PU, and a TU. The prediction block may have a square shape having a size of 2N×2N or N×N. The size of N×N may include sizes of 4×4, 8×8, 16×16, 32×32, 64×64, or the like.

Alternatively, a prediction block may a rectangular block having a size of M×N, such as 2×8, 4×8, 2×16, 4×16, 8×16, or the like.

Intra prediction may be performed in consideration of the intra-prediction mode for the target block. The number of intra-prediction modes that the target block can have may be a predefined fixed value, and may be a value determined differently depending on the attributes of a prediction block. For example, the attributes of the prediction block may include the size of the prediction block, the type of prediction block, etc.

For example, the number of intra-prediction modes may be fixed at 35 regardless of the size of a prediction block. Alternatively, the number of intra-prediction modes may be, for example, 3, 5, 9, 17, 34, 35, or 36.

The intra-prediction modes may be non-directional modes or directional modes. For example, the intra-prediction modes may include two non-directional modes and 33 directional modes, as shown in FIG. 6.

The directional mode may include a DC mode and a planar mode. For example, a value of the DC mode may be 1. A value of the planar mode may be 0.

The directional modes may be prediction modes having a specific direction or a specific angle. Among the plurality of the intra prediction modes, remaining modes except for the DC mode and the planar mode may be directional modes.

The intra-prediction modes may each be represented by at least one of a mode number, a mode value, and a mode angle. The number of intra-prediction modes may be M. The value of M may be 1 or more. In other words, the number of intra-prediction modes may be M, which includes the number of non-directional modes and the number of directional modes.

The number of intra-prediction modes may be fixed to M regardless of the size of a block. Alternatively, the number of intra-prediction modes may differ depending on the size of a block and/or the type of color component. For example, the number of prediction modes may differ depending on whether a color component is a luma signal or a chroma signal. For example, the larger the size of the block, the greater the number of intra-prediction modes. Alternatively, the number of intra-prediction modes corresponding to a luma component block may be greater than the number of intra-prediction modes corresponding to a chroma component block.

For example, in a vertical mode having a mode value of 26, prediction may be performed in a vertical direction based on the pixel value of a reference sample.

Even in directional modes other than the above-described mode, the encoding apparatus 100 and the decoding apparatus 200 may perform intra prediction on a target unit using reference samples depending on angles corresponding to the directional modes.

Intra-prediction modes located on a right side with respect to the vertical mode may be referred to as 'vertical-right modes'. Intra-prediction modes located below the horizontal mode may be referred to as 'horizontal-below modes'. For example, in FIG. 6, the intra-prediction modes in which a mode value is one of 27, 28, 29, 30, 31, 32, 33, and 34 may be vertical-right modes 613. Intra-prediction modes in which a mode value is one of 2, 3, 4, 5, 6, 7, 8, and 9 may be horizontal-below modes 616.

The number of above-described intra-prediction modes and the mode values of respective intra-prediction modes are merely exemplary. The number of above-described intra-prediction modes and the mode values of respective intra-prediction modes may be defined differently depending on the embodiments, implementation and/or requirements.

In order to perform intra prediction on a target block, the step of checking whether samples included in a reconstructed neighboring block can be used as reference samples of a target block may be performed. When a sample that cannot be used as a reference sample of the current block is present among samples in the neighboring block, a value generated via copying and/or interpolation that uses at least one sample value, among the samples included in the reconstructed neighboring block, may replace the sample value of the sample that cannot be used as the reference sample. When the value generated via copying and/or interpolation replaces the sample value of the existing sample, the sample may be used as the reference sample of the target block.

In intra prediction, a filter may be applied to at least one of a reference sample and a prediction sample based on at least one of the intra-prediction mode and the size of the target block.

When the intra-prediction mode is a planar mode, a sample value of a prediction target block may be generated using a weighted sum of an above reference sample of the target block, a left reference sample of the target block, an above-right reference sample of the target block, and a below-left reference sample of the target block depending on the location of the prediction target sample in the prediction block when the prediction block of the target block is generated.

When the intra-prediction mode is a DC mode, the average of reference samples above the target block and the reference samples to the left of the target block may be used when the prediction block of the target block is generated.

When the intra-prediction mode is a directional mode, a prediction block may be generated using the above reference samples, left reference samples, above-right reference sample and/or below-left reference sample of the target block.

In order to generate the above-described prediction sample, real-number-based interpolation may be performed.

The intra-prediction mode of the target block may perform prediction from intra prediction of a neighboring block adjacent to the target block, and the information used for prediction may be entropy-encoded/decoded.

For example, when the intra-prediction modes of the target block and the neighboring block are identical to each other, it may be signaled, using a predefined flag, that the intra-prediction modes of the target block and the neighboring block are identical.

For example, an indicator for indicating an intra-prediction mode identical to that of the target block, among intra-prediction modes of multiple neighboring blocks, may be signaled.

When the intra-prediction modes of the target block and the neighboring block are different from each other, the intra-prediction mode information of the target block may be entropy-encoded/decoded based on the intra-prediction mode of the neighboring block.

Figure 7:
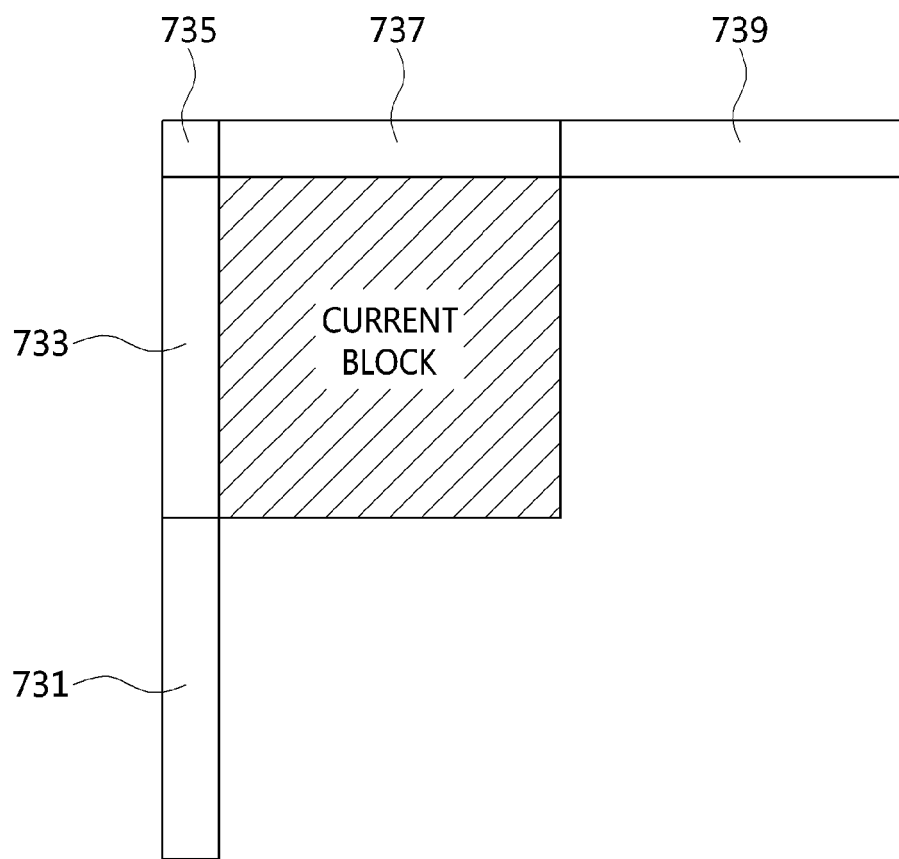
FIG. 7 is a diagram for explaining the locations of reference samples used in an intra-prediction procedure.

FIG. 7 is a diagram for explaining the locations of reference samples used in an intra-prediction procedure.

FIG. 7 illustrates the locations of reference samples used for intra prediction of a target block. Referring to FIG. 7, reconstructed reference samples used for intra prediction of the target block may include below-left reference samples 731, left reference samples 733, an above-left corner reference sample 735, above reference samples 737, and above-right reference samples 739.

For example, the left reference samples 733 may mean reconstructed reference pixels adjacent to the left side of the target block. The above reference samples 737 may mean reconstructed reference pixels adjacent to the top of the target block. The above-left corner reference sample 735 may mean a reconstructed reference pixel located at the above-left corner of the target block. The below-left reference samples 731 may mean reference samples located below a left sample line composed of the left reference samples 733, among samples located on the same line as the left sample line. The above-right reference samples 739 may mean reference samples located to the right of an above sample line composed of the above reference samples 737, among samples located on the same line as the above sample line.

When the size of a target block is N×N, the numbers of the below-left reference samples 731, the left reference samples 733, the above reference samples 737, and the above-right reference samples 739 may each be N.

By performing intra prediction on the target block, a prediction block may be generated. The generation of the prediction block may include the determination of the values of pixels in the prediction block. The sizes of the target block and the prediction block may be equal.

The reference samples used for intra prediction of the target block may vary depending on the intra-prediction mode of the target block. The direction of the intra-prediction mode may represent a dependence relationship between the reference samples and the pixels of the prediction block. For example, the value of a specified reference sample may be used as the values of one or more specified pixels in the prediction block. In this case, the specified reference sample and the one or more specified pixels in the prediction block may be the sample and pixels which are positioned in a straight line in the direction of an intra-prediction mode. In other words, the value of the specified reference sample may be copied as the value of a pixel located in a direction reverse to the direction of the intra-prediction mode. Alternatively, the value of a pixel in the prediction block may be the value of a reference sample located in the direction of the intra-prediction mode with respect to the location of the pixel.

In an example, when the intra-prediction mode of a target block is a vertical mode having a mode value of 26, the above reference samples 737 may be used for intra prediction. When the intra-prediction mode is the vertical mode, the value of a pixel in the prediction block may be the value of a reference sample vertically located above the location of the pixel. Therefore, the above reference samples 737 adjacent to the top of the target block may be used for intra prediction. Furthermore, the values of pixels in one row of the prediction block may be identical to those of the above reference samples 737.

In an example, when the mode value of the intra-prediction mode of the current block is 18, at least some of the left reference samples 733, the above-left corner reference sample 735, and at least some of the above reference samples 737 may be used for intra prediction. When the mode value of the intra-prediction mode is 18, the value of a pixel in the prediction block may be the value of a reference sample diagonally located at the above-left corner of the pixel.

The number of reference samples used to determine the pixel value of one pixel in the prediction block may be either 1, or 2 or more.

As described above, the pixel value of a pixel in the prediction block may be determined depending on the location of the pixel and the location of a reference sample indicated by the direction of the intra-prediction mode. When the location of the pixel and the location of the reference sample indicated by the direction of the intra-prediction mode are integer positions, the value of one reference sample indicated by an integer position may be used to determine the pixel value of the pixel in the prediction block.

When the location of the pixel and the location of the reference sample indicated by the direction of the intra-prediction mode are not integer positions, an interpolated reference sample based on two reference samples closest to the location of the reference sample may be generated. The value of the interpolated reference sample may be used to determine the pixel value of the pixel in the prediction block. In other words, when the location of the pixel in the prediction block and the location of the reference sample indicated by the direction of the intra-prediction mode indicate the location between two reference samples, an interpolated value based on the values of the two samples may be generated.

The prediction block generated via prediction may not be identical to an original target block. In other words, there may be a prediction error which is the difference between the target block and the prediction block, and there may also be a prediction error between the pixel of the target block and the pixel of the prediction block.

Hereinafter, the terms "difference", "error", and "residual" may be used to have the same meaning, and may be used interchangeably with each other.

For example, in the case of directional intra prediction, the longer the distance between the pixel of the prediction block and the reference sample, the greater the prediction error that may occur. Such a prediction error may result in discontinuity between the generated prediction block and neighboring blocks.

In order to reduce the prediction error, filtering for the prediction block may be used. Filtering may be configured to adaptively apply a filter to an area, regarded as having a large prediction error, in the prediction block. For example, the area regarded as having a large prediction error may be the boundary of the prediction block. Further, an area regarded as having a large prediction error in the prediction block may differ depending on the intra-prediction mode, and the characteristics of filters may also differ depending thereon.

Figure 8:
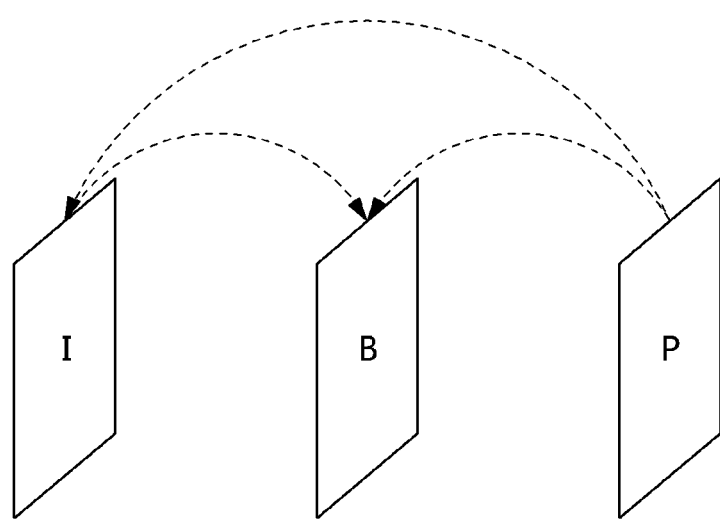
FIG. 8 is a diagram for explaining an embodiment of an inter-prediction procedure.

FIG. 8 is a diagram for explaining an embodiment of an inter prediction procedure.

The rectangles shown in FIG. 8 may represent images (or pictures). Further, in FIG. 8, arrows may represent prediction directions. That is, each image may be encoded and/or decoded depending on the prediction direction.

Images may be classified into an Intra Picture (I picture), a Uni-prediction Picture or Predictive Coded Picture (P picture), and a Bi-prediction Picture or Bi-predictive Coded Picture (B picture) depending on the encoding type. Each picture may be encoded depending on the encoding type thereof.

When a target image that is the target to be encoded is an I picture, the target image may be encoded using data contained in the image itself without inter prediction that refers to other images. For example, an I picture may be encoded only via intra prediction.

When a target image is a P picture, the target image may be encoded via inter prediction, which uses reference pictures existing in one direction. Here, the one direction may be a forward direction or a backward direction.

When a target image is a B picture, the image may be encoded via inter prediction that uses reference pictures existing in two directions, or may be encoded via inter prediction that uses reference pictures existing in one of a forward direction and a backward direction. Here, the two directions may be the forward direction and the backward direction.

A P picture and a B picture that are encoded and/or decoded using reference pictures may be regarded as images in which inter prediction is used.

Below, inter prediction in an inter mode according to an embodiment will be described in detail.

Inter prediction may be performed using motion information.

In an inter mode, the encoding apparatus 100 may perform inter prediction and/or motion compensation on a target block. The decoding apparatus 200 may perform inter prediction and/or motion compensation, corresponding to inter prediction and/or motion compensation performed by the encoding apparatus 100, on a target block.

Motion information of the target block may be individually derived by the encoding apparatus 100 and the decoding apparatus 200 during the inter prediction. The motion information may be derived using motion information of a reconstructed neighboring block, motion information of a co-located (col block), and/or motion information of a block adjacent to the col block. The col block may be a block in a previously reconstructed co-located picture (col picture). The location of the col block in the col-picture may correspond to the location of the target block in a target image. The col picture may be any one of one or more reference pictures included in a reference picture list.

For example, the encoding apparatus 100 or the decoding apparatus 200 may perform prediction and/or motion compensation by using motion information of a spatial candidate and/or a temporal candidate as motion information of the target block. The target block may mean a PU and/or a PU partition.

A spatial candidate may be a reconstructed block which is spatially adjacent to the target block.

A temporal candidate may be a reconstructed block corresponding to the target block in a previously reconstructed co-located picture (col picture).

In inter prediction, the encoding apparatus 100 and the decoding apparatus 200 may improve encoding efficiency and decoding efficiency by utilizing the motion information of a spatial candidate and/or a temporal candidate. The motion information of a spatial candidate may be referred to as 'spatial motion information'. The motion information of a temporal candidate may be referred to as 'temporal motion information'.

Below, the motion information of a spatial candidate may be the motion information of a PU including the spatial candidate. The motion information of a temporal candidate may be the motion information of a PU including the temporal candidate. The motion information of a candidate block may be the motion information of a PU including the candidate block.

Inter prediction may be performed using a reference picture.

The reference picture may be at least one of a picture previous to a target picture and a picture subsequent to the target picture. The reference picture may be an image used for the prediction of the target block.

In inter prediction, a region in the reference picture may be specified by utilizing a reference picture index (or refIdx) for indicating a reference picture, a motion vector, which will be described later, etc. Here, the region specified in the reference picture may indicate a reference block.

Inter prediction may select a reference picture, and may also select a reference block corresponding to the target block from the reference picture. Further, inter prediction may generate a prediction block for the target block using the selected reference block.

The motion information may be derived during inter prediction by each of the encoding apparatus 100 and the decoding apparatus 200.

A spatial candidate may be a block 1) which is present in a target picture, 2) which has been previously reconstructed via encoding and/or decoding, and 3) which is adjacent to the target block or is located at the corner of the target block. Here, the "block located at the corner of the target block" may be either a block vertically adjacent to a neighboring block that is horizontally adjacent to the target block, or a block horizontally adjacent to a neighboring block that is vertically adjacent to the target block. Further, "block located at the corner of the target block" may have the same meaning as "block adjacent to the corner of the target block". The meaning of "block located at the corner of the target block" may be included in the meaning of "block adjacent to the target block".

For example, a spatial candidate may be a reconstructed block located to the left of the target block, a reconstructed block located above the target block, a reconstructed block located at the below-left corner of the target block, a reconstructed block located at the above-right corner of the target block, or a reconstructed block located at the above-left corner of the target block.

Each of the encoding apparatus 100 and the decoding apparatus 200 may identify a block present at the location spatially corresponding to the target block in a col picture. The location of the target block in the target picture and the location of the identified block in the col picture may correspond to each other.

Each of the encoding apparatus 100 and the decoding apparatus 200 may determine a col block present at the predefined relative location for the identified block to be a temporal candidate. The predefined relative location may be a location present inside and/or outside the identified block.

For example, the col block may include a first col block and a second col block. When the coordinates of the identified block are (xP, yP) and the size of the identified block is represented by (nPSW, nPSH), the first col block may be a block located at coordinates (xP+nPSW, yP+nPSH). The second col block may be a block located at coordinates (xP+(nPSW>>1), yP+(nPSH>>1)). The second col block may be selectively used when the first col block is unavailable.

The motion vector of the target block may be determined based on the motion vector of the col block. Each of the encoding apparatus 100 and the decoding apparatus 200 may scale the motion vector of the col block. The scaled motion vector of the col block may be used as the motion vector of the target block. Further, a motion vector for the motion information of a temporal candidate stored in a list may be a scaled motion vector.

The ratio of the motion vector of the target block to the motion vector of the col block may be identical to the ratio of a first distance to a second distance. The first distance may be the distance between the reference picture and the target picture of the target block. The second distance may be the distance between the reference picture and the col picture of the col block.

The scheme for deriving motion information may change depending on the inter-prediction mode of a target block. For example, as inter-prediction modes applied for inter prediction, an Advanced Motion Vector Predictor (AMVP) mode, a merge mode, a skip mode, a current picture reference mode, etc. may be present. The merge mode may also be referred to as a "motion merge mode". Individual modes will be described in detail below.

1) AMVP Mode

When an AMVP mode is used, the encoding apparatus 100 may search a neighboring region of a target block for a similar block. The encoding apparatus 100 may acquire a prediction block by performing prediction on the target block using motion information of the found similar block. The encoding apparatus 100 may encode a residual block, which is the difference between the target block and the prediction block.

1-1) Creation of List of Prediction Motion Vector Candidates

When an AMVP mode is used as the prediction mode, each of the encoding apparatus 100 and the decoding apparatus 200 may create a list of prediction motion vector candidates using the motion vector of a spatial candidate, the motion vector of a temporal candidate, and a zero vector. The prediction motion vector candidate list may include one or more prediction motion vector candidates. At least one of the motion vector of a spatial candidate, the motion vector of a temporal candidate, and a zero vector may be determined and used as a prediction motion vector candidate.

Hereinafter, the terms "prediction motion vector (candidate)" and "motion vector (candidate)" may be used to have the same meaning, and may be used interchangeably with each other.

Spatial motion candidates may include a reconstructed spatial neighboring block. In other words, the motion vector of the reconstructed neighboring block may be referred to as a "spatial prediction motion vector candidate".

Temporal motion candidates may include a col block and a block adjacent to the col block. In other words, the motion vector of the col block or the motion vector of the block adjacent to the col block may be referred to as a "temporal prediction motion vector candidate".

The zero vector may be a (0, 0) motion vector.

The prediction motion vector candidates may be motion vector predictors for predicting a motion vector. Also, in the encoding apparatus 100, each prediction motion vector candidate may be an initial search location for a motion vector.

1-2) Search for Motion Vectors that Use List of Prediction Motion Vector Candidates The encoding apparatus 100 may determine the motion vector to be used to encode a target block within a search range using a list of prediction motion vector candidates. Further, the encoding apparatus 100 may determine a prediction motion vector candidate to be used as the prediction motion vector of the target block, among prediction motion vector candidates present in the prediction motion vector candidate list.

The motion vector to be used to encode the target block may be a motion vector that can be encoded at minimum cost.

Further, the encoding apparatus 100 may determine whether to use the AMVP mode to encode the target block.

1-3) Transmission of Inter-Prediction Information

The encoding apparatus 100 may generate a bitstream including inter-prediction information required for inter prediction. The decoding apparatus 200 may perform inter prediction on the target block using the inter-prediction information of the bitstream.

The inter-prediction information may contain 1) mode information indicating whether an AMVP mode is used, 2) a prediction motion vector index, 3) a Motion Vector Difference (MVD), 4) a reference direction, and 5) a reference picture index.

Further, the inter-prediction information may contain a residual signal.

The decoding apparatus 200 may acquire a prediction motion vector index, an MVD, a reference direction, and a reference picture index from the bitstream through entropy decoding when mode information indicates that the AMVP mode is used.

The prediction motion vector index may indicate a prediction motion vector candidate to be used for the prediction of a target block, among prediction motion vector candidates included in the prediction motion vector candidate list.

1-4) Inter Prediction in AMVP Mode that Uses Inter-Prediction Information

The decoding apparatus 200 may derive prediction motion vector candidates using a prediction motion vector candidate list, and may determine the motion information of a target block based on the derived prediction motion vector candidates.

The decoding apparatus 200 may determine a motion vector candidate for the target block, among the prediction motion vector candidates included in the prediction motion vector candidate list, using a prediction motion vector index. The decoding apparatus 200 may select a prediction motion vector candidate, indicated by the prediction motion vector index, from among prediction motion vector candidates included in the prediction motion vector candidate list, as the prediction motion vector of the target block.

The motion vector to be actually used for inter prediction of the target block may not match the prediction motion vector. In order to indicate the difference between the motion vector to be actually used for inter prediction of the target block and the prediction motion vector, an MVD may be used. The encoding apparatus 100 may derive a prediction motion vector similar to the motion vector to be actually used for inter prediction of the target block so as to use an MVD that is as small as possible.

An MVD may be the difference between the motion vector of the target block and the prediction motion vector. The encoding apparatus 100 may calculate an MVD and may entropy-encode the MVD.

The MVD may be transmitted from the encoding apparatus 100 to the decoding apparatus 200 through a bitstream. The decoding apparatus 200 may decode the received MVD. The decoding apparatus 200 may derive the motion vector of the target block by summing the decoded MVD and the prediction motion vector. In other words, the motion vector of the target block derived by the decoding apparatus 200 may be the sum of the entropy-decoded MVD and the motion vector candidate.

The reference direction may indicate a list of reference pictures to be used for prediction of the target block. For example, the reference direction may indicate one of a reference picture list L0 and a reference picture list L1.

The reference direction merely indicates the reference picture list to be used for prediction of the target block, and may not mean that the directions of reference pictures are limited to a forward direction or a backward direction. In other words, each of the reference picture list L0 and the reference picture list L1 may include pictures in a forward direction and/or a backward direction.

That the reference direction is unidirectional may mean that a single reference picture list is used. That the reference direction is bidirectional may mean that two reference picture lists are used. In other words, the reference direction may indicate one of the case where only the reference picture list L0 is used, the case where only the reference picture list L1 is used, and the case where two reference picture lists are used.

The reference picture index may indicate a reference picture to be used for prediction of a target block, among reference pictures in the reference picture list. The reference picture index may be entropy-encoded by the encoding apparatus 100. The entropy-encoded reference picture index may be signaled to the decoding apparatus 200 by the encoding apparatus 100 through a bitstream.

When two reference picture lists are used to predict the target block, a single reference picture index and a single motion vector may be used for each of the reference picture lists. Further, when two reference picture lists are used to predict the target block, two prediction blocks may be specified for the target block. For example, the (final) prediction block of the target block may be generated using the average or weighted sum of the two prediction blocks for the target block.

The motion vector of the target block may be derived by the prediction motion vector index, the MVD, the reference direction, and the reference picture index.

The decoding apparatus 200 may generate a prediction block for the target block based on the derived motion vector and the reference picture index. For example, the prediction block may be a reference block, indicated by the derived motion vector, in the reference picture indicated by the reference picture index.

Since the prediction motion vector index and the MVD are encoded without the motion vector itself of the target block being encoded, the number of bits transmitted from the encoding apparatus 100 to the decoding apparatus 200 may be decreased, and encoding efficiency may be improved.

For the target block, the motion information of reconstructed neighboring blocks may be used. In a specific inter-prediction mode, the encoding apparatus 100 may not separately encode the actual motion information of the target block. The motion information of the target block is not encoded, and additional information that enables the motion information of the target block to be derived using the motion information of reconstructed neighboring blocks may be encoded instead. As the additional information is encoded, the number of bits transmitted to the decoding apparatus 200 may be decreased, and encoding efficiency may be improved.

For example, as inter-prediction modes in which the motion information of the target block is not directly encoded, there may be a skip mode and/or a merge mode. Here, each of the encoding apparatus 100 and the decoding apparatus 200 may use an identifier and/or an index that indicates a unit, the motion information of which is to be used as the motion information of the target unit, among reconstructed neighboring units.

2) Merge Mode

As a scheme for deriving the motion information of a target block, there is merging. The term "merging" may mean the merging of the motion of multiple blocks. "Merging" may mean that the motion information of one block is also applied to other blocks. In other words, a merge mode may be a mode in which the motion information of the target block is derived from the motion information of a neighboring block.

When a merge mode is used, the encoding apparatus 100 may predict the motion information of a target block using the motion information of a spatial candidate and/or the motion information of a temporal candidate. The spatial candidate may include a reconstructed spatial neighboring block that is spatially adjacent to the target block. The spatially adjacent block may include a left adjacent block and an above adjacent block. The temporal candidate may include a col block. The terms "spatial candidate" and "spatial merge candidate" may be used to have the same meaning, and may be used interchangeably with each other. The terms "temporal candidate" and "temporal merge candidate" may be used to have the same meaning, and may be used interchangeably with each other.

The encoding apparatus 100 may acquire a prediction block via prediction. The encoding apparatus 100 may encode a residual block, which is the difference between the target block and the prediction block.

2-1) Creation of Merge Candidate List

When the merge mode is used, each of the encoding apparatus 100 and the decoding apparatus 200 may create a merge candidate list using the motion information of a spatial candidate and/or the motion information of a temporal candidate. The motion information may include 1) a motion vector, 2) a reference picture index, and 3) a reference direction. The reference direction may be unidirectional or bidirectional.

The merge candidate list may include merge candidates. The merge candidates may be motion information. In other words, the merge candidate list may be a list in which pieces of motion information are stored.

The merge candidates may be pieces of motion information of temporal candidates and/or spatial candidates. Further, the merge candidate list may include new merge candidates generated by a combination of merge candidates that are already present in the merge candidate list. In other words, the merge candidate list may include new motion information generated by a combination of pieces of motion information previously present in the merge candidate list.

Furthermore, the merge candidate list may include motion information of a zero vector. The zero vector may also be referred to as a "zero-merge candidate".

In other words, pieces of motion information in the merge candidate list may be at least one of 1) motion information of a spatial candidate, 2) motion information of a temporal candidate, 3) motion information generated by a combination of pieces of motion information previously present in the merge candidate list, and 4) a zero vector.

Motion information may include 1) a motion vector, 2) a reference picture index, and 3) a reference direction. The reference direction may also be referred to as an "inter-prediction indicator". The reference direction may be unidirectional or bidirectional. The unidirectional reference direction may indicate L0 prediction or L1 prediction.

The merge candidate list may be created before prediction in the merge mode is performed.

The number of merge candidates in the merge candidate list may be predefined. Each of the encoding apparatus 100 and the decoding apparatus 200 may add merge candidates to the merge candidate list depending on the predefined scheme and predefined priorities so that the merge candidate list has a predefined number of merge candidates. The merge candidate list of the encoding apparatus 100 and the merge candidate list of the decoding apparatus 200 may be made identical to each other using the predefined scheme and the predefined priorities.

Merging may be applied on a CU basis or a PU basis. When merging is performed on a CU basis or a PU basis, the encoding apparatus 100 may transmit a bitstream including predefined information to the decoding apparatus 200. For example, the predefined information may contain 1) information indicating whether to perform merging for individual block partitions, and 2) information about a block with which merging is to be performed, among blocks that are spatial candidates and/or temporal candidates for the target block.

2-2) Search for Motion Vector that Uses Merge Candidate List

The encoding apparatus 100 may determine merge candidates to be used to encode a target block. For example, the encoding apparatus 100 may perform prediction on the target block using merge candidates in the merge candidate list, and may generate residual blocks for the merge candidates. The encoding apparatus 100 may use a merge candidate that incurs the minimum cost in prediction and in the encoding of residual blocks to encode the target block.

Further, the encoding apparatus 100 may determine whether to use a merge mode to encode the target block.

2-3) Transmission of Inter-Prediction Information

The encoding apparatus 100 may generate a bitstream that includes inter-prediction information required for inter prediction. The encoding apparatus 100 may generate entropy-encoded inter-prediction information by performing entropy encoding on inter-prediction information, and may transmit a bitstream including the entropy-encoded inter-prediction information to the decoding apparatus 200. Through the bitstream, the entropy-encoded inter-prediction information may be signaled to the decoding apparatus 200 by the encoding apparatus 100.

The decoding apparatus 200 may perform inter prediction on the target block using the inter-prediction information of the bitstream.

The inter-prediction information may contain 1) mode information indicating whether a merge mode is used and 2) a merge index.

Further, the inter-prediction information may contain a residual signal.

The decoding apparatus 200 may acquire the merge index from the bitstream only when the mode information indicates that the merge mode is used.

The mode information may be a merge flag. The unit of the mode information may be a block. Information about the block may include mode information, and the mode information may indicate whether a merge mode is applied to the block.

The merge index may indicate a merge candidate to be used for the prediction of the target block, among merge candidates included in the merge candidate list. Alternatively, the merge index may indicate a block with which the target block is to be merged, among neighboring blocks spatially or temporally adjacent to the target block.

2-4) Inter Prediction of Merge Mode that Uses Inter-Prediction Information

The decoding apparatus 200 may perform prediction on the target block using the merge candidate indicated by the merge index, among merge candidates included in the merge candidate list.

The motion vector of the target block may be specified by the motion vector, reference picture index, and reference direction of the merge candidate indicated by the merge index.

3) Skip Mode

A skip mode may be a mode in which the motion information of a spatial candidate or the motion information of a temporal candidate is applied to the target block without change. Also, the skip mode may be a mode in which a residual signal is not used. In other words, when the skip mode is used, a reconstructed block may be a prediction block.

The difference between the merge mode and the skip mode lies in whether or not a residual signal is transmitted or used. That is, the skip mode may be similar to the merge mode except that a residual signal is not transmitted or used.

When the skip mode is used, the encoding apparatus 100 may transmit information about a block, the motion information of which is to be used as the motion information of the target block, among blocks that are spatial candidates or temporal candidates, to the decoding apparatus 200 through a bitstream. The encoding apparatus 100 may generate entropy-encoded information by performing entropy encoding on the information, and may signal the entropy-encoded information to the decoding apparatus 200 through a bitstream.

Further, when the skip mode is used, the encoding apparatus 100 may not transmit other syntax information, such as an MVD, to the decoding apparatus 200. For example, when the skip mode is used, the encoding apparatus 100 may not signal a syntax element related to at least one of an MVC, a coded block flag, and a transform coefficient level to the decoding apparatus 200.

3-1) Creation of Merge Candidate List

The skip mode may also use a merge candidate list. In other words, a merge candidate list may be used both in the merge mode and in the skip mode. In this aspect, the merge candidate list may also be referred to as a "skip candidate list" or a "merge/skip candidate list".

Alternatively, the skip mode may use an additional candidate list different from that of the merge mode. In this case, in the following description, a merge candidate list and a merge candidate may be replaced with a skip candidate list and a skip candidate, respectively.

The merge candidate list may be created before prediction in the skip mode is performed.

3-2) Search for Motion Vector that Uses Merge Candidate List

The encoding apparatus 100 may determine the merge candidates to be used to encode a target block. For example, the encoding apparatus 100 may perform prediction on the target block using the merge candidates in a merge candidate list. The encoding apparatus 100 may use a merge candidate that incurs the minimum cost in prediction to encode the target block.

Further, the encoding apparatus 100 may determine whether to use a skip mode to encode the target block.

3-3) Transmission of Inter-Prediction Information

The encoding apparatus 100 may generate a bitstream that includes inter-prediction information required for inter prediction. The decoding apparatus 200 may perform inter prediction on the target block using the inter-prediction information of the bitstream.

The inter-prediction information may include 1) mode information indicating whether a skip mode is used, and 2) a skip index.

The skip index may be identical to the above-described merge index.

When the skip mode is used, the target block may be encoded without using a residual signal. The inter-prediction information may not contain a residual signal. Alternatively, the bitstream may not include a residual signal.

The decoding apparatus 200 may acquire a skip index from the bitstream only when the mode information indicates that the skip mode is used. As described above, a merge index and a skip index may be identical to each other. The decoding apparatus 200 may acquire the skip index from the bitstream only when the mode information indicates that the merge mode or the skip mode is used.

The skip index may indicate the merge candidate to be used for the prediction of the target block, among the merge candidates included in the merge candidate list.

3-4) Inter Prediction in Skip Mode that Uses Inter-Prediction Information

The decoding apparatus 200 may perform prediction on the target block using a merge candidate indicated by a skip index, among the merge candidates included in a merge candidate list.

The motion vector of the target block may be specified by the motion vector, reference picture index, and reference direction of the merge candidate indicated by the skip index.

4) Current Picture Reference Mode

The current picture reference mode may denote a prediction mode that uses a previously reconstructed region in a current picture to which a target block belongs.

A vector for specifying the previously reconstructed region may be defined. Whether the target block has been encoded in the current picture reference mode may be determined using the reference picture index of the target block.

A flag or index indicating whether the target block is a block encoded in the current picture reference mode may be signaled by the encoding apparatus 100 to the decoding apparatus 200. Alternatively, whether the target block is a block encoded in the current picture reference mode may be inferred through the reference picture index of the target block.

When the target block is encoded in the current picture reference mode, the current picture may be added to a fixed location or an arbitrary location in a reference picture list for the target block.

For example, the fixed location may be either a location where the reference picture index is 0 or the last location.

When the current picture is added to an arbitrary location in the reference picture list, an additional reference picture index indicating such an arbitrary location may be signaled by the encoding apparatus 100 to the decoding apparatus 200.

In the above-described AMVP mode, merge mode, and skip mode, motion information to be used for the prediction of a target block may be specified, among pieces of motion information in the list, using the index of the list.

In order to improve encoding efficiency, the encoding apparatus 100 may signal only the index of an element that incurs the minimum cost in inter prediction of the target block, among elements in the list. The encoding apparatus 100 may encode the index, and may signal the encoded index.

Therefore, the above-described lists (i.e. the prediction motion vector candidate list and the merge candidate list) must be able to be derived by the encoding apparatus 100 and the decoding apparatus 200 using the same scheme based on the same data. Here, the same data may include a reconstructed picture and a reconstructed block. Further, in order to specify an element using an index, the order of the elements in the list must be fixed.

Figure 9:
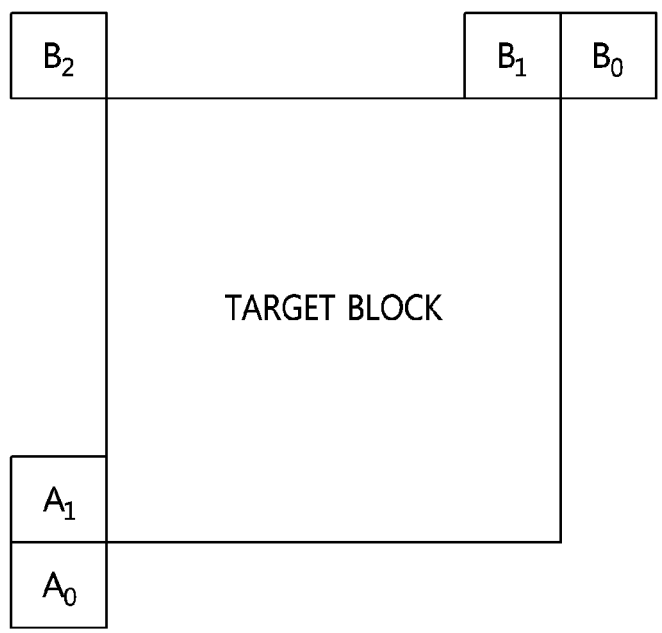
FIG. 9 illustrates spatial candidates according to an embodiment.

FIG. 9 illustrates spatial candidates according to an embodiment.

In FIG. 9, the locations of spatial candidates are illustrated.

The large block in the center of the drawing may denote a target block. Five small blocks may denote spatial candidates.

The coordinates of the target block may be (xP, yP), and the size of the target block may be represented by (nPSW, nPSH).

Spatial candidate $A_0$ may be a block adjacent to the below-left corner of the target block. $A_0$ may be a block that occupies pixels located at coordinates (xP−1, yP+nPSH+1).

Spatial candidate $A_1$ may be a block adjacent to the left of the target block. $A_1$ may be a lowermost block, among blocks adjacent to the left of the target block. Alternatively, $A_1$ may be a block adjacent to the top of $A_0$. $A_1$ may be a block that occupies pixels located at coordinates (xP−1, yP+nPSH).

Spatial candidate $B_0$ may be a block adjacent to the above-right corner of the target block. $B_0$ may be a block that occupies pixels located at coordinates (xP+nPSW+1, yP−1).

Spatial candidate $B_1$ may be a block adjacent to the top of the target block. $B_1$ may be a rightmost block, among blocks adjacent to the top of the target block. Alternatively, $B_1$ may be a block adjacent to the left of $B_0$. $B_1$ may be a block that occupies pixels located at coordinates (xP+nPSW, yP−1).

Spatial candidate $B_2$ may be a block adjacent to the above-left corner of the target block. $B_2$ may be a block that occupies pixels located at coordinates (xP−1, yP−1).

Determination of Availability of Spatial Candidate and Temporal Candidate

In order to include the motion information of a spatial candidate or the motion information of a temporal candidate in a list, it must be determined whether the motion information of the spatial candidate or the motion information of the temporal candidate is available.

Hereinafter, a candidate block may include a spatial candidate and a temporal candidate.

For example, the determination may be performed by sequentially applying the following steps 1) to 4).

Step 1) When a PU including a candidate block is out of the boundary of a picture, the availability of the candidate block may be set to "false". The expression "availability is set to false" may have the same meaning as "set to be unavailable".

Step 2) When a PU including a candidate block is out of the boundary of a slice, the availability of the candidate block may be set to "false". When the target block and the candidate block are located in different slices, the availability of the candidate block may be set to "false".

Step 3) When a PU including a candidate block is out of the boundary of a tile, the availability of the candidate block may be set to "false". When the target block and the candidate block are located in different tiles, the availability of the candidate block may be set to "false".

Step 4) When the prediction mode of a PU including a candidate block is an intra-prediction mode, the availability of the candidate block may be set to "false". When a PU including a candidate block does not use inter prediction, the availability of the candidate block may be set to "false".

Figure 10:
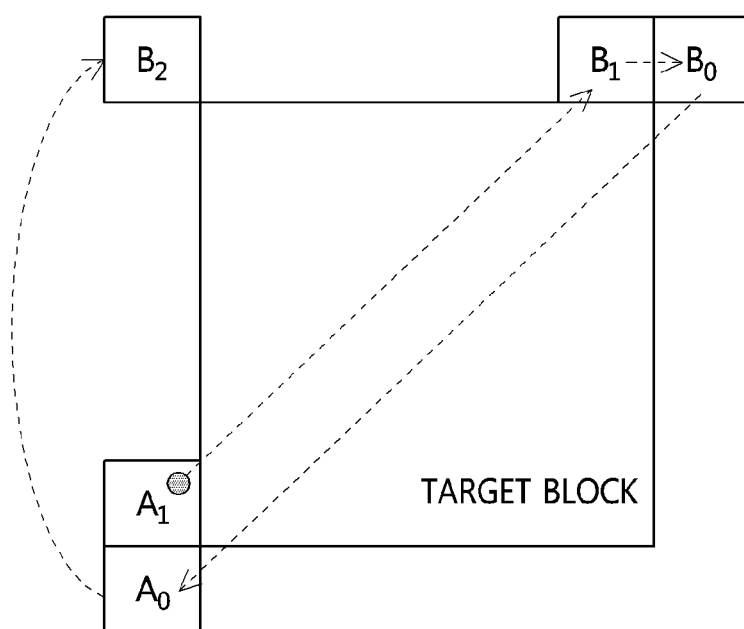
FIG. 10 illustrates the order of addition of motion information of spatial candidates to a merge list according to an embodiment.

FIG. 10 illustrates the order of addition of motion information of spatial candidates to a merge list according to an embodiment.

As shown in FIG. 10, when pieces of motion information of spatial candidates are added to a merge list, the order of $A_1, B_1, B_0, A_0$, and $B_2$ may be used. That is, pieces of motion information of available spatial candidates may be added to the merge list in the order of $A_1, B_1, B_0, A_0$, and $B_2$.

Method for Deriving Merge List in Merge Mode and Skip Mode

As described above, the maximum number of merge candidates in the merge list may be set. The set maximum number is indicated by "N". The set number may be transmitted from the encoding apparatus 100 to the decoding apparatus 200. The slice header of a slice may include N. In other words, the maximum number of merge candidates in the merge list for the target block of the slice may be set by the slice header. For example, the value of N may be basically 5.

Pieces of motion information (i.e., merge candidates) may be added to the merge list in the order of the following steps 1) to 4).

Step 1) Among spatial candidates, available spatial candidates may be added to the merge list. Pieces of motion information of the available spatial candidates may be added to the merge list in the order illustrated in FIG. 10. Here, when the motion information of an available spatial candidate overlaps other motion information already present in the merge list, the motion information may not be added to the merge list. The operation of checking whether the corresponding motion information overlaps other motion information present in the list may be referred to in brief as an "overlap check".

The maximum number of pieces of motion information that are added may be N.

Step 2) When the number of pieces of motion information in the merge list is less than N and a temporal candidate is available, the motion information of the temporal candidate may be added to the merge list. Here, when the motion information of the available temporal candidate overlaps other motion information already present in the merge list, the motion information may not be added to the merge list.

Step 3) When the number of pieces of motion information in the merge list is less than N and the type of a target slice is "B", combined motion information generated by combined bidirectional prediction (bi-prediction) may be added to the merge list.

The target slice may be a slice including a target block.

The combined motion information may be a combination of L0 motion information and L1 motion information. L0 motion information may be motion information that refers only to a reference picture list L0. L1 motion information may be motion information that refers only to a reference picture list L1.

In the merge list, one or more pieces of L0 motion information may be present. Further, in the merge list, one or more pieces of L1 motion information may be present.

The combined motion information may include one or more pieces of combined motion information. When the combined motion information is generated, L0 motion information and L1 motion information, which are to be used for generation, among the one or more pieces of L0 motion information and the one or more pieces of L1 motion information, may be predefined. One or more pieces of combined motion information may be generated in a predefined order via combined bidirectional prediction, which uses a pair of different pieces of motion information in the merge list. One of the pair of different pieces of motion information may be L0 motion information and the other of the pair may be L1 motion information.

For example, combined motion information that is added with the highest priority may be a combination of L0 motion information having a merge index of 0 and L1 motion information having a merge index of 1. When motion information having a merge index of 0 is not L0 motion information or when motion information having a merge index of 1 is not L1 motion information, the combined motion information may be neither generated nor added. Next, the combined motion information that is added with the next priority may be a combination of L0 motion information, having a merge index of 1, and L1 motion information, having a merge index of 0. Subsequent detailed combinations may conform to other combinations of video encoding/decoding fields.

Here, when the combined motion information overlaps other motion information already present in the merge list, the combined motion information may not be added to the merge list.

Step 4) When the number of pieces of motion information in the merge list is less than N, motion information of a zero vector may be added to the merge list.

The zero-vector motion information may be motion information for which the motion vector is a zero vector.

The number of pieces of zero-vector motion information may be one or more. The reference picture indices of one or more pieces of zero-vector motion information may be different from each other. For example, the value of the reference picture index of first zero-vector motion information may be 0. The value of the reference picture index of second zero-vector motion information may be 1.

The number of pieces of zero-vector motion information may be identical to the number of reference pictures in the reference picture list.

The reference direction of zero-vector motion information may be bidirectional. Both of the motion vectors may be zero vectors. The number of pieces of zero-vector motion information may be the smaller one of the number of reference pictures in the reference picture list L0 and the number of reference pictures in the reference picture list L1.

Alternatively, when the number of reference pictures in the reference picture list L0 and the number of reference pictures in the reference picture list L1 are different from each other, a reference direction that is unidirectional may be used for a reference picture index that may be applied only to a single reference picture list.

The encoding apparatus 100 and/or the decoding apparatus 200 may sequentially add the zero-vector motion information to the merge list while changing the reference picture index.

When zero-vector motion information overlaps other motion information already present in the merge list, the zero-vector motion information may not be added to the merge list.

The order of the above-described steps 1) to 4) is merely exemplary, and may be changed. Further, some of the above steps may be omitted depending on predefined conditions.

Method for Deriving Prediction Motion Vector Candidate List in AMVP Mode

The maximum number of prediction motion vector candidates in a prediction motion vector candidate list may be predefined. The predefined maximum number is indicated by N. For example, the predefined maximum number may be 2.

Pieces of motion information (i.e. prediction motion vector candidates) may be added to the prediction motion vector candidate list in the order of the following steps 1) to 3).

Step 1) Available spatial candidates, among spatial candidates, may be added to the prediction motion vector candidate list. The spatial candidates may include a first spatial candidate and a second spatial candidate.

The first spatial candidate may be one of $A_0$, $A_1$, scaled $A_0$, and scaled $A_1$. The second spatial candidate may be one of $B_0$, $B_1$, $B_2$, scaled $B_0$, scaled $B_1$, and scaled $B_2$.

Pieces of motion information of available spatial candidates may be added to the prediction motion vector candidate list in the order of the first spatial candidate and the second spatial candidate. In this case, when the motion information of an available spatial candidate overlaps other motion information already present in the prediction motion vector candidate list, the motion information may not be added to the prediction motion vector candidate list. In other words, when the value of N is 2, if the motion information of a second spatial candidate is identical to the motion information of a first spatial candidate, the motion information of the second spatial candidate may not be added to the prediction motion vector candidate list.

The maximum number of pieces of motion information that are added may be N.

Step 2) When the number of pieces of motion information in the prediction motion vector candidate list is less than N and a temporal candidate is available, the motion information of the temporal candidate may be added to the prediction motion vector candidate list. In this case, when the motion information of the available temporal candidate overlaps other motion information already present in the prediction motion vector candidate list, the motion information may not be added to the prediction motion vector candidate list.

Step 3) When the number of pieces of motion information in the prediction motion vector candidate list is less than N, zero-vector motion information may be added to the prediction motion vector candidate list.

The zero-vector motion information may include one or more pieces of zero-vector motion information. The reference picture indices of the one or more pieces of zero-vector motion information may be different from each other.

The encoding apparatus 100 and/or the decoding apparatus 200 may sequentially add pieces of zero-vector motion information to the prediction motion vector candidate list while changing the reference picture index.

When zero-vector motion information overlaps other motion information already present in the prediction motion vector candidate list, the zero-vector motion information may not be added to the prediction motion vector candidate list.

The description of the zero-vector motion information, made above in connection with the merge list, may also be applied to zero-vector motion information. A repeated description thereof will be omitted.

The order of the above-described steps 1) to 3) is merely exemplary, and may be changed. Further, some of the steps may be omitted depending on predefined conditions.

Figure 11:
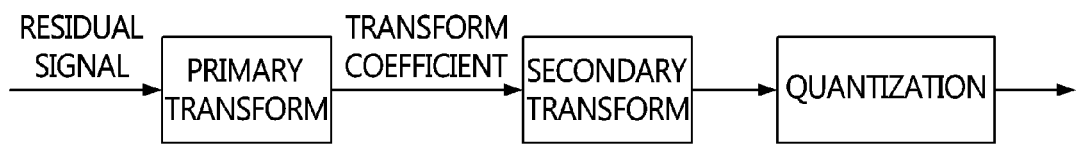
FIG. 11 illustrates a transform and quantization process according to an example.

FIG. 11 illustrates a transform and quantization process according to an example.

As illustrated in FIG. 11, quantized levels may be generated by performing a transform and/or quantization process on a residual signal.

A residual signal may be generated as the difference between an original block and a prediction block. Here, the prediction block may be a block generated via intra prediction or inter prediction.

The transform may include at least one of a primary transform and a secondary transform. A transform coefficient may be generated by performing the primary transform on the residual signal, and a secondary transform coefficient may be generated by performing the secondary transform on the transform coefficient.

The primary transform may be performed using at least one of predefined multiple transform methods. For example, the predefined multiple transform methods may include a Discrete Cosine Transform (DCT), a Discrete Sine Transform (DST), a Karhunen-Loeve Transform (KLT), etc.

The secondary transform may be performed on the transform coefficient generated by performing the primary transform.

Transform methods applied to the primary transform and/or the secondary transform may be determined based on at least one of coding parameters for a target block and/or a neighboring block. Alternatively, transform information indicating transform methods may be signaled by the encoding apparatus to the decoding apparatus 200.

The quantized levels may be generated by performing quantization on the result, generated by performing the primary transform and/or the secondary transform, or on the residual signal.

The quantized levels may be scanned based on at least one of up-right diagonal scanning, vertical scanning, and horizontal scanning, depending on at least one of an intra-prediction mode, a block size, and a block form.

For example, coefficients may be changed to 1D vector forms by scanning coefficients of blocks using up-right diagonal scanning. Alternatively, depending on the size of a transform block and/or an intra-prediction mode, vertical scanning, which scans 2D block-format coefficients in a column direction, or horizontal scanning, which scans 2D block-format coefficients in a row direction, may be used instead of the up-right diagonal scanning.

The scanned quantized levels may be entropy-encoded, and a bitstream may include the entropy-encoded quantized levels.

The decoding apparatus 200 may generate quantized levels via entropy decoding on the bitstream. The quantized levels may be aligned in the form of a 2D block via inverse scanning Here, as the method of inverse scanning, at least one of up-right diagonal scanning, vertical scanning, and horizontal scanning may be performed.

Dequantization may be performed on the quantized levels. A secondary inverse transform may be performed on the result generated by performing dequantization depending on whether to perform the secondary inverse transform. Further, a primary inverse transform may be performed on the result generated by performing the secondary inverse transform depending on whether the primary inverse transform is to be performed. A reconstructed residual signal may be generated by performing the primary inverse transform on the result generated by performing the secondary inverse transform.

Figure 12:
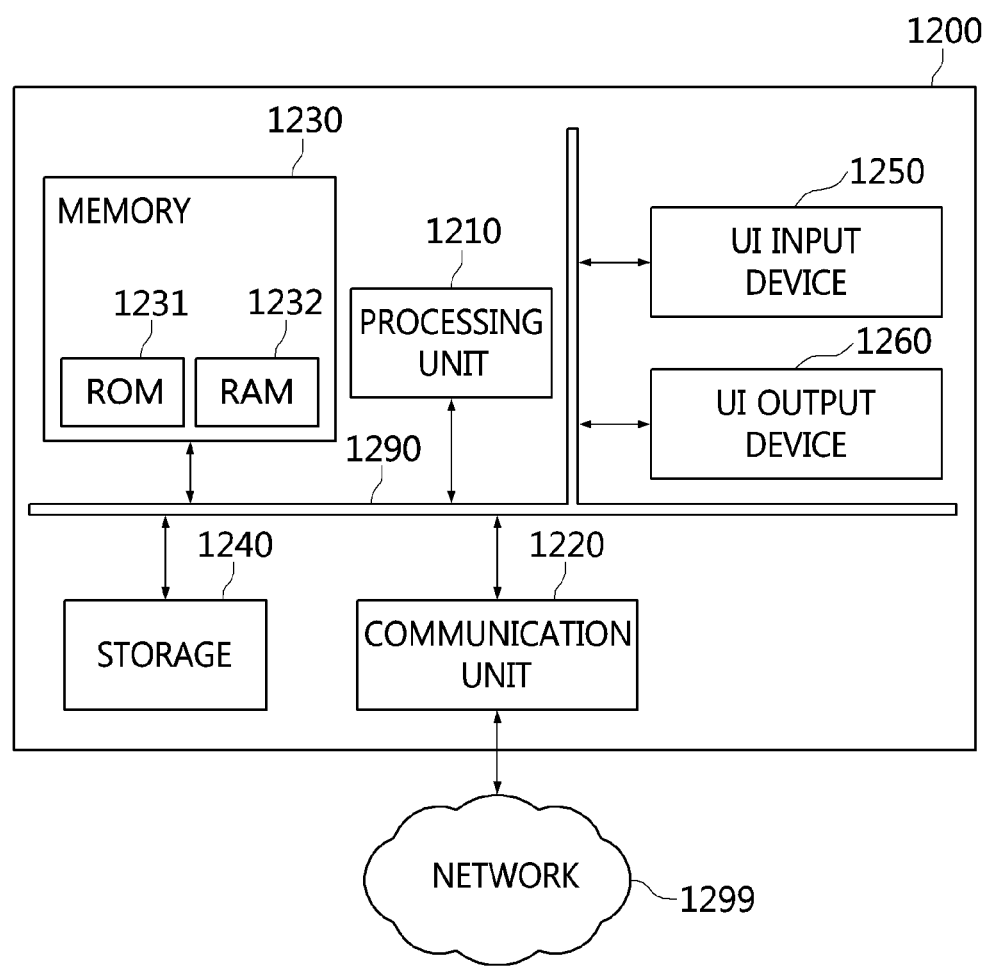
FIG. 12 is a configuration diagram of an encoding apparatus according to an embodiment.

FIG. 12 is a configuration diagram of an encoding apparatus according to an embodiment.

An encoding apparatus 1200 may correspond to the above-described encoding apparatus 100.

The encoding apparatus 1200 may include a processing unit 1210, memory 1230, a user interface (UI) input device 1250, a UI output device 1260, and storage 1240, which communicate with each other through a bus 1290. The encoding apparatus 1200 may further include a communication unit 1220 coupled to a network 1299.

The processing unit 1210 may be a Central Processing Unit (CPU) or a semiconductor device for executing processing instructions stored in the memory 1230 or the storage 1240. The processing unit 1210 may be at least one hardware processor.

The processing unit 1210 may generate and process signals, data or information that are input to the encoding apparatus 1200, are output from the encoding apparatus 1200, or are used in the encoding apparatus 1200, and may perform examination, comparison, determination, etc. related to the signals, data or information. In other words, in embodiments, the generation and processing of data or information and examination, comparison and determination related to data or information may be performed by the processing unit 1210.

The processing unit 1210 may include an inter-prediction unit 110, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

At least some of the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190 may be program modules, and may communicate with an external device or system. The program modules may be included in the encoding apparatus 1200 in the form of an operating system, an application program module, or other program modules.

The program modules may be physically stored in various types of well-known storage devices. Further, at least some of the program modules may also be stored in a remote storage device that is capable of communicating with the encoding apparatus 1200.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the encoding apparatus 1200.

The processing unit 1210 may execute instructions or code in the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190.

A storage unit may denote the memory 1230 and/or the storage 1240. Each of the memory 1230 and the storage 1240 may be any of various types of volatile or nonvolatile storage media. For example, the memory 1230 may include at least one of Read-Only Memory (ROM) 1231 and Random Access Memory (RAM) 1232.

The storage unit may store data or information used for the operation of the encoding apparatus 1200. In an embodiment, the data or information of the encoding apparatus 1200 may be stored in the storage unit.

For example, the storage unit may store pictures, blocks, lists, motion information, inter-prediction information, bitstreams, etc.

The encoding apparatus 1200 may be implemented in a computer system including a computer-readable storage medium.

The storage medium may store at least one module required for the operation of the encoding apparatus 1200. The memory 1230 may store at least one module, and may be configured such that the at least one module is executed by the processing unit 1210.

Functions related to communication of the data or information of the encoding apparatus 1200 may be performed through the communication unit 1220.

For example, the communication unit 1220 may transmit a bitstream to a decoding apparatus 1300, which will be described later.

Figure 13:
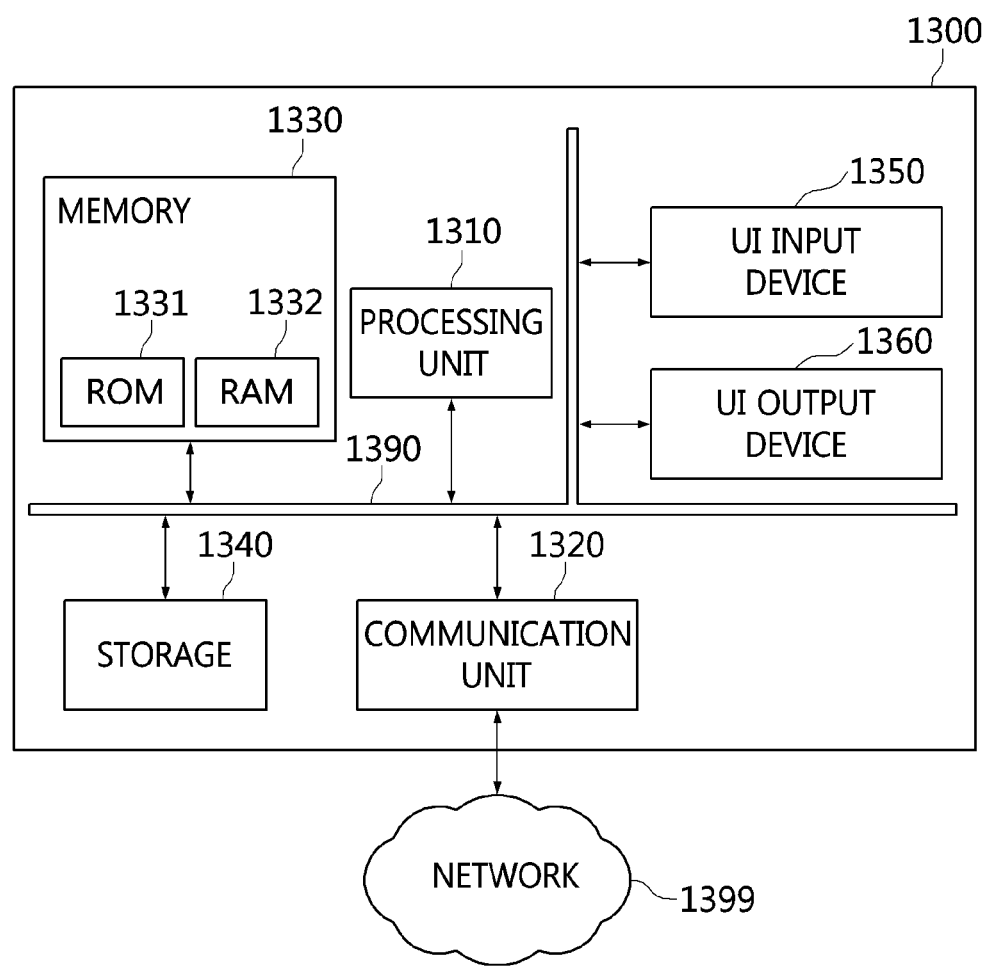
FIG. 13 is a configuration diagram of a decoding apparatus according to an embodiment.

FIG. 13 is a configuration diagram of a decoding apparatus according to an embodiment.

The decoding apparatus 1300 may correspond to the above-described decoding apparatus 200.

The decoding apparatus 1300 may include a processing unit 1310, memory 1330, a user interface (UI) input device 1350, a UI output device 1360, and storage 1340, which communicate with each other through a bus 1390. The decoding apparatus 1300 may further include a communication unit 1320 coupled to a network 1399.

The processing unit 1310 may be a Central Processing Unit (CPU) or a semiconductor device for executing processing instructions stored in the memory 1330 or the storage 1340. The processing unit 1310 may be at least one hardware processor.

The processing unit 1310 may generate and process signals, data or information that are input to the decoding apparatus 1300, are output from the decoding apparatus 1300, or are used in the decoding apparatus 1300, and may perform examination, comparison, determination, etc. related to the signals, data or information. In other words, in embodiments, the generation and processing of data or information and examination, comparison and determination related to data or information may be performed by the processing unit 1310.

The processing unit 1310 may include an entropy decoding unit 210, a dequantization unit 220, an inverse transform unit 230, an intra-prediction unit 240, an inter-prediction unit 250, an adder 255, a filter unit 260, and a reference picture buffer 270.

At least some of the entropy decoding unit 210, the dequantization unit 220, the inverse transform unit 230, the intra-prediction unit 240, the inter-prediction unit 250, the adder 255, the filter unit 260, and the reference picture buffer 270 of the decoding apparatus 200 may be program modules, and may communicate with an external device or system. The program modules may be included in the decoding apparatus 1300 in the form of an operating system, an application program module, or other program modules.

The program modules may be physically stored in various types of well-known storage devices. Further, at least some of the program modules may also be stored in a remote storage device that is capable of communicating with the decoding apparatus 1300.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the decoding apparatus 1300.

The processing unit 1310 may execute instructions or code in the entropy decoding unit 210, the dequantization unit 220, the inverse transform unit 230, the intra-prediction unit 240, the inter-prediction unit 250, the adder 255, the filter unit 260, and the reference picture buffer 270.

A storage unit may denote the memory 1330 and/or the storage 1340. Each of the memory 1330 and the storage 1340 may be any of various types of volatile or nonvolatile storage media. For example, the memory 1330 may include at least one of ROM 1331 and RAM 1332.

The storage unit may store data or information used for the operation of the decoding apparatus 1300. In an embodiment, the data or information of the decoding apparatus 1300 may be stored in the storage unit.

For example, the storage unit may store pictures, blocks, lists, motion information, inter-prediction information, bitstreams, etc.

The decoding apparatus 1300 may be implemented in a computer system including a computer-readable storage medium.

The storage medium may store at least one module required for the operation of the decoding apparatus 1300. The memory 1330 may store at least one module, and may be configured such that the at least one module is executed by the processing unit 1310.

Functions related to communication of the data or information of the decoding apparatus 1300 may be performed through the communication unit 1320.

For example, the communication unit 1320 may receive a bitstream from the encoding apparatus 1200.

Figure 14:
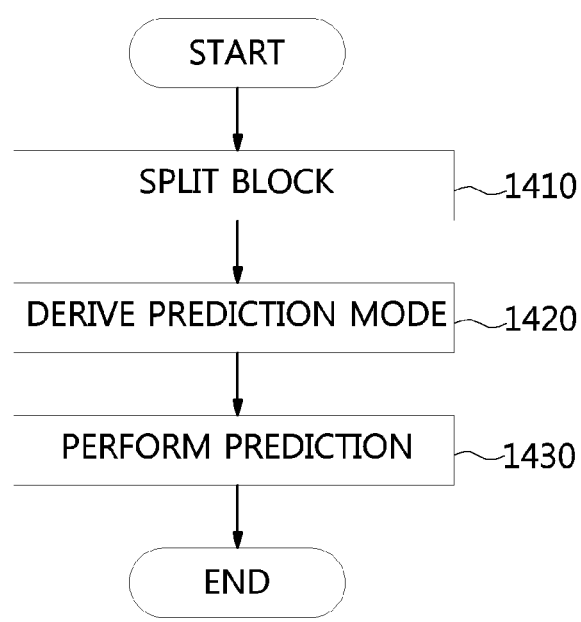
FIG. 14 is a flowchart of a prediction method according to an embodiment.

FIG. 14 is a flowchart of a prediction method according to an embodiment.

The prediction method may be performed by an encoding apparatus 1200 and/or a decoding apparatus 1300.

For example, the encoding apparatus 1200 may perform the prediction method according to the embodiment in order to compare the efficiencies of multiple prediction schemes for a target block and/or multiple partition blocks, and may also perform the prediction method according to the present embodiment in order to generate a reconstructed block of the target block.

In an embodiment, the target block may be at least one of a CTU, a CU, a PU, a TU, a block having a specific size, and a block having a size falling within a predefined range.

For example, the decoding apparatus 1300 may perform the prediction method according to the embodiment in order to generate a reconstructed block of the target block.

Hereinafter, the processing unit may correspond to the processing unit 1210 of the encoding apparatus 1200 and/or the processing unit 1310 of the decoding apparatus 1300.

At step 1410, the processing unit may generate multiple partition blocks by splitting the target block.

The processing unit may generate multiple partition blocks by splitting the target block using coding parameters related to the target block.

In an embodiment, the processing unit may generate multiple partition blocks by splitting the target block based on one or more of the size of the target block and the shape of the target block.

For example, the target block may include multiple partition blocks. The multiple partition blocks may also be referred to as "multiple sub-blocks".

An example of step 1410 will be described in detail below with reference to FIG. 15.

In an embodiment, whether to perform step 1410, that is, whether to generate multiple partition blocks by splitting the target block, may be determined based on information related to the target block. The processing unit may determine, based on information related to the target block, whether to apply the splitting of the target block.

In an embodiment, the information related to the target block may include at least one of a coding parameter of the target block, picture-related information of a target picture including the target block, information about a slice including the target block, a Quantization Parameter (QP) of the target block, a Coded Block Flag (CBF) of the target block, the size of the target block, the depth of the target block, the shape of the target block, the entropy encoding scheme of the target block, split information of a reference block for the target block, the temporal layer level of the target block, and a block split indicator (flag).

The reference block may include one or more of a block spatially adjacent to the target block and a block temporally adjacent to the target block.

1) In an embodiment, the processing unit may determine whether to apply the splitting of the target block depending on the picture-related information of the target picture. For example, the Picture Parameter Set (PPS) of the target picture may include information indicating whether a block in the target picture is to be split. By means of the PPS, the information indicating whether the block in the target picture is to be split may be encoded and/or decoded. Alternatively, by means of the PPS, a picture, which is set such that a block therein is to be split, or a picture, which is set such that a block therein is not to be split, may be identified.

For example, when a non-square target block is included in the picture, which is set such that a block therein is to be split, the processing unit may split the non-square target block into square blocks.

2) In an embodiment, the processing unit may determine whether to apply the splitting of the target block based on information about a specific picture. For example, the specific picture may be a picture previous to the target picture.

For example, the processing unit may determine whether to apply the splitting of the target block depending on whether splitting has been applied to a block in the picture previous to the target picture.

For example, when a non-square block is split into square blocks in the picture previous to the target picture, the processing unit may split the non-square target block in the target picture into square blocks.

3) In an embodiment, the processing unit may determine whether to apply the splitting of the target block based on information about a slice. The slice may include the target block. Alternatively, the slice may include a reference block.

For example, the processing unit may determine whether to apply the splitting of the target block depending on the type of slice. The slice type may include an I slice, a B slice, and a P slice.

For example, when a non-square target block is included in an I slice, the processing unit may split the non-square target block of the target picture into square blocks.

For example, when a non-square target block is included in a P slice or a B slice, the processing unit may split the non-square target block into square blocks.

4) In an embodiment, the processing unit may determine, based on information about an additional slice, whether to apply the splitting of the target block.

For example, the additional slice may be a slice previous or subsequent to the corresponding slice including the target block. The additional slice may be a slice including a reference block for the target block.

For example, the processing unit may determine whether to apply the splitting of the target block depending on the type of an additional slice. The type of the additional slice may include an I slice, a B slice, and a P slice.

For example, when the additional slice is an I slice, the processing unit may split the non-square target block of the target picture into square blocks.

For example, when the additional slice is a P slice or a B slice, the processing unit may split a non-square target block into square blocks.

5) In an embodiment, the processing unit may determine whether to apply the splitting of the target block based on the quantization parameter of the target block.

For example, when the quantization parameter of a non-square target block falls within a specific range, the processing unit may split the non-square target block into square blocks.

6) In an embodiment, the processing unit may determine, based on the Coded Block Flag (CBF) of the target block, whether to apply the splitting of the target block.

For example, when the value of the CBF of a non-square target block is equal to a specific value or corresponds to the specific value, the processing unit may split the non-square target block into square blocks.

7) In an embodiment, the processing unit may determine, based on the size of the target block, whether to apply the splitting of the target block.

For example, when the size of a non-square target block 1) is equal to a specific size or 2) falls within a specific range, the processing unit may split the non-square target block into square blocks.

For example, when the sum of the width and the height of a non-square target block 1) is equal to a specific value, 2) is equal to or greater than the specific value, 3) is less than or equal to the specific value, or 4) falls within a specific range, the processing unit may split the non-square target block into square blocks. For example, the specific value may be 16.

8) In an embodiment, the processing unit may determine, based on the depth of the target block, whether to apply the splitting of the target block.

For example, when the depth of a non-square target block 1) is equal to a specific depth or 2) falls within a specific range, the processing unit may split the non-square target block into square blocks.

9) In an embodiment, the processing unit may determine, based on the shape of the target block, whether to apply the splitting of the target block.

For example, when the ratio of the width to the height of a non-square target block 1) is equal to a specific value or 2) falls within a specific range, the processing unit may split the non-square target block into square blocks.

10) In an embodiment, the processing unit may determine, based on a block split indicator (flag), whether to apply the splitting of the target block.

The block split indicator may be an indicator indicating whether a target block is to be split. Also, the block split indicator may indicate the type of splitting of a block.

The type of splitting may include the direction of splitting. The direction of splitting may be a vertical direction or a horizontal direction.

The type of splitting may include the number of partition blocks generated by splitting.

In an embodiment, an indicator may include information that is explicitly signaled from the encoding apparatus 1200 to the decoding apparatus 1300 through a bitstream. In an embodiment, the indicator may include the block split indicator.

When the block split indicator is used, the decoding apparatus 1300 may directly determine whether to split a target block and which type of splitting is used, based on the block split indicator provided from the encoding apparatus 1200.

The block split indicator may be selective (or, optional). When the block split indicator is not used, the processing unit may determine whether to split a target block and which type of splitting is to be used, based on the conditions of use of information related to the target block. Therefore, whether to split the target block may be determined without signaling of additional information.

For example, when the block split indicator indicates that the target block is to be split, the processing unit may split a non-square target block into square blocks.

The block split indicator may be encoded and/or decoded for at least one unit of a Sequence Parameter Set (SPS), a Picture Parameter Set (PPS), a slice header, a tile header, a Coding Tree Unit (CTU), a Coding Unit (CU), a Prediction Unit (PU), and a Transform Unit (TU). In other words, the unit by which the block split indicator is provided may be at least one of the SPS, PPS, slice header, tile header, CTU, CU, PU, and TU. The block split indicator provided for a specific unit may be applied in common to one or more target blocks included in the specific unit.

11) In an embodiment, the processing unit may determine, based on split information of a reference block, whether to apply the splitting of the target block.

The reference block may be a spatially adjacent block and/or a temporally adjacent block.

For example, the split information may be at least one of quad-tree split information, binary tree split information, and quad-tree plus binary tree (QTBT) information.

For example, when the reference block split information indicates that the target block is to be split, the processing unit may split a non-square target block into square blocks.

12) In an embodiment, the processing unit may determine, based on the temporal layer level of the target block, whether to apply the splitting of the target block.

For example, when the temporal layer level of a non-square target block 1) is equal to a specific value or 2) falls within a specific range, the processing unit may split the non-square target block into square blocks.

13) Further, in an embodiment, the information related to the target block may further include the above-described information that is used for the encoding and/or decoding of the target block.

In the above-described embodiments 1) to 13), the specific value, the specific range and/or the specific unit may be set by the encoding apparatus 1200 or the decoding apparatus 1300. When the specific value, the specific range, and the specific unit are set by the encoding apparatus 1200, the set specific value, the set specific range and/or the set specific unit may be signaled from the encoding apparatus 1200 to the decoding apparatus 1300 through a bitstream.

Alternatively, the specific value, the specific range, and/or the specific unit may be derived from an additional coding parameter. When the coding parameter is shared between the encoding apparatus 1200 and the decoding apparatus 1300 through a bitstream, or can be equally derived by the encoding apparatus 1200 and the decoding apparatus 1300 using a predefined derivation scheme, the specific value, the specific range, and/or the specific unit may not be signaled from the encoding apparatus 1200 to the decoding apparatus 1300.

In the above-described embodiments 1) to 13), the determination of whether to split the target block based on a criterion for the shape of the target block is only an example. In the above-described embodiments 1) to 13), the determination of whether to split the target block may be combined with other criteria described in the embodiments, such as the size of the target block.

At step 1420, the processing unit may derive a prediction mode for at least some of multiple partition blocks.

In an embodiment, prediction may be intra prediction or inter prediction.

An example of step 1420 will be described in detail later with reference to FIG. 21.

At step 1430, the processing unit may perform prediction on the multiple partition blocks based on the derived prediction mode.

In an embodiment, the processing unit may perform prediction on at least some of the multiple partition blocks using the derived prediction mode. The processing unit may perform prediction on the remaining blocks, among the multiple partition blocks, using a prediction mode that is generated on based on the derived prediction mode.

Prediction performed on the partition blocks will be described later with reference to FIGS. 22, 23, 24, 25, 26, 27, and 28.

Figure 15:
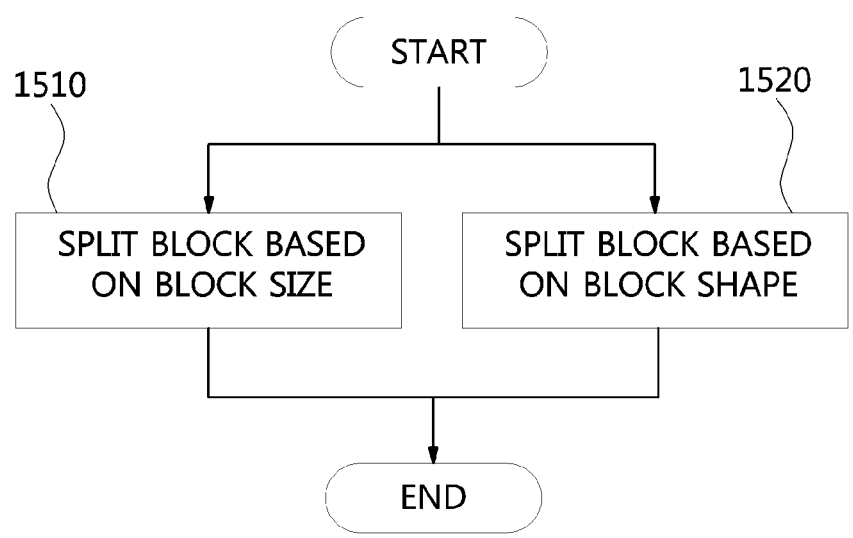
FIG. 15 is a flowchart of a block-splitting method according to an embodiment.

FIG. 15 is a flowchart of a block-splitting method according to an embodiment.

The block-splitting method according to the present embodiment may correspond to the above-described step 1410. Step 1410 may include at least one of steps 1510 and 1520.

At step 1410, the processing unit may generate multiple partition blocks by splitting a target block based on one or more of the size of the target block and the shape of the target block.

The size of the target block may mean the width and/or the height of the target block.

The shape of the target block may indicate whether the target block has a square shape. The shape of the target block may indicate whether the target block has a square shape or a non-square shape. The shape of the target block may be the ratio of the width to the height of the target block.

The processing unit may generate multiple partition blocks by splitting the target block using at least one of a prediction mode selection method at step 1510 and a prediction mode selection method at step 1520.

At step 1510, the processing unit may generate multiple partition blocks by splitting the target block based on the width or the height of the target block.

In an embodiment, the processing unit may split the target block when the width and the height of the target block are different from each other.

In an embodiment, the processing unit may split, at least once, the larger one of the width and the height of the target block.

In an embodiment, the processing unit may split the target block so that the width and the height of a partition block are identical to each other. Alternatively, the width and the height of a partition block, generated by splitting, may be equal to or greater than the smaller one of the width and the height of the target block.

Examples of the target block and splitting of the target block based on the size thereof will be described later with reference to FIGS. 16, 17, 18, 19, and 20.

In an embodiment, the processing unit may split the target block when the size of the target block is less than a specific size and the width and the height of the target block are different from each other.

In an embodiment, the processing unit may split the target block when the sum of the width and the height of the target block is less than a specific value and the width and the height of the target block are different from each other.

In an embodiment, the processing unit may split the target block when the size of the target block falls within a specific range and the width and the height of the target block are different from each other.

At step 1520, the processing unit may generate multiple partition blocks by splitting the target block based on the shape of the target block.

The processing unit may not split the target block when the target block has a square shape.

The processing unit may split the target block into square shapes when the target block has a non-square shape. The splitting into square shapes will be described later with reference to FIGS. 16, 17, 18, and 20.

As described above at steps 1510 and 1520, the processing unit may use only the size and the shape of the target block to determine whether to split the target block, but may not use information directly indicating whether to split the target block. Therefore, the information indicating whether to split a block may not be signaled from the encoding apparatus 1200 to the decoding apparatus 1300, and whether to split a block may be derived based on the size and/or the shape of the target block.

Figure 16:
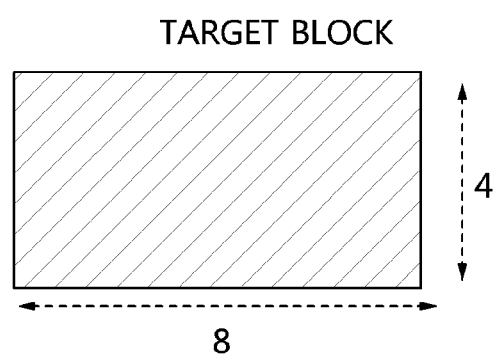
FIG. 16 illustrates an 8×4 target block according to an example.

FIG. 16 illustrates an 8×4 target block according to an example.

Figure 17:
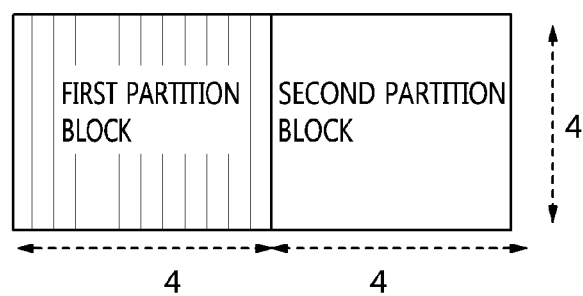
FIG. 17 illustrates 4×4 partition blocks according to an example.

In FIG. 17, the splitting of the target block will be explained.

FIG. 17 illustrates 4×4 partition blocks according to an example.

The size of each of a first partition block and a second partition block may be 4×4.

As illustrated in FIG. 17, when the width of the target block is greater than the height thereof, the width of the target block illustrated in FIG. 16 is vertically split, and thus two partition blocks may be derived.

Figure 18:
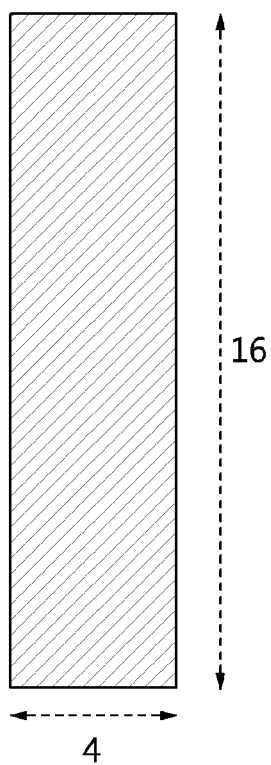
FIG. 18 illustrates a 4×16 target block according to an example.

FIG. 18 illustrates a 4×16 target block according to an example.

Figure 19:
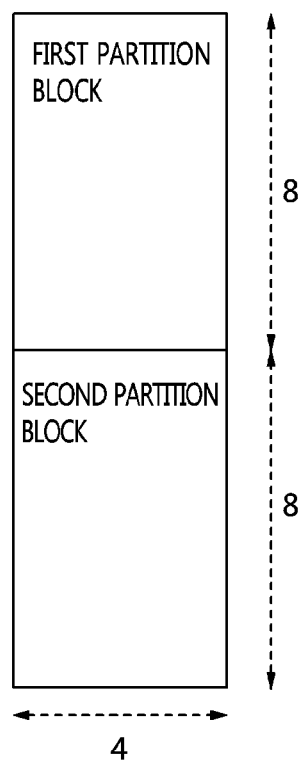
FIG. 19 illustrates 8×4 partition blocks according to an example.
Figure 20:
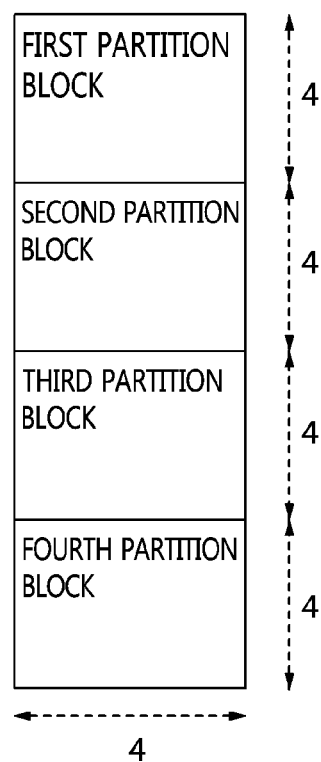
FIG. 20 illustrates 4×4 partition blocks according to an example.

In FIGS. 19 and 20, the splitting of the target block will be explained.

FIG. 19 illustrates 8×4 partition blocks according to an example.

The size of each of a first partition block and a second partition block may be 8×4.

FIG. 20 illustrates 4×4 partition blocks according to an example.

The size of each of a first partition block, a second partition block, a third partition block, and a fourth partition block may be 4×4.

As illustrated in FIGS. 19 and 20, when the height of the target block is greater than the width thereof, the height of the target block illustrated in FIG. 18 is horizontally split, and thus two partition blocks or four partition blocks may be derived.

Figure 21:
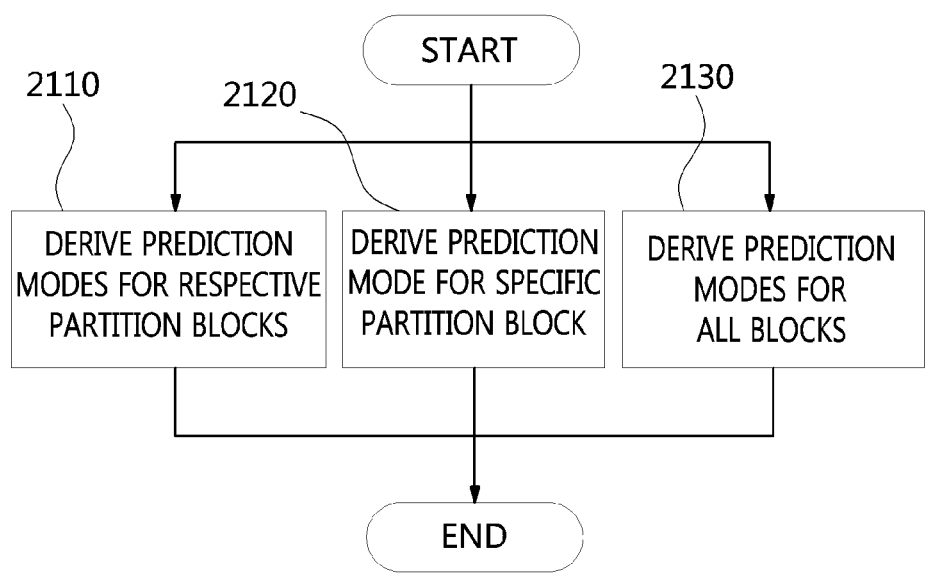
FIG. 21 is a flowchart of a method for deriving the prediction modes of partition blocks according to an example.

FIG. 21 is a flowchart of a method for deriving the prediction modes of partition blocks according to an example.

The prediction mode derivation method according to the embodiment may correspond to the above-described step 1420. Step 1420 may include at least one of steps 2110, 2120, and 2130.

For multiple partition blocks generated by the splitting of the target block, 1) respective prediction modes may be derived for the multiple partition blocks, 2) a prediction mode may be derived for a specific partition block, among the multiple partition blocks, and 3) a common prediction mode may be derived for all of the multiple partition blocks.

At least one of steps 2110, 2120, and 2130 may be performed according to the target of the derived prediction mode.

At step 2110, the processing unit may derive respective prediction modes for the multiple partition blocks.

The processing unit may derive respective prediction modes for the multiple partition blocks using the prediction mode derivation method described above in the embodiments.

At step 2120, the processing unit may derive a prediction mode for a specific partition block, among the multiple partition blocks.

The specific partition block may be a block at a specific location, among the multiple partition blocks.

For example, the specific partition block may be one or more of an uppermost block, a lowermost block, a leftmost block, a rightmost block, an n-th block from the top, an n-th block from the bottom, an n-th block from the left, and an n-th block from the right, among the multiple partition blocks. Here, n may be an integer that is equal to or greater than 1 and that is less than or equal to the number of partition blocks.

In an embodiment, the processing unit may derive a prediction mode for a specific partition block, among the multiple partition blocks, using the prediction mode derivation method described in the foregoing embodiments.

In an embodiment, the derived prediction mode may be used for the remaining partition blocks other than the specific partition block, among the multiple partition blocks. The processing unit may use the derived prediction mode for the remaining partition blocks other than the specific partition block, among the multiple partition blocks.

In an embodiment, a combination of the derived prediction mode and an additional prediction mode may be used for the remaining partition blocks other than the specific partition block, among the multiple partition blocks. The processing unit may use a prediction mode that is decided on by the combination of the derived prediction mode and the additional prediction mode, for the remaining blocks other than the specific partition block, among the multiple partition blocks.

For example, the additional prediction mode may be decided on using coding parameters related to respective remaining blocks. The processing unit may decide on the additional prediction mode using coding parameters related to the remaining blocks, and may decide on the prediction mode for the remaining blocks using the combination of the above-described prediction mode, which is derived for the specific block, and the additional prediction mode.

For example, the combination of prediction modes may be a prediction mode indicating a direction between the directions of the prediction modes. The combination of the prediction modes may be a prediction mode that is selected from among the prediction modes according to a specific priority. The prediction mode that is decided on using the combination of the prediction modes may differ from each of the prediction modes used for the combination.

At step 2130, the processing unit may derive a common prediction mode for all of the multiple partition blocks. In other words, a single common prediction mode for the multiple partition blocks may be derived.

For example, the processing unit may derive a common prediction mode for all of multiple partition blocks using a common coding parameter for all of the multiple partition blocks.

Derivation of Prediction Mode Using Most Probable Mode (MPM)

In the derivation of prediction modes for the above-described partition blocks, the processing unit may use a Most Probable Mode (MPM).

In order to use the MPM, the processing unit may configure an MPM list.

The MPM list may include one or more MPM candidate modes. The number of the one or more MPM candidate modes may be N. N may be a positive integer.

In an embodiment, the processing unit may set the value of N depending on the size and/or the shape of a target block. Alternatively, the processing unit may set the value of N depending on the size, shape and/or number of partition blocks.

Each of the one or more MPM candidate modes may be one of predefined intra-prediction modes.

The processing unit may configure one or more MPM candidate modes in the MPM list based on one or more prediction modes of one or more reference blocks for the target block. The reference blocks may be blocks at predefined locations, or may be blocks adjacent to the target block. For example, the one or more reference blocks may be blocks adjacent to the top of the target block and blocks adjacent to the left of the target block.

The one or more MPM candidate modes may be one or more prediction modes that are decided on based on the prediction modes of the reference blocks. The processing unit may decide on one or more prediction modes, specified with reference to the prediction modes of one or more reference blocks, as the one or more MPM candidate modes. In other words, the one or more MPM candidate modes may be prediction modes having a high probability of being the prediction mode of the target block. Such a probability may be calculated using experiments or the like. For example, it is known that the possibility that the prediction modes of the reference blocks will be used as the prediction mode of the target block is strong due to local association between the reference blocks and the target block. Therefore, the prediction modes of the reference blocks may be included in the one or more MPM candidate modes.

In an embodiment, the number of MPM lists may be one or more, and may be plural. For example, the number of MPM lists may be M. M may be a positive integer. The processing unit may configure respective multiple MPM lists using different methods.

For example, the processing unit may configure a first MPM list, a second MPM list, and a third MPM list.

The MPM candidate modes in the one or more MPM lists may be different from each other. Alternatively, the MPM candidate modes in the one or more MPM lists may not overlap each other. For example, when a specific intra-prediction mode is contained in one MPM list, multiple MPM lists may be configured such that the specific intra-prediction mode is not contained in other MPM lists.

An MPM list indicator may be used to specify an MPM list containing the prediction mode that is used for the encoding and/or decoding of the target block, among the one or more MPM lists. In other words, an MPM list indicated by the MPM list indicator, among the one or more MPM lists, may be specified, and the processing unit may use any one of one or more MPM candidate modes, contained in the specified MPM list, for prediction of the target block.

The MPM list indicator may be signaled from the encoding apparatus 1200 to the decoding apparatus 1300 through a bitstream.

When the MPM list indicator is used, the decoding apparatus 1300 may directly determine an MPM list, which contains an MPM candidate mode to be used for prediction of the target block, among the one or more MPM lists, based on the MPM list indicator provided from the encoding apparatus 1200.

In an embodiment, an MPM usage indicator may indicate whether a prediction mode is to be decided on using an MPM list.

The MPM usage indicator may indicate whether the prediction mode of the target block is present among the one or more MPM candidate modes in the configured MPM list.

When the MPM usage indicator indicates that the prediction mode of the target block is present among the one or more MPM candidate modes, the processing unit may decide on the prediction mode of the target block, among the one or more MPM candidate modes, using an index indicator.

The index indicator may indicate an MPM candidate mode to be used for prediction of the target block, among the one or more MPM candidate modes in the MPM list. The processing unit may decide an MPM candidate mode, indicated by the index indicator, among the one or more MPM candidate modes in the MPM list, as the prediction mode of the target block. The index indicator may also be referred to as an "MPM index".

When an MPM list is indicated by the MPM list indicator, among the one or more MPM lists, the index indicator may be utilized to indicate which MPM candidate mode is to be used for prediction of the target block, among the one or more MPM candidate modes in the MPM list indicated by the MPM list indicator. In other words, the prediction mode of the target block may be specified by the MPM list indicator and the index indicator.

When the MPM usage indicator indicates that the prediction mode of the target block is not present among the one or more MPM candidate modes in the MPM list, the processing unit may decide on the prediction mode of the target block using a prediction mode indicator indicating the prediction mode of the target block. The prediction mode indicator may indicate the prediction mode of the target block.

The prediction mode indicator may indicate one of prediction modes that are not contained in the MPM list (or one or more MPM lists). In other words, one or more prediction modes that are not contained in the MPM list or one or more MPM lists may be configured in the form of a prediction mode list in a predefined order, and the prediction mode indicator may indicate one of the one or more prediction modes in the prediction mode list.

The one or more prediction modes in the prediction mode list may be sorted in ascending order or descending order. Here, the sorting criterion may be the number of each prediction mode.

When there are multiple MPM lists, separate MPM usage indicators may be used for respective multiple MPM lists. Alternatively, when there are multiple MPM lists, MPM usage indicators may be present for some of the multiple MPM lists.

For example, an n-th MPM usage indicator for an n-th MPM list may indicate whether the prediction mode of the target block is present in the n-th MPM list.

First, the processing unit may determine whether the prediction mode of the target block is present in a first MPM list using a first MPM usage indicator. If it is determined that the prediction mode of the target block is present in the first MPM list, the processing unit may derive an MPM candidate mode, indicated by an index indicator in the first MPM list, as the prediction mode of the target block. If it is determined that the prediction mode of the target block is not present in the first MPM list, the processing unit may determine whether the prediction mode of the target block is present in a second MPM list using a second MPM usage indicator.

The processing unit may determine whether the prediction mode of the target block is present in an n-th MPM list using an n-th MPM usage indicator. If it is determined that the prediction mode of the target block is present in the n-th MPM list, the processing unit may decide on the MPM candidate mode, indicating the prediction mode of the target block in the n-th MPM list, using an index indicator. If it is determined that the prediction mode of the target block is not present in the first MPM list, the processing unit may determine whether the prediction mode of the target block is present in an n+1-th MPM list using a subsequent n+1-th MPM usage indicator.

When one MPM usage indicator indicates that the prediction mode of the target block is present in the corresponding MPM list, MPM usage indicators subsequent to that MPM usage indicator may not be signaled.

The MPM usage indicator, the index indicator, and/or the prediction mode indicator may be signaled from the encoding apparatus 1200 to the decoding apparatus 1300 through a bitstream.

When the MPM usage indicator, the index indicator and/or the prediction mode indicator are used, the decoding apparatus 1300 may directly determine which MPM candidate mode or which prediction mode is to be used for the prediction of the target block, among 1) MPM candidate modes that are contained in one or more MPM lists and 2) one or more prediction modes that are not contained in the one or more MPM lists, based on the MPM usage indicator, the index indicator and/or the prediction mode indicator provided from the encoding apparatus 1200.

Each MPM list may be configured for a specific unit.

In an embodiment, the specific unit may be a block having a specified size or a target block.

When a specific unit is split, the processing unit may utilize the configured MPM list for the prediction of multiple partition blocks generated by splitting.

In an embodiment, when the size of the target block is equal to the specified size or corresponds to the specified size, the processing unit may configure an MPM list for the target block. When the target block is split into multiple partition blocks, the processing unit may derive the prediction mode of each of the multiple partition blocks using the MPM list configured for the target block.

For example, when the size of the target block is 8×8 and the partition blocks are four 4×4 blocks, an MPM list may be configured for the 8×8 block, and MPM lists respectively configured for the four 4×4 blocks may be used.

In an embodiment, when MPM lists are configured, the processing unit may configure MPM lists for respective partition blocks, included in a block having a specified size, based on the block having the specified size. In other words, the MPM list generated for the block having the specified size may be used in common for the partition blocks.

For example, when the size of the target block is the specified size, MPM lists for respective partition blocks in the target block may be configured using the prediction modes of one or more reference blocks for the target block (not the partition blocks).

For example, when the size of the target block is 8×8, and partition blocks are four 4×4 blocks, the processing unit may configure MPM lists for four respective partition blocks based on one or more reference blocks for the target block. In this case, since the prediction modes of the reference blocks for the target block are already obtained, the processing unit may configure MPM lists for four partition blocks in parallel.

Figure 22:
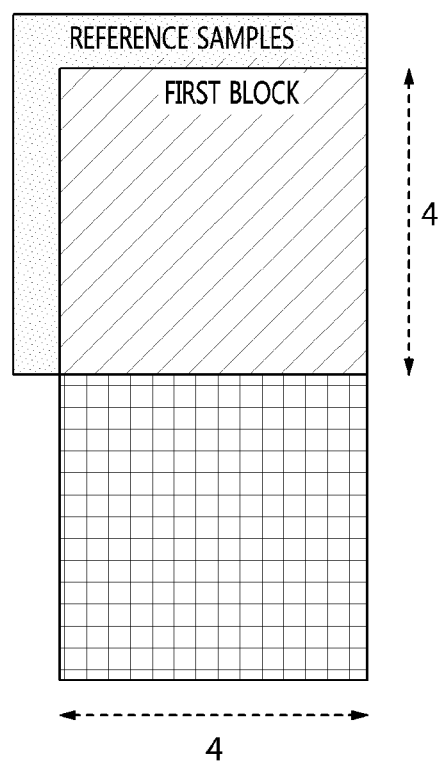
FIG. 22 illustrates prediction of a partition block according to an example.

FIG. 22 illustrates the prediction of a partition block according to an example.

In FIG. 22, a first block may be a specific block, among partition blocks. For example, the first block may be a block on which prediction is performed first, among the partition blocks.

A processing unit may derive a prediction mode of a first block when predicting the first block.

As illustrated in FIG. 22, the processing unit may use reference samples adjacent to the first block when predicting the first block. Alternatively, the reference samples may be pixels neighboring the first block. The reference samples may be pixels in a reconstructed block adjacent to the first block.

Figure 23:
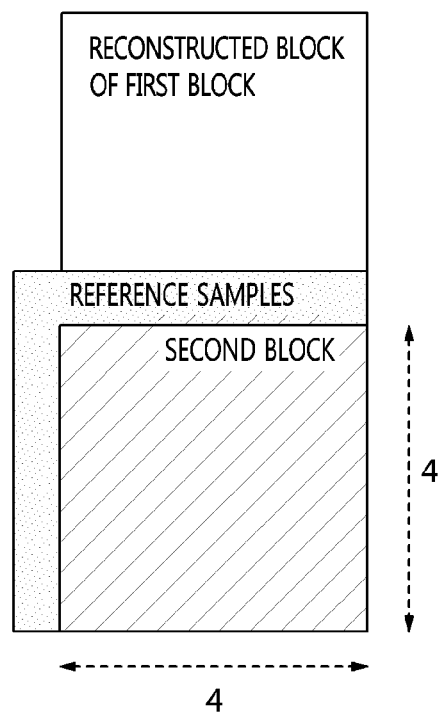
FIG. 23 illustrates prediction of a partition block that uses a reconstructed block of the partition block according to an example.

FIG. 23 illustrates the prediction of a partition block that uses a reconstructed block of a partition block according to an example.

In FIG. 23, a second block may be a specific block, among partition blocks. For example, the second block may be 2) a block on which prediction is performed second, 3) a block on which prediction is performed last, 3) a block on which prediction is performed subsequent to the prediction of the first block, 4) a block on which prediction is performed after the prediction of the first block, or 5) a block on which prediction is performed after the prediction of at least one partition block, among partition blocks.

As described above, the processing unit may use a prediction mode, which is derived for the first block, when the prediction of the second block is performed.

As illustrated in FIG. 22, the processing unit may use reference samples adjacent to the second block when predicting the second block.

The reference samples may be pixels in a reconstructed block adjacent to the second block. The reference samples may include reconstructed pixels in a reconstructed block of the first block.

Alternatively, the reference samples may include reconstructed pixels present in a reconstructed block of an additional partition block, which is predicted before the prediction of the second block. In other words, when the prediction of the second block is performed, an additional partition block, which is predicted before the prediction of the second block, among multiple partition blocks, may be used.

Figure 24:
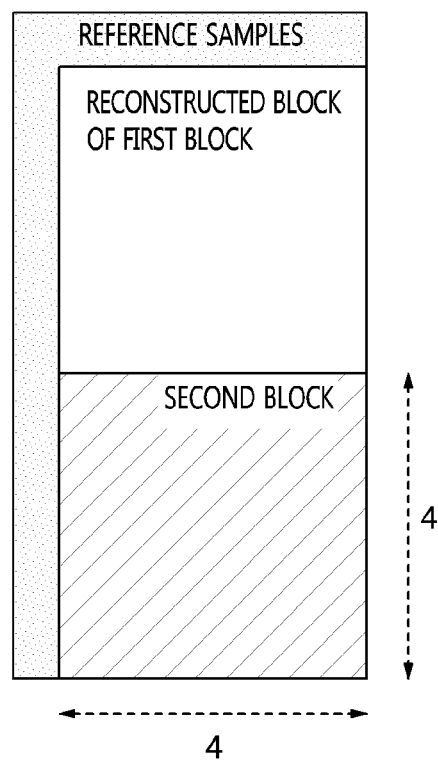
FIG. 24 illustrates prediction of a partition block using external reference pixels for the partition block according to an example.

FIG. 24 illustrates prediction of a partition block using external reference pixels for the partition block according to an example.

A processing unit may use external pixels for multiple partition blocks as reference samples in the prediction of the partition blocks. In other words, the processing unit may exclude the internal pixels of multiple partition blocks from reference samples when the prediction of partition blocks is performed. The pixels excluded from reference samples may be replaced with 1) the closest pixels that are located in the same direction as the direction of the excluded pixels, or 2) pixels that are adjacent to the target block and are located in the same direction as the direction of the excluded pixels.

In an embodiment, in the prediction of multiple partition blocks, reference samples used for the prediction may be reconstructed pixels adjacent to the target block (rather than respective partition blocks).

For example, as illustrated in FIG. 24, the processing unit may exclude pixels in a reconstructed block of a first block from reference samples in the prediction of a second block, and may use reconstructed pixels adjacent to a reference block as reference samples.

For example, the processing unit may use reconstructed pixels adjacent to a target block as reference samples when the prediction of each of multiple partition blocks generated by the splitting of the target block is performed. By means of decision of these reference samples, the values of all reference samples to be used for the prediction of multiple partition blocks may be set before the prediction of the multiple partition blocks. Therefore, before the prediction of the multiple partition blocks, the processing unit may set the values of all reference samples to be used for the prediction of the multiple partition blocks, and may then perform prediction on the multiple partition blocks in parallel.

Figure 25:
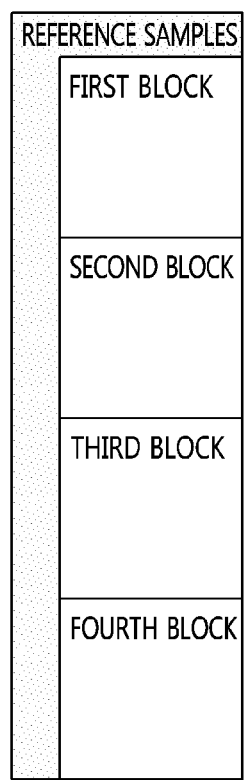
FIG. 25 illustrates prediction of four partition blocks according to an example.

FIG. 25 illustrates prediction of four partition blocks according to an example.

As illustrated in FIG. 25, a first block, a second block, a third block, and a fourth block may be generated by the splitting of a target block.

As described above, a processing unit may derive the prediction mode of a specific partition block, among the multiple partition blocks.

In FIG. 25, a prediction mode may be derived for the fourth block, which is the lowermost block, by way of example. The derived prediction mode may be used for the remaining blocks, that is, the first block, the second block, and the third block.

The processing unit may primarily perform prediction on the specific partition block for which the prediction mode is derived, among the multiple partition blocks. Next, the processing unit may perform prediction, using the derived prediction mode, on the remaining blocks other than the specific partition block, among the multiple partition blocks.

In the prediction of the specific partition block for which the prediction mode is derived, the processing unit may use reconstructed pixels neighboring the specific partition block and/or the target block as reference samples.

In accordance with FIG. 25, reconstructed pixels adjacent to the top of the fourth block may not be present at the time of prediction of the fourth block. Therefore, in the prediction of the fourth block, the processing unit may use reconstructed pixels adjacent to the top of the target block as reference pixels.

The processing unit may perform prediction on the multiple partition blocks in a predefined order. The predefined order may be different from the order of normal blocks, other than blocks that are generated by splitting. For example, the predefined order may be 1) the order from the lowermost block to the uppermost block or 2) the order from the rightmost block to the leftmost block. Alternatively, the predefined order may be 3) the order in which the lowermost block is selected first, and thereafter blocks ranging from the uppermost block to the second block from the bottom are sequentially selected, or 4) the order in which the rightmost block is selected first, and thereafter blocks ranging from the leftmost block to the second block from the right are sequentially selected.

Alternatively, the predefined order may be arbitrarily set by the encoding apparatus 1200 and/or the decoding apparatus 1300. When the predefined order is set by the encoding apparatus 1200, the set predefined order may be signaled from the encoding apparatus 1200 to the decoding apparatus 1300.

A prediction order indicator may indicate the order of the prediction of multiple partition blocks. The encoding apparatus 1200 may set the value of the prediction order indicator. The prediction order indicator may be signaled from the encoding apparatus 1200 to the decoding apparatus 1300 through a bitstream.

Alternatively, the predefined order may be individually derived by the encoding apparatus 1200 and/or the decoding apparatus 1300 based on the same predefined scheme. The processing unit may derive the predefined order using a coding parameter or the like related to the target block.

Figure 26:
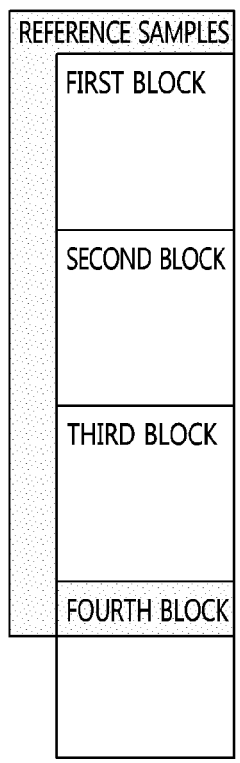
FIG. 26 illustrates prediction of a first block after prediction of a fourth block has been performed according to an example.

FIG. 26 illustrates prediction of a first block after prediction of a fourth block has been performed according to an example.

As described above, a predefined order may be used to perform prediction on multiple partition blocks.

The predefined order illustrated in FIG. 26 may be designated such that, after prediction of the lowermost block, among multiple partition blocks, is performed first, prediction of blocks ranging from the uppermost block to the second block from the bottom is sequentially performed from the top to the bottom. In the order defined according to the embodiment, the term "lowermost (bottom)" may be replaced with the term "rightmost" and the term "uppermost (top)" may be replaced with the term "leftmost".

Since the prediction of multiple partition blocks is performed in the predefined order, additional reference samples may be available, as illustrated in FIG. 26, compared to a configuration in which prediction of multiple partition blocks is performed in an existing order. Therefore, intra prediction in an additional direction, which uses the additionally available reference samples, may be used compared to typical intra prediction.

When the prediction of each of multiple partition blocks is performed, the processing unit may use pixels present in a reconstructed block of a partition block, which is predicted before the prediction of the corresponding partition block, as reference samples.

For example, as illustrated in FIG. 26, the processing unit may use pixels, present in a reconstructed block of the previously predicted fourth block, as reference samples when prediction of the first block is performed.

Depending on the use of such a predefined order and the use of pixels present in a reconstructed block of a previously predicted partition block, reference samples may be provided in more directions than in the case where the prediction of partition blocks is performed only in a normal order. For example, as illustrated in FIG. 26, reference samples located below the first block may be provided to the first block.

In an embodiment, in the prediction of a partition block, the processing unit may perform intra prediction that uses reference samples adjacent to the bottom of the partition block and intra prediction that uses reference samples adjacent to the right of the partition block.

For example, reference samples adjacent to the bottom of the partition block may be copied into a prediction block at the upper, upper-left, and/or upper-right locations thereof. The reference samples adjacent to the right of the partition block may be copied into a prediction block at the left, upper-left and/or lower-left locations thereof.

Figure 27:
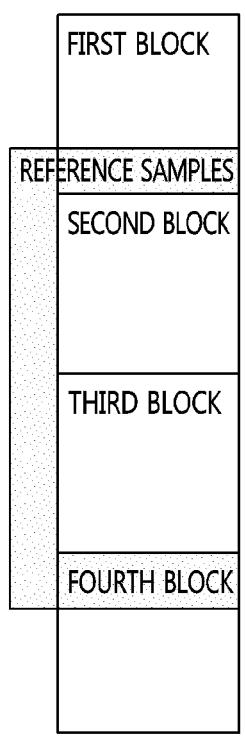
FIG. 27 illustrates prediction of a second block according to an example.

FIG. 27 illustrates prediction of a second block according to an example.

The prediction of the second block may be performed after the prediction of the fourth block and the prediction of the first block. Therefore, as described above, reference samples used for the prediction of the second block may include pixels in a reconstructed block of the fourth block and pixels in a reconstructed block of the first block.

In other words, when performing prediction on a specific partition block, among multiple partition blocks, the processing unit may use pixels in reconstructed blocks of other partition blocks as reference pixels. Here, other partition blocks may be blocks on which prediction has been performed before prediction of the specific partition block, among the multiple partition blocks, is performed.

Alternatively, when prediction of a third block is performed earlier than the second block, the reference samples illustrated in FIG. 27 may also be used for the prediction of the third block.

Figure 28:
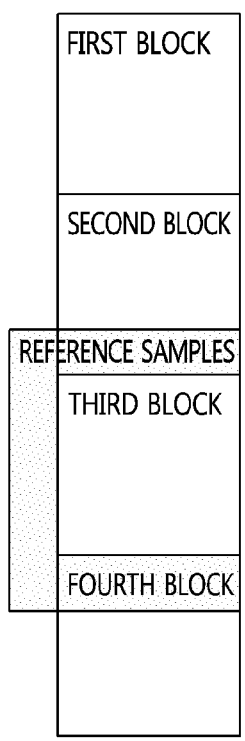
FIG. 28 illustrates prediction of a third block according to an example.

FIG. 28 illustrates prediction of a third block according to an example.

The prediction of the third block may be performed last after prediction of the fourth block, prediction of the first block, and prediction of the second block.

FIG. 28 shows available reference samples in the prediction of the third block.

In an embodiment, in partition blocks, the type of reference samples to be used for prediction of a specific partition block may be selected from among multiple reference sample types.

For example, in the prediction of the third block, the processing unit may use one of reference samples illustrated in FIG. 25, reference samples illustrated in FIG. 26, reference samples illustrated in FIG. 27, and reference samples illustrated in FIG. 28.

The processing unit may use reference samples corresponding to one of the multiple reference sample types when prediction of a specific partition block is performed.

The multiple reference sample types may include a first reference sample type, a second reference sample type, and a third reference sample type.

The reference samples of the first reference sample type may be reconstructed pixels adjacent to a target block. In other words, the reference samples of the first reference sample type may be the reference samples illustrated in FIG. 25.

The reference samples of the second reference sample type may be the reference samples of the first reference sample type and pixels in a reconstructed block of a partition block on which prediction has been previously performed. In other words, the reference samples of the second reference sample type may be the reference samples illustrated in FIG. 26 or 27.

In an embodiment, the pixels in the reconstructed block of the partition block on which prediction has been previously performed may be used in a direction which is not covered only by reconstructed pixels adjacent to the target block. In other words, the reconstructed pixels adjacent to the target block may be used prior to the pixels in the reconstructed block of the partition block (e.g. the reference samples illustrated in FIG. 26).

Alternatively, in an embodiment, the pixels in the reconstructed block of the partition block, on which prediction has been previously performed, may replace at least some of the reconstructed pixels adjacent to the target block (e.g. the reference samples illustrated in FIG. 27).

In other words, the pixels in the reconstructed block of the partition block may be used prior to the reconstructed pixels adjacent to the target block.

That is, since the pixels in the reconstructed block of the partition block on which prediction has been previously performed are closer to the specific partition block than the reconstructed samples adjacent to the target block, the pixels in the reconstructed block of the partition block on which prediction has been previously performed (instead of the reconstructed pixels adjacent to the target block) may be used for the prediction of the specific partition block, and the reconstructed pixels adjacent to the target block may be used only in a direction that is not covered by the pixels in the reconstructed block of the partition block on which prediction has been previously performed.

The reference samples of the third reference sample type may be reconstructed pixels adjacent to the specific partition block. In other words, the reference samples of the third reference sample type may be the reference samples illustrated in FIG. 28.

In an embodiment, the processing unit may decide on the reference samples to be used for the prediction of the partition block using information related to the target block or the partition block.

In an embodiment, the processing unit may decide on the reference samples to be used for the prediction of the partition block based on a reference sample indicator.

The reference sample indicator may be an indicator indicating reference samples to be used for the prediction of a block. The reference sample indicator may indicate a reference sample type to be used for the prediction of a block, among multiple reference sample types.

The processing unit may set the value of the reference sample indicator.

The reference sample indicator may be signaled from the encoding apparatus 1200 to the decoding apparatus 1300 through a bitstream. Alternatively, in order to at least partially set the reference sample indicator, coding parameters related to reference blocks or the partition block may be used.

When the reference sample indicator is used, the decoding apparatus 1300 may directly decide on reference samples to be used for the prediction of the partition block using the reference sample indicator provided from the encoding apparatus 1200.

Filtering of Reference Samples

Before the above-described prediction is performed, the processing unit may perform filtering on reference samples, and may determine whether to perform filtering on the reference samples.

In an embodiment, the processing unit may determine, based on the size and/or shape of the target block, whether to perform filtering on the reference samples.

In an embodiment, the processing unit may determine, based on the size and/or shape of each partition block, whether to perform filtering on the reference samples.

In an embodiment, the processing unit may determine whether to perform filtering on the reference samples depending on whether a reconstructed block adjacent to the target block is used as a reference block for the partition block.

In an embodiment, the processing unit may determine whether to perform filtering on the reference samples depending on whether prediction of partition blocks is performed in parallel.

Alternatively, in an embodiment, the processing unit may determine whether to perform filtering on the reference samples depending on whether specific functions, operations, and processing described in the embodiments are performed.

Alternatively, in an embodiment, the processing unit may determine whether to perform filtering on the reference samples based on a coding parameter related to the target block or a coding parameter related to each partition block.

Figure 29:
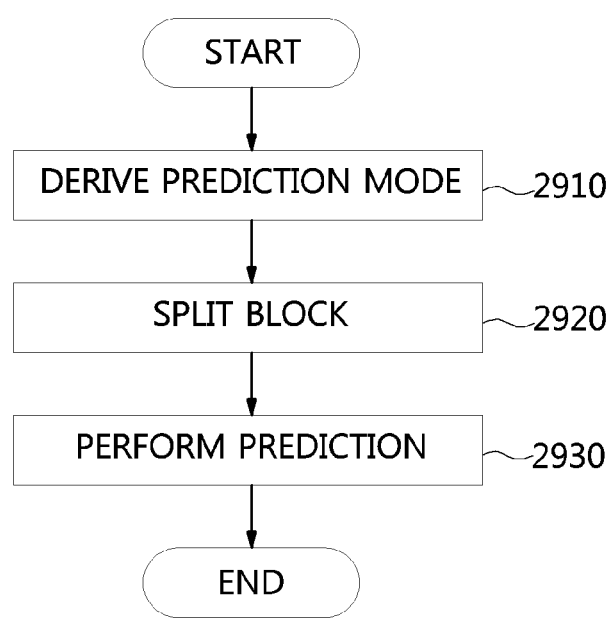
FIG. 29 is a flowchart of a prediction method according to an embodiment.

FIG. 29 is a flowchart of a prediction method according to an embodiment.

In the embodiment described above with reference to FIG. 14, a description has been made on the assumption that multiple partition blocks are generated by splitting a target block at step 1410, and a prediction mode is derived for at least some of the prediction modes of the multiple partition blocks at step 1420.

In the present embodiment, multiple partition blocks may be generated by splitting a target block after a prediction mode has been derived.

At step 2910, a processing unit may derive a prediction mode.

For example, the derived prediction mode may be the prediction mode of the target block. The processing unit may derive the prediction mode based on the above-described scheme for deriving the prediction mode of the target block.

For example, when the target block is split, the derived prediction mode may be a prediction mode used for the prediction of multiple partition blocks generated by the splitting of the target block. In other words, the derived prediction mode may be the prediction mode that is used when the target block is split.

In an embodiment, the derived prediction mode may include multiple prediction modes.

For example, the multiple derived prediction modes may be used for the prediction of multiple partition blocks generated by the splitting of the target block.

A description related to the derivation of prediction modes of the partition blocks in the above-described embodiments may also be applied to the derivation of prediction modes in the present embodiment. For example, an MPM may be used for the derivation of prediction modes. Repetitive descriptions will be omitted here.

At step 2920, the processing unit may generate multiple partition blocks by splitting the target block.

A description related to the splitting of the target block, described above with reference to step 1410, may also be applied to step 2920. Repetitive descriptions will be omitted here.

At step 2930, the processing unit may perform prediction on at least some of the multiple partition blocks using the derived prediction modes.

A description related to the prediction of at least some of the multiple partition blocks, described above with reference to step 1430 or the like, may also be applied to step 2930. However, in the description made with reference to steps 1420 and 1430, a description has been made on the assumption that a prediction mode is derived for a specific partition block, among multiple partition blocks, and that the prediction mode derived for the specific partition block or a prediction mode decided on based on the derived prediction mode is used for the remaining blocks other than the specific partition block. It may be understood from such descriptions that the prediction mode is derived at step 2910 and that the prediction mode, derived at step 2910, or the prediction mode, decided on based on the derived prediction mode, is used for the multiple partition blocks. Repetitive descriptions will be omitted here.

Figure 30:
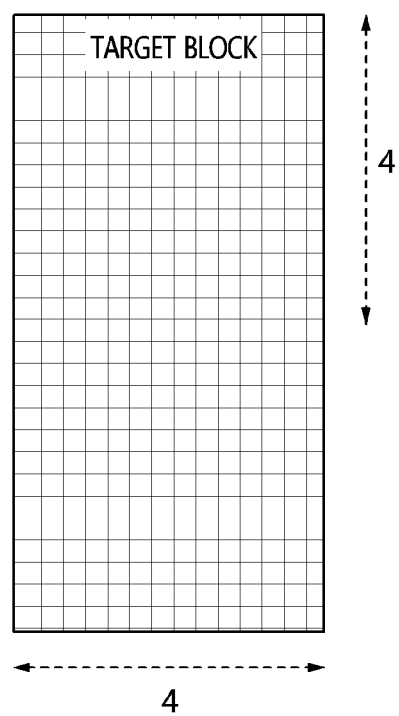
FIG. 30 illustrates the derivation of the prediction mode of a target block according to an example.

FIG. 30 illustrates the derivation of the prediction mode of a target block according to an example.

As described above with reference to the embodiment of FIG. 29, at step 2910, the prediction mode of the target block may be derived. When the prediction mode of the target block is derived, prediction of a first block and a second block may be performed using the derived prediction mode in a way similar to that described above with reference to FIGS. 22, 23, and 24.

Alternatively, at step 2910, multiple prediction modes may be derived for the target block. The multiple derived prediction modes may be used for prediction of respective partition blocks.

A processing unit may determine the prediction mode which is to be used for prediction of a partition block, among the multiple derived prediction modes, and the partition block which is to be used in the prediction mode, depending on the scheme in which a coding parameter or the like related to the target block is used.

Figure 31:
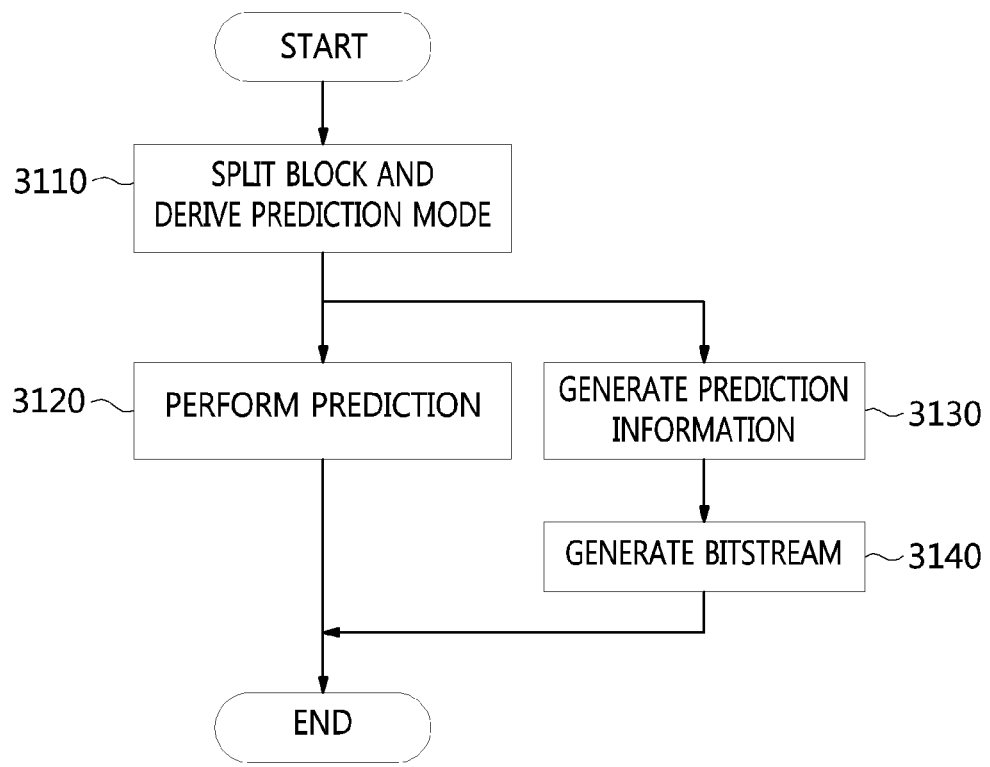
FIG. 31 is a flowchart illustrating a target block prediction method and a bitstream generation method according to an embodiment.

FIG. 31 is a flowchart illustrating a target block prediction method and a bitstream generation method according to an embodiment.

The target block prediction method and the bitstream generation method according to the present embodiment may be performed by an encoding apparatus 1200. The embodiment may be a part of a target block encoding method or a video encoding method.

At step 3110, a processing unit 1210 may split a block and derive a prediction mode.

Step 3110 may correspond to steps 1410 and 1420, described above with reference to FIG. 14. Step 3110 may correspond to steps 2910 and 2920, described above with reference to FIG. 29.

At step 3120, the processing unit 1210 may perform prediction that uses the derived prediction mode.

Step 3120 may correspond to step 1430, described above with reference to FIG. 14. Step 3120 may correspond to step 2930, described above with reference to FIG. 29.

At step 3130, the processing unit 1210 may generate prediction information. The prediction information may be at least partially generated at step 3110 or 3120.

The prediction information may be information that is used for the foregoing block splitting and prediction mode derivation. For example, the prediction information may include the above-described indicators.

At step 3140, the processing unit 1210 may generate a bitstream.

The bitstream may include information about an encoded target block. For example, the information about the encoded target block may include transformed and quantized coefficients of a target block and/or partition blocks, and coding parameters of the target block and/or partition blocks. The bitstream may include the prediction information.

The processing unit 1210 may perform entropy encoding on the prediction information, and may generate a bitstream including entropy-encoded prediction information.

The processing unit 1210 may store the generated bitstream in storage 1240. Alternatively, a communication unit 1220 may transmit the bitstream to a decoding apparatus 1300.

Figure 32:
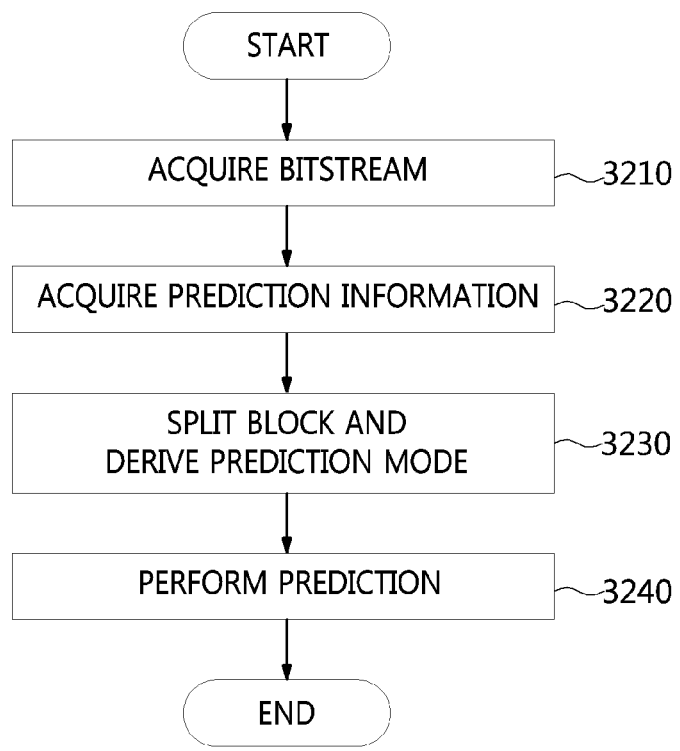
FIG. 32 is a flowchart illustrating a target block prediction method using a bitstream according to an embodiment.

FIG. 32 is a flowchart illustrating a target block prediction method using a bitstream according to an embodiment.

The target block prediction method using a bitstream according to the present embodiment may be performed by a decoding apparatus 1300. The embodiment may be a part of a target block decoding method or a video decoding method.

At step 3210, a communication unit 1320 may acquire a bitstream. The communication unit 1320 may receive the bitstream from the encoding apparatus 1200.

The bitstream may include information about an encoded target block. For example, the information about the encoded target block may include transformed and quantized coefficients of a target block and/or partition blocks and coding parameters of the target block and/or partition blocks. The bitstream may include the prediction information.

The processing unit 1310 may store the acquired bitstream in storage 1240.

At step 3220, the processing unit 1310 may acquire the prediction information from the bitstream.

The processing unit 1310 may acquire the prediction information by performing entropy decoding on the entropy-encoded prediction information of the bitstream.

At step 3230, the processing unit 1210 may split a block and derive a prediction mode using the prediction information.

Step 3230 may correspond to steps 1410 and 1420, described above with reference to FIG. 14. Step 3230 may correspond to steps 2910 and 2920, described above with reference to FIG. 29.

At step 3240, the processing unit 1210 may perform prediction that uses the derived prediction mode.

Step 3240 may correspond to step 1430, described above with reference to FIG. 14. Step 3240 may correspond to step 2930, described above with reference to FIG. 29.

Block Splitting of Block Using Split Indicator

In the above-described embodiment, a target block is described as being split based on the size and/or shape of the target block.

In block splitting, a split indicator may be used. The split indicator of a block may indicate whether two or more partition blocks are to be generated by splitting the block and whether each of the generated partition blocks is to be used as the unit of encoding and decoding when the block is encoded and decoded.

Descriptions related to block splitting and block prediction, made in the foregoing embodiments, may also be applied to the following embodiments.

In an embodiment, the block split indicator may be a binary tree split indicator indicating whether the block is to be split in the form of a binary tree. For example, the name of the binary tree split indicator may be "binarytree_flag" or "BTsplitFlag".

Alternatively, the block split indicator may be a quad-tree indicator, indicating whether the block is to be split in the form of a quad-tree.

In an embodiment, among the values of the split indicator, a first predefined value may indicate that a block is not to be split, and a second predefined value may indicate that a block is to be split.

When the block split indicator has the first predefined value, the processing unit may not split the block.

In an embodiment, when the block split indicator is present and the split indicator has the first predefined value, the block may not be split even if the block has a shape and form to which splitting is to be applied.

In an embodiment, when the block split indicator has the second predefined value, the processing unit may generate partition blocks by splitting the block, and may perform encoding and/or decoding on the partition blocks. Further, when the block split indicator has the second predefined value, the processing unit may generate partition blocks by splitting the block, and may re-split a certain partition block depending on the form and/or shape in which the partition block is split.

In an embodiment, the split indicator of the target block may indicate whether the target block is to be split with respect to the target block. Further, the split indicator of an upper-level block of the target block may indicate whether the upper-level block is to be split. When the split indicator of the upper-level block indicates that the upper-level block is to be split into multiple blocks, the processing unit may split the upper-level block into multiple blocks including the target block. That is, the target block described above in the embodiments may also be regarded as a block generated by splitting through the split indicator or the like.

Figure 33:
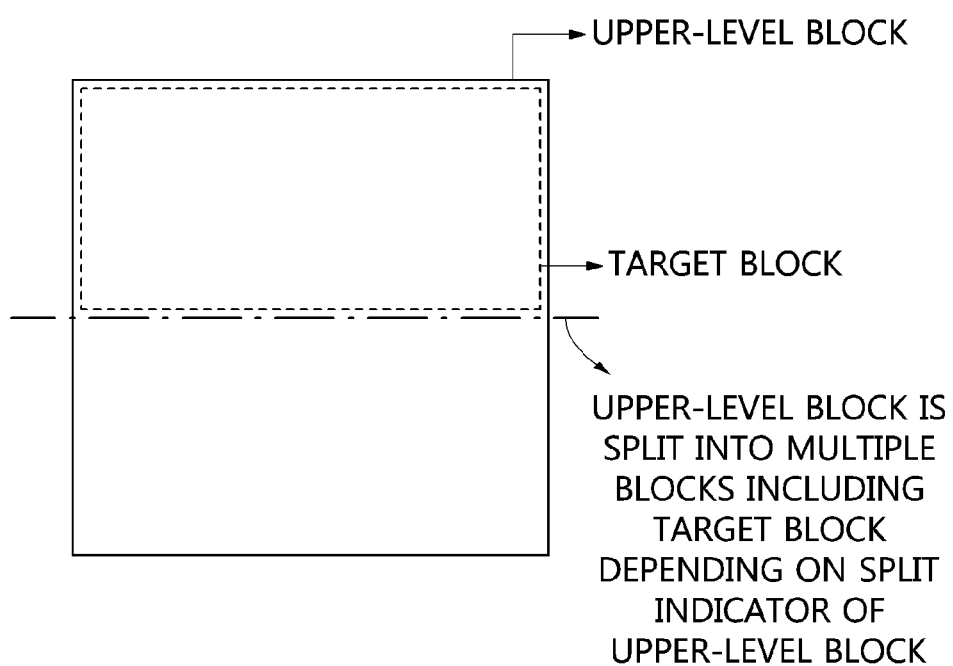
FIG. 33 illustrates the splitting of an upper-level block according to an example.

FIG. 33 illustrates the splitting of an upper-level block according to an example.

For example, when the split indicator of the upper-level block has a second predefined value and the split indicator of a target block has a first predefined value, the upper-level block may be split into multiple blocks including the target block, and each of the multiple blocks including the target block may be the target or unit of specified processing in encoding and/or decoding.

Figure 34:
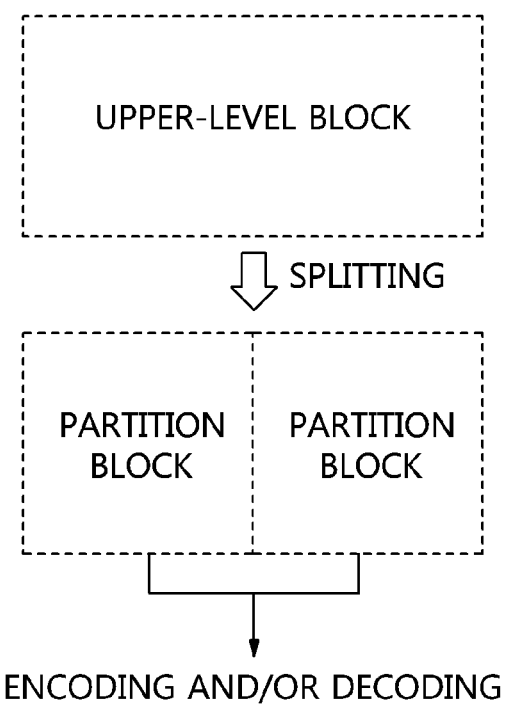
FIG. 34 illustrates the splitting of a target block according to an example.

FIG. 34 illustrates the splitting of a target block according to an example.

For example, when the split indicator of an upper-level block has a second predefined value and a target block generated by splitting the upper-level block has a size and/or a shape to which splitting is to be applied, the target block may be resplit into multiple partition blocks. Each of the multiple partition blocks may be the target or unit of specified processing in encoding and/or decoding.

Block Splitting for Block Transform or the Like

In the foregoing embodiment, a description has been made on the assumption that each of partition blocks is the unit of prediction. The partition blocks in the embodiment may be units of additional processing other than prediction in encoding and/or decoding.

In the following embodiments, embodiments will be described in which a target block or a partition block is used as the unit of processing for prediction, a transform, a quantization, an inverse transform, and an inverse quantization (dequantization) in the encoding and/or decoding of blocks.

Figure 35:
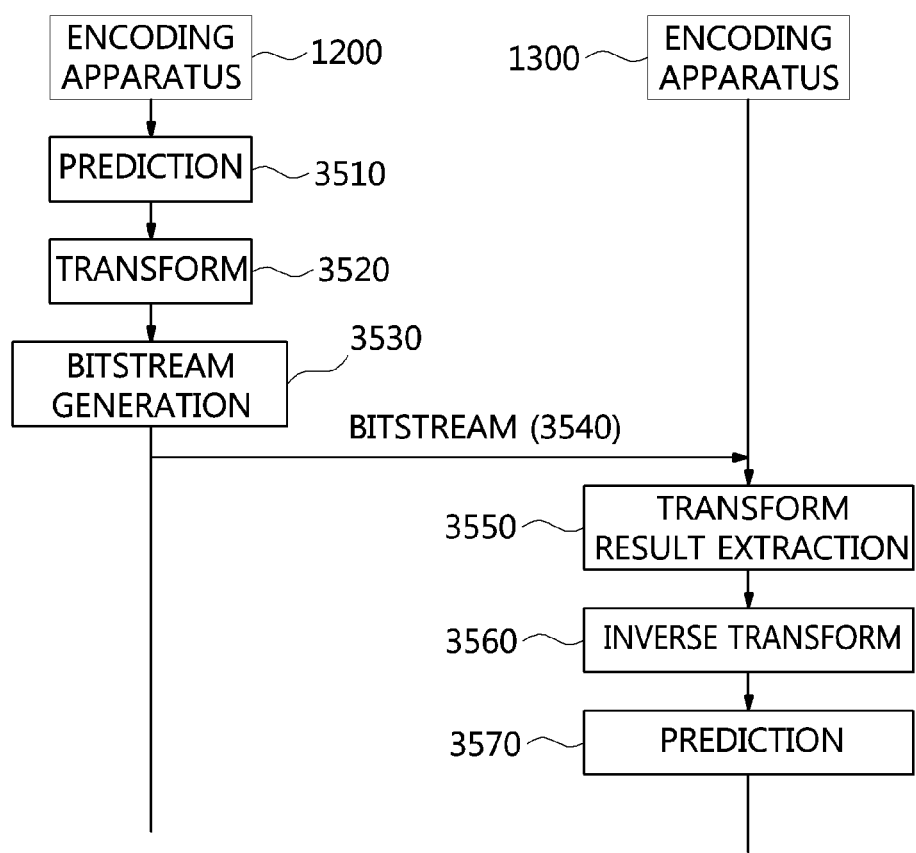
FIG. 35 is a signal flowchart illustrating an image encoding and decoding method according to an embodiment.

FIG. 35 is a signal flowchart illustrating an image encoding and decoding method according to an embodiment.

At step 3510, the processing unit 1210 of an encoding apparatus 1200 may perform prediction related to a target block.

At step 3520, the processing unit 1210 of the encoding apparatus 1200 may perform a transform related to the target block based on the prediction.

At step 3530, the processing unit 1210 of the encoding apparatus 1200 may generate a bitstream including the results of the transform.

At step 3540, the communication unit 1220 of the encoding apparatus 1200 may transmit the bitstream to the communication unit 1320 of a decoding apparatus 1300.

At step 3550, the processing unit 1310 of the decoding apparatus 1300 may extract the results of the transform.

At step 3560, the processing unit 1310 of the decoding apparatus 1300 may perform an inverse transform related to the target block.

At step 3570, the processing unit 1310 of the decoding apparatus 1300 may perform prediction related to the target block.

Detailed functions of steps 3510, 3520, 3530, 3540, 3550, 3560, and 3570 and the prediction, transform, and inverse transform of steps 3510, 3520, 3560, and 3570 will be described in detail below.

Case Where Each of Partition Blocks is Unit of Transform and Inverse Transform

At step 3510, the processing unit 1210 may generate a residual block of the target block by performing prediction on the target block.

At step 3520, the processing unit 1210 may perform a transform on a partition block basis. In other words, the processing unit 1210 may generate residual partition blocks by splitting the residual block, and may generate coefficients of the residual partition blocks by transforming the residual partition blocks, respectively.

Hereinafter, the transform may be construed as including quantization, in addition to the transform. The inverse transform may be construed as including dequantization, and as being performed after the dequantization has been performed. Further, coefficients may be understood to mean the coefficients that are transformed and quantized.

The results of the transform at step 3530 may include the coefficients of multiple partition blocks.

At step 3560, the processing unit 1310 may perform an inverse transform on a partition block basis using the coefficients of each partition block. In other words, the processing unit 1210 may generate a reconstructed residual partition block by inversely transforming the coefficients of the partition block.

The reconstructed residual partition blocks for multiple partition blocks may constitute a reconstructed residual block of the target block. Alternatively, the reconstructed residual block of the target block may include multiple reconstructed residual partition blocks.

At step 3570, the processing unit 1310 may generate the prediction block of the target block by performing prediction on the target block, and may generate a reconstructed block by adding the prediction block to the reconstructed residual block. The reconstructed block may include reconstructed samples.

In an embodiment, a TU split indicator may indicate whether a transform and an inverse transform are to be performed on a partition block basis. For example, the name of the TU split indicator may be "TUsplitFlag".

The TU split indicator may be signaled through a bitstream.

In an embodiment, when the split indicator of an upper-level block has a second predefined value, the target block may be split into multiple partition blocks at the transform and inverse transform steps, and whether a transform and an inverse transform are to be performed on each partition block may be signaled through the TU split indicator.

In an embodiment, when the split indicator of the upper-level block has the second predefined value, and the split indicator of the target block has the first predefined value, the target block may be split into multiple partition blocks at the transform and inverse transform steps, and whether a transform and an inverse transform are to be performed on each partition block may be signaled through the TU split indicator.

In an embodiment, when the shape and/or form of the target block are the shape and/or form to which splitting is to be applied, the target block may be split into multiple partition blocks at the transform and inverse transform steps, and whether a transform and an inverse transform are to be performed on each partition block may be signaled through the TU split indicator.

Here, the shape and/or form to which splitting is to be applied may be the shape and/or form, for example, a non-square shape, in which the splitting of the target block is described as being performed in other foregoing embodiments. Alternatively, the shape and/or form to which splitting is to be applied may mean the inclusion of a state and/or a condition in which the splitting of the target block is described as being performed in other foregoing embodiments. Hereinafter, this is the same as above.

In an embodiment, when the split indicator of the upper-level block has the second predefined value, the target block may be split into multiple square partition blocks, and a transform and an inverse transform may be performed on each partition block at the transform and inverse transform steps.

In an embodiment, when the split indicator of the upper-level block has the second predefined value and the split indicator of the target block has the first predefined value, the target block may be split into multiple square partition blocks, and a transform and an inverse transform may be performed on each partition block at the transform and inverse transform steps.

In an embodiment, when the shape and/or form of the target block are the shape and/or form to which splitting is to be applied, the target block may be split into multiple partition blocks, and a transform and an inverse transform may be performed on each partition block at the transform and inverse transform steps.

Case Where Each of Partition Blocks is Unit of Transform, Inverse Transform, and Prediction At step 3510, the processing unit 1210 may perform prediction on a partition block basis. In other words, the processing unit 1210 may generate a residual partition block of each partition block by performing prediction on the partition block.

In an embodiment, the prediction may be intra prediction.

At step 3520, the processing unit 1210 may perform a transform on a partition block basis. In other words, the processing unit 1210 may generate coefficients of the residual partition block by transforming the residual partition block.

The results of the transform at step 3530 may include the coefficients of multiple partition blocks.

At step 3560, the processing unit 1310 may perform an inverse transform on a partition block basis. In other words, the processing unit 1210 may generate a reconstructed residual partition block by inversely transforming the coefficients of the residual partition block.

At step 3570, the processing unit 1310 may perform prediction on a partition block basis. In other words, the processing unit 1310 may generate a partition prediction block by performing prediction on the partition block, and may generate a reconstructed partition block by adding the partition prediction block to the reconstructed residual block.

Reconstructed partition blocks of multiple partition blocks may constitute a reconstructed block of the target block. Alternatively, the reconstructed block of the target block may include reconstructed partition blocks. The reconstructed block may include reconstructed samples.

In an embodiment, a PU split indicator may indicate whether prediction, transform, and inverse transform are to be performed on a partition block basis. For example, the name of the PU split indicator may be "Intra_PU_SplitFlag".

The PU split indicator may be signaled through a bitstream.

In an embodiment, when the split indicator of an upper-level block has a second predefined value, the target block may be split into multiple partition blocks at the prediction step, and whether prediction, a transform, and an inverse transform are to be performed on each partition block may be signaled through the PU split indicator.

In an embodiment, when the split indicator of the upper-level block has the second predefined value and the split indicator of the current block has the first predefined value, the target block may be split into multiple partition blocks at the prediction step, and whether prediction, a transform, and an inverse transform are to be performed on each partition block may be signaled through the PU split indicator.

In an embodiment, when the shape and/or form of the target block are the shape and/or form to which splitting is to be applied, the target block may be split into multiple partition blocks at the prediction step, and whether prediction, a transform, and an inverse transform are to be performed on each partition block may be signaled through the PU split indicator.

In an embodiment, when the split indicator of the upper-level block has the second predefined value, the target block may be split into multiple partition blocks at the prediction step, and the prediction, transform, and inverse transform may be performed on each partition block.

In an embodiment, when the split indicator of the upper-level block has the second predefined value and the split indicator of the target block has the first predefined value, the target block may be split into multiple square partition blocks at the prediction step, and the prediction, transform, and inverse transform may be performed on each partition block.

In an embodiment, when the shape and/or form of the target block are the shape and/or form to which splitting is to be applied, the target block may be split into multiple partition blocks at the prediction step, and the prediction, transform, and inverse transform may be performed on each partition block.

Case Where Each of Partition Blocks is Unit of Prediction and Target Block is Unit of Transform and Inverse Transform At step 3510, the processing unit 1210 may perform prediction on a partition block basis. In other words, the processing unit 1210 may generate a residual partition block of each partition block by performing prediction on the partition block.

The residual partition blocks of multiple partition blocks may constitute a residual block of the target block.

At step 3520, the processing unit 1210 may perform a transform on a target block basis. For example, the processing unit 1210 may configure the residual block of the target block using the residual partition blocks of the multiple partition blocks. Alternatively, the residual block of the target block may include residual partition blocks of multiple partition blocks.

The processing unit 120 may generate coefficients of the target block by performing a transform on the residual block of the target block.

The results of the transform at step 3530 may include the coefficients of the target block.

At step 3560, the processing unit 1310 may perform an inverse transform on a target block basis using the coefficients of the target block. In other words, the processing unit 1210 may generate a reconstructed residual block by inversely transforming the coefficients of the target block.

The reconstructed residual block may be composed of multiple reconstructed residual partition blocks. Alternatively, the processing unit 1310 may generate multiple reconstructed residual partition blocks by splitting the reconstructed residual block. Alternatively, the reconstructed residual block may include multiple reconstructed residual partition blocks.

At step 3570, the processing unit 1310 may perform prediction on a partition block basis.

In other words, the processing unit 1210 may generate a partition prediction block of each partition block by performing prediction on the partition block, and may generate a reconstructed partition block by adding the partition prediction block to the reconstructed residual partition block.

As the prediction is performed on the partition block, different prediction modes may be applied to multiple partition blocks.

Multiple reconstructed partition blocks for the multiple partition blocks may constitute a reconstructed block of the target block. Alternatively, the reconstructed block of the target block may include multiple reconstructed partition blocks.

In an embodiment, a TU-merge PU-split indicator may indicate whether prediction is to be performed on a partition block basis, and whether a transform and an inverse transform are to be performed on a target block basis. For example, the name of the TU-merge PU-split indicator may be "TU_Merge_PU_splitFlag".

The TU-merge PU-split indicator may be signaled through a bitstream.

In an embodiment, when the split indicator of an upper-level block has the second predefined value, whether a transform and an inverse transform are to be performed on the target block and whether prediction is to be performed on each partition block may be signaled through the TU-merge PU-split indicator.

In an embodiment, when the split indicator of the upper-level block has the second predefined value and the split indicator of the target block has the first predefined value, whether a transform and an inverse transform are to be performed on the target block and whether prediction is to be performed on each partition block may be signaled through the TU-merge PU-split indicator.

In an embodiment, when the shape and/or form of the target block are the shape and/or form to which splitting is to be applied, whether a transform and an inverse transform are to be performed on the target block and whether prediction is to be performed on each partition block may be signaled through the TU-merge PU-split indicator.

In an embodiment, when the split indicator of an upper-level block has the second predefined value, prediction may be performed on respective partition blocks, and a transform may be performed on the target block after the prediction performed on the partition blocks. Also, when the split indicator of the upper-level block has the second predefined value, an inverse transform may be performed on the target block, prediction may be performed on respective partition blocks after the inverse transform performed on the target block, and reconstructed samples for the target block may be generated.

In an embodiment, when the split indicator of the upper-level block has the second predefined value and the split indicator of the target block has the first predefined value, prediction may be performed on respective partition blocks, and a transform may be performed on the target block after the prediction performed on the partition blocks. Also, when the split indicator of the upper-level block has the second predefined value and the split indicator of the target block has the first predefined value, an inverse transform may be performed on the target block, prediction may be performed on partition blocks after the inverse transform performed on the target block, and reconstructed samples for the target block may be generated.

In an embodiment, when the shape and/or form of the target block are the shape and/or form to which splitting is to be applied, prediction may be performed on respective partition blocks, and a transform may be performed on the target block after the prediction performed on the partition blocks. Furthermore, when the shape and/or form of the target block are the shape and/or form to which splitting is to be applied, an inverse transform may be performed on the target block, prediction may be performed on respective partition blocks after the inverse transform performed on the target block, and reconstructed samples for the target block may be generated.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

The invention claimed is:

1. A video decoding method, comprising:
determining whether to perform predictions for a plurality of split blocks which are defined by a splitting for a target block; and
performing predictions for the plurality of the split blocks in a case that it is determined to perform the predictions for the plurality of the split blocks, wherein:
the splitting is determined based on a block split indicator indicating a type of the splitting for the target block among types for the splitting,
a prediction mode commonly used for the predictions for the plurality of the split blocks is derived,
a list for the target block is derived using intra prediction modesinformation of a plurality of reference blocks,
the plurality of the reference blocks comprise a block adjacent to a left side of the target block and a block adjacent to an upper side of the target block, and
the mode is derived using the list.

2. The video decoding method of claim 1, wherein:
it is determined based on a shape of the target block whether to perform the splitting.

3. The video decoding method of claim 1, wherein:
it is determined based on a depth of the target block whether to perform the splitting.

4. The video decoding method of claim 1, wherein:
a shape of the splitting is determined based on a horizontal length of the target block and a vertical length of the target block.

5. The video decoding method of claim 1, wherein:
the splitting is determined based on a block split indicator.

6. The video decoding method of claim 5, wherein:
the block split indicator indicates a type of the splitting.

7. The video decoding method of claim 5, wherein:
the splitting is determined based on a condition using information related to the target block in a case that the block split indicator is not signaled via a bitstream.

8. The video decoding method of claim 1, wherein:
the target block is a coding tree unit.

9. The video decoding method of claim 1, wherein:
the target block is a coding unit.

10. The video decoding method of claim 1, wherein:
the target block is a transform unit.

11. The video decoding method of claim 1, wherein:
the decoding comprises intra prediction for the plurality of the split blocks.

12. The video decoding method of claim 1, wherein:
the decoding comprises inter prediction for the plurality of the split blocks.

13. A video encoding method, comprising:
determining whether to perform predictions for a plurality of split blocks which are defined by a splitting for a target block;
performing predictions for the plurality of the split blocks in a case that it is determined to perform the predictions for the plurality of the split blocks, and,
generating encoded information for the target block based on the predictions,
wherein a block split indicator indicates a type of the splitting for the target block among types for the splitting in a case that the block split indicator is included in a bitstream, and
wherein, for decoding for the target block using the encoded information for the target block and the block split indicator, a prediction mode commonly used for predictions for the plurality of the split blocks is derived, a list for the target block is derived using intra prediction modes of a plurality of reference blocks, the plurality of the reference block comprises a block adjacent to a left side of the target block and a block adjacent to an upper side of the target block, and the prediction mode is derived using the list.

14. The video encoding method of claim 13, wherein:
a shape of the splitting is determined based on a horizontal length of the target block and a vertical length of the target block.

15. A non-transitory computer-readable medium storing a bitstream generated by the video encoding method of claim 13.

16. A non-transitory computer-readable medium storing a bitstream to decode a target block, the bitstream comprising:
encoded information for the target block;
wherein whether to perform predictions for a plurality of split blocks which are defined by a splitting for the target block is determined,
predictions for the plurality of the split blocks are performed in a case that it is determined to perform the predictions for the plurality of the split blocks,
the splitting is determined based on a block split indicator indicating a type of the splitting for the target block among types for the splitting,
a prediction mode commonly used for the predictions for the plurality of the split blocks is derived
a list for the target block is derived using intra prediction modesinformation of a plurality of reference blocks,
the plurality of the reference blocks comprise a block adjacent to a left side of the target block and a block adjacent to an upper side of the target block, and
the prediction mode is derived using the list.

17. The non-transitory computer-readable medium of claim 16, wherein:
a shape of the splitting is determined based on a horizontal length of the target block and a vertical length of the target block.

* * * * *